(12) United States Patent
Jeon et al.

(10) Patent No.: US 11,051,256 B2
(45) Date of Patent: *Jun. 29, 2021

(54) PARALLEL PREAMBLE TRANSMISSIONS VIA A CELL OF A WIRELESS DEVICE

(71) Applicant: Samsung Electronics Co., Ltd., Suwon-si (KR)

(72) Inventors: Hyoungsuk Jeon, Centreville, VA (US); Esmael Dinan, McLean, VA (US); Alireza Babaei, Fairfax, VA (US); Kyungmin Park, Vienna, VA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/782,881

(22) Filed: Feb. 5, 2020

(65) Prior Publication Data

US 2020/0178185 A1 Jun. 4, 2020

Related U.S. Application Data

(63) Continuation of application No. 15/972,057, filed on May 4, 2018, now Pat. No. 10,568,050.

(Continued)

(51) Int. Cl.
*H04W 52/36* (2009.01)
*H04W 52/24* (2009.01)
(Continued)

(52) U.S. Cl.
CPC ....... *H04W 52/367* (2013.01); *H04W 52/242* (2013.01); *H04W 52/50* (2013.01); *H04W 74/0833* (2013.01)

(58) Field of Classification Search
CPC . H04W 52/242; H04W 52/367; H04W 52/50; H04W 74/0833
See application file for complete search history.

(56) References Cited

U.S. PATENT DOCUMENTS

2013/0044665 A1* 2/2013 Ng ................ H04W 52/40
370/311
2013/0188580 A1* 7/2013 Dinan ............. H04W 74/085
370/329

(Continued)

FOREIGN PATENT DOCUMENTS

EP 3306990 A1 4/2018
WO 2017196612 A1 11/2017

OTHER PUBLICATIONS

US 10,314,026 B2, 06/2019, Jeong (withdrawn)

(Continued)

*Primary Examiner* — Saad A. Waqas
(74) *Attorney, Agent, or Firm* — Jefferson IP Law, LLP

(57) ABSTRACT

A wireless device initiates a random access procedure for parallel transmissions of random access preambles for beams of a cell. A determination is made that a first calculated transmit power exceeds a first power value. The first calculated transmit power comprises transmission powers corresponding to the parallel transmissions of the random access preambles. In response to the determination, a first transmission of at least one first random access preamble of the random access preambles is dropped based on at least one first pathloss value corresponding to the first transmission being greater than at least one second pathloss value corresponding to a second transmission of at least one second random access preamble of the random access preambles. The at least one second random access preamble of the random access preambles is transmitted by the wireless device.

18 Claims, 44 Drawing Sheets

Related U.S. Application Data

(60) Provisional application No. 62/501,508, filed on May 4, 2017.

(51) Int. Cl.
  *H04W 74/08* (2009.01)
  *H04W 52/50* (2009.01)

(56) References Cited

U.S. PATENT DOCUMENTS

| | | | | |
|---|---|---|---|---|
| 2015/0319719 | A1* | 11/2015 | Steudle | H04W 24/02 |
| | | | | 370/216 |
| 2016/0037550 | A1* | 2/2016 | Barabell | H04B 17/318 |
| | | | | 455/450 |
| 2016/0073431 | A1* | 3/2016 | Park | H04W 16/32 |
| | | | | 370/329 |
| 2016/0198496 | A1* | 7/2016 | Jeong | H04L 5/001 |
| | | | | 370/329 |
| 2017/0231011 | A1 | 8/2017 | Park et al. | |
| 2017/0367120 | A1 | 12/2017 | Murray et al. | |
| 2018/0014254 | A1 | 1/2018 | Hwang et al. | |
| 2018/0097591 | A1 | 4/2018 | Islam et al. | |
| 2018/0359790 | A1* | 12/2018 | Ingale | H04W 28/16 |
| 2019/0104549 | A1* | 4/2019 | Deng | H04B 7/0617 |

OTHER PUBLICATIONS

R1-1704188; 3GPP TSG RAN WG1 Meeting #88bis; Spokane, USA, Apr. 3-7, 2017; Agenda Item: 8.1.1.4.2; Source: Huawei, HiSilicon; Title: RACH Procedures and Resource Configuration; Document for: Discussion and decision.

R1-1704228; 3GPP TSG RAN WG1 Meeting #88bis; Spokane, USA, Apr. 3-7, 2017; Agenda Item: 8.1.2.5; Source: Huawei, HiSilicon; Title: Detailed considerations on UL power control design for NR; Document for: Discussion and decision.

R1-1704418; 3GPP TSG RAN WG1 Meeting #88bis; R1-1704418Spokane, USA Apr. 3-7, 2017; Source: ZTE, ZTE Microelectronics; Title: Discussion on UL power control for NR; Agenda Item: 8.1.2.5; Document for: Discussion and Decision.

R1-1704477; 3GPP TSG RAN WG1 Meeting #88bis; Spokane, USA Apr. 3-7, 2017; Agenda item: 8.1.1.4.2; Source: Fujitsu; Title: Discussion on RACH procedure; Document for: Discussion and Decision.

R1-1704485; 3GPP TSG-RAN WG1 #88bis; Spokane, Washington, USA, Apr. 3-7, 2017; Source: Mitsubishi Electric; Title: on RACH retransmission; Agenda Item: 8.1.1.4.2 4-step RA procedure; Document for: Discussion and Decision.

R1-1704541; 3GPP TSG RAN WG1 Meeting #88bis; Spokane, USA, Apr. 3-7, 2017; Source: CATT; Title: Further details on NR 4-step RA Procedure; Agenda Item: 8.1.1.4.2; Document for: Discussion and Decision.

R1-1704605; 3GPP TSG RAN WG1 Meeting #88bis; Spokane, USA Apr. 3-7, 2017; Source: Guangdong OPPO Mobile Telecom; Title: NR 4-Step Random Access Procedure; Agenda Item: 8.1.1.4.2; Document for: Discussion and Decision.

R1-1704613; 3GPP TSG RAN WG1 Meeting #88bis; Spokane, USA, Apr. 3-7, 2017; Source: Guangdong OPPO Mobile Telecom; Title: Discussion on uplink power control for NR; Agenda Item: 8.1.2.5; Document for: Discussion and Decision.

R1-1704715; 3GPP TSG RAN WG1 #88bis; Spokane, USA, Apr. 3-7, 2017; Source: Intel Corporation; Title: NR random access procedure; Agenda item: 8.1.1.4.2.; Document for: Discussion and Decision.

R1-1704740; 3GPP TSG-RAN WG1 #88bis; Spokane, USA, Apr. 3-7, 2017; Source: Intel Corporation; Title: on UL Power Control; Agenda item: 8.1.2.5.1; Document for: Discussion and Decision.

R1-1704869; 3GPP TSG RAN WG1 Meeting #88bis; Spokane, USA Apr. 3-7, 2017; Agenda Item: 8.1.1.4.2; Source: LG Electronics; Title: Discussion on RACH Procedure; Document for: Discussion and decision.

R1-1704895; 3GPP TSG RAN WG1 Meeting #88bis; Spokane, USA Apr. 3-7, 2017; Agenda Item: 8.1.2.5; Source: LG Electronics; Title: Discussion on uplink power control for NR; Document for Discussion and decision.

R1-1704943; 3GPP TSG-RAN WG1#88bis; Spokane, USA, Apr. 3-7, 2017; Agenda item: 8.1.1.4.2; Source: Nokia, Alcatel-Lucent Shanghai Bell; Title: NR Random Access Procedure; Document for: Discussion and Decision.

R1-1705212; 3GPP TSG RAN WG1 Meeting #88bis; Spokane, USA Apr. 3-7, 2017; Agenda Item: 8.1.1.4.2; Source: Sony; Title: RACH Procedure for Multi-beam Operation; Document for: Discussion / Decision.

R1-1705325; 3GPP TSG RAN WG1 Meeting #88b; Spokane, Washington, USA, Apr. 3-7, 2017; Agenda Item: 8.1.1.4.2; Source: Samsung; Title: NR 4-step random access procedure; Document for: Discussion and Decision.

R1-1705363; 3GPP TSG RAN WG1 Meeting #88bis; Spokane, USA Apr. 3-7, 2017; Agenda item: 8.1.2.5; Source: Samsung; Title: UL Power Control Aspects; Document for: Discussion and Decision.

R1-1705437; 3GPP TSG RAN WG1 Meeting #88bis; Spokane, Washington, USA, Apr. 3-7, 2017; Agenda Item: 8.1.2.5; Source: InterDigital Communications; Title: Power Control for NR; Document for: Discussion, Decision.

R1-1705438; 3GPP TSG RAN WG1 Meeting #88bis; Spokane, Washington, USA, Apr. 3-7, 2017; Agenda Item: 8.1.2.5; Source: InterDigital Communications; Title: Power Sharing for NR; Document for: Discussion, Decision.

R1-1705439; 3GPP TSG-RAN WG1 #88bis; Spokane, USA, Apr. 3-7, 2017; Agenda Item: 8.1.1.4.2; Source: InterDigital Communications; Title: Multiple Msg1 transmissions for one monitored RAR window; Document for: Discussion, Decision.

R1-1705515; 3GPP TSG RAN WG1 Meeting #88bis; Spokane, USA, Apr. 3-7, 2017; Agenda item: 8.1.2.5; Source: InterDigital Communications; Title: on Power Control Processes for Multi Beam Transmission in NR; Document for: Discussion/Decision.

R1-1705598; 3GPP TSG RAN WG1 Meeting #88bis; Spokane, USA Apr. 3-7, 2017; Agenda item: 8.1.2.5; Source: Qualcomm Incorporated; Title: Power control and PHR for different waveforms; Document for Discussion/Decision.

R1-1705659; 3GPP TSG RAN WG1 Meeting #88bis; Spokane, USA, Apr. 3-7, 2017; Agenda item: 8.1.2.5; Source: HTC; Title: on UL power control for NR; Document for: Discussion and Decision.

R1-1705712; 3GPP TSG RAN WG1 Meeting #88bis; Spokane, USA Apr. 3-7, 2017; Source: NTT DOCOMO, Inc.; Title: Discussion on 4-step random access procedure for NR; Agenda Item: 8.1.1.4.2; Document for: Discussion and Decision.

R1-1705727; 3GPP TSG-RAN WG1 Meeting #88bis; Spokane, USA, Apr. 3-7, 2017; Agenda item: 8.1.2.5; Source: NTT Docomo, Inc.; Title: Uplink power control considering waveform switching; Document for: Discussion and Decision.

R1-1705822; 3GPP TSG RAN WG1 Meeting #88bis; Spokane, USA Apr. 3-7, 2017; Agenda Item: 8.1.2.5; Source: ASUSTeK; Title: UL power control in multi-beam based approaches; Document for: Discussion and Decision.

R1-1705915; 3GPP TSG-RAN WG1 #88bis; Spokane, USA Apr. 3-7, 2017; Source: Ericsson; Title: on path loss estimation for UL power control; Agenda Item: 8.1.2.5; Document for: Discussion and Decision.

R1-1705916; 3GPP TSG-RAN WG1 #88bis; Spokane, USA Apr. 3-7, 2017; Source: Ericsson; Title: on power control for NR; Agenda Item: 8.1.2.5; Document for: Discussion and Decision.

R1-1705978; 3GPP TSG RAN WG1#88 bis; Spokane, WA, USA, Apr. 3-7, 2017; Agenda item: 8.1.2.5; Source: Nokia, Alcatel-Lucent Shanghai Bell; Title: UL Power Control for MIMO; Document for: Discussion and Decision.

R2-1702657; 3GPP TSG-RAN WG2 #97bis; Spokane, USA, Apr. 3-7, 2017; Agenda Item: 10.3.1.4; Source: Ericsson; Title: Random Access Enhancements; Document for: Discussion, Decision.

R2-1702840; 3GPP TSG RAN WG2 #97bis Meeting; Spokane, USA, Jan. 3-7, 2017; Source: ZTE, ZTE Microelectronics; Title: Consideration on the RACH procedure; Agenda Item: 10.3.1.4; Document for: Discussion and Decision.

(56) References Cited

OTHER PUBLICATIONS

R2-1702889; 3GPP TSG-RAN WG2 Meeting #97bis; Spokane, USA, Apr. 3-7, 2017; Agenda item: 10.3.1.4; Source: Samsung; Title: Beamformed Random Access Procedure—Access Delay Aspects; Document for: Discussion & Decision.

R2-1703120; 3GPP TSG-RAN WG2 Meeting #97bis ; Spokane, USA, Apr. 3-7, 2017; Source: CATT; Title: Further details on NR 4-step RA Procedure; Agenda Item: 10.3.1.4; Document for: Discussion and Decision.

R2-1703445; 3GPP TSG-RAN WG2 97bis meeting; Spokane, Washington, USA, Apr. 3-7, 2017; Agenda item: 10.3.1.4; Source: Intel Corporation; Title: Considerations of random access procedure in multiple and single beam scenarios; Document for: Discussion and Decision.

* cited by examiner

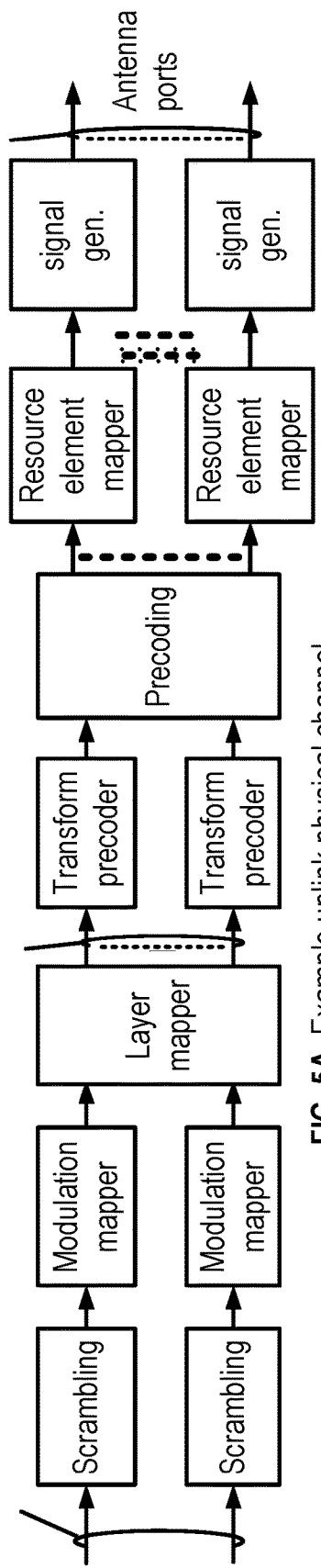
FIG. 5A Example uplink physical channel
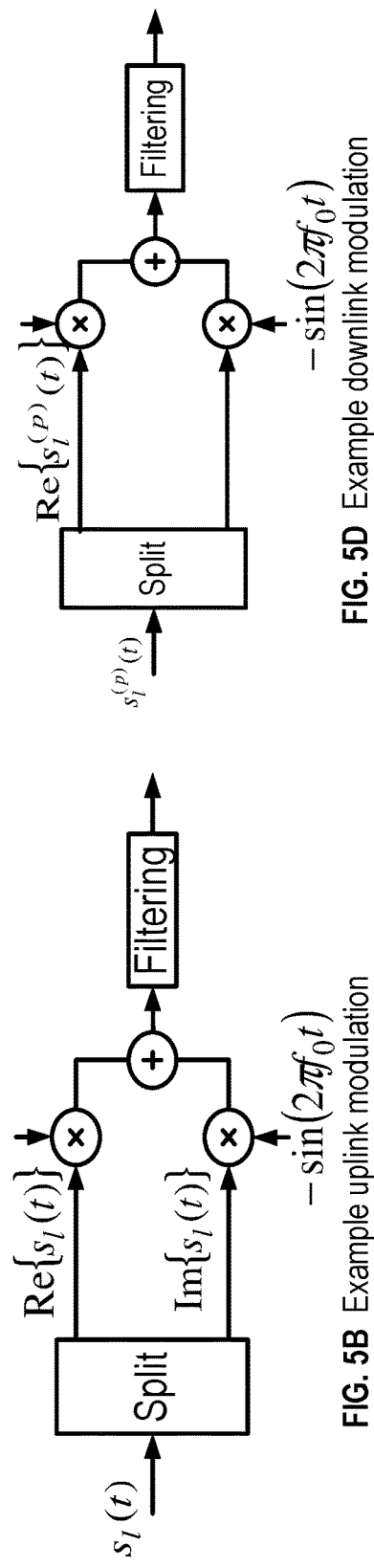
FIG. 5B Example uplink modulation
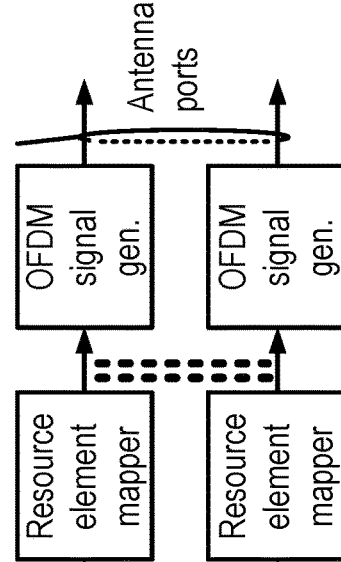
FIG. 5D Example downlink modulation
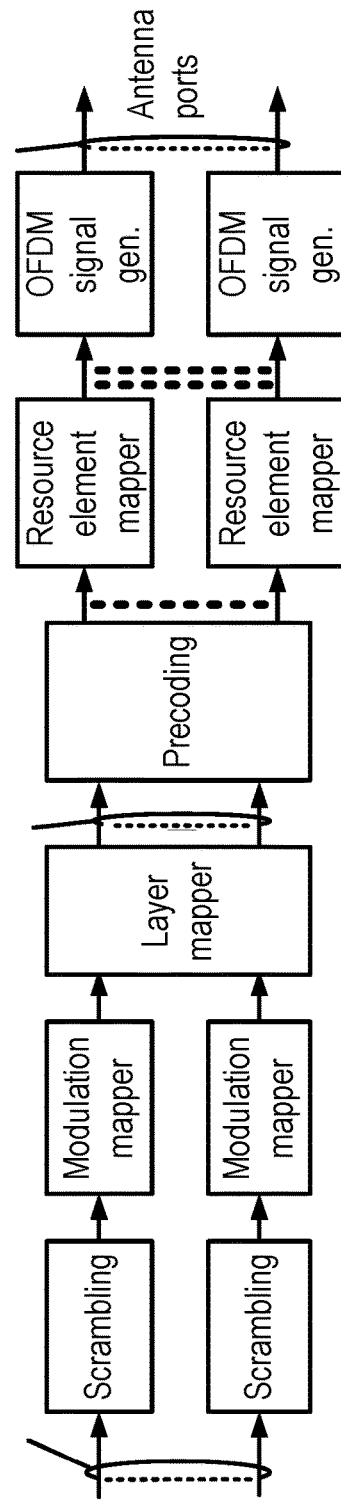
FIG. 5C Example downlink physical channel Dual-Connectivity- two MAC entities at UE side

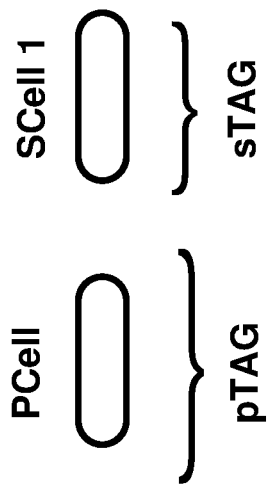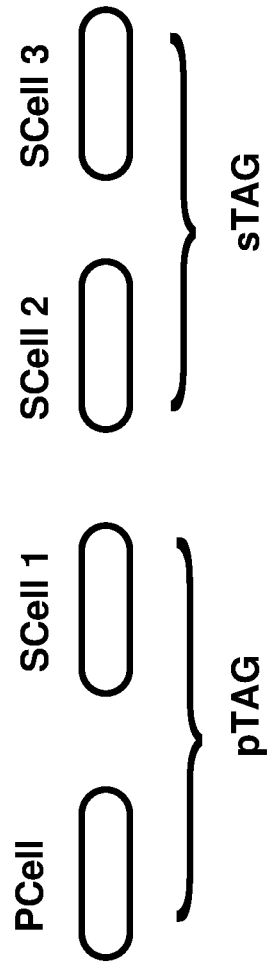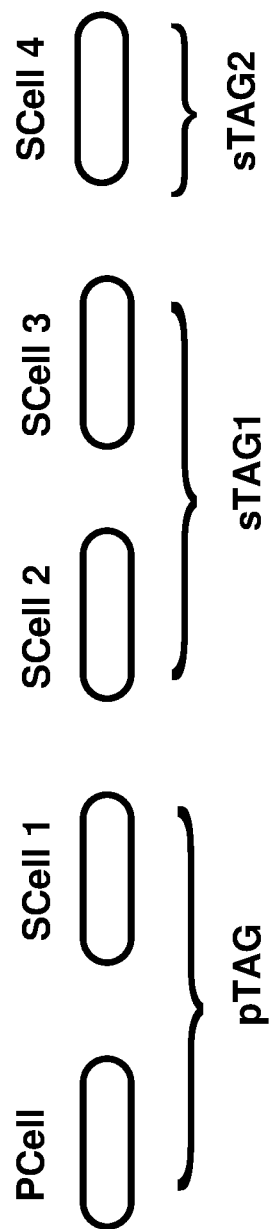
FIG. 8 gNB connected to NGC eLTE eNB connected to NGC

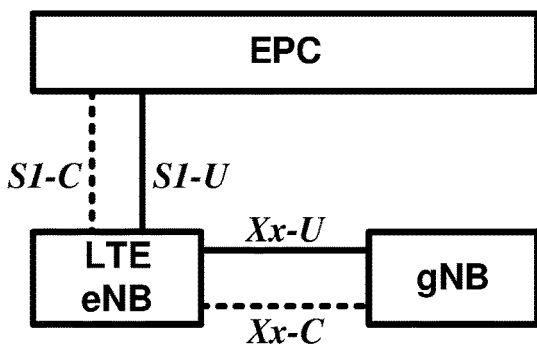

LTE eNB connected to EPC with non-standalone gNB.
gNB user plane connected to EPC via LTE eNB.

FIG. 11A

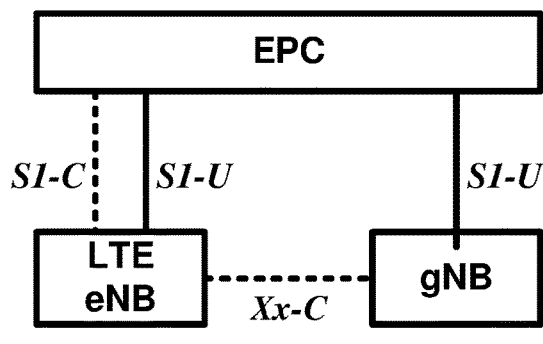

LTE eNB connected to EPC with non-standalone gNB.
gNB user plane connected to EPC directly.

FIG. 11B

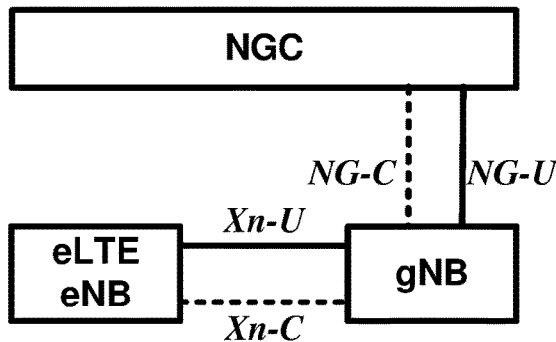

gNB connected to NGC with non-standalone eLTE eNB.
eLTE eNB user plane connected to NGC via gNB.

FIG. 11C

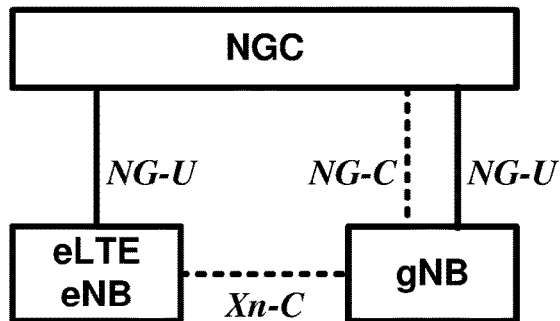

gNB connected to NGC with non-standalone eLTE eNB.
eLTE eNB user plane connected to NGC directly.

FIG. 11D

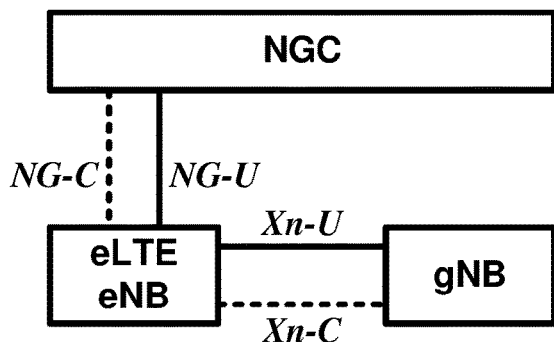

eLTE eNB connected to NGC with non-standalone gNB.
gNB user plane connected to NGC via eLTE eNB.

FIG. 11E

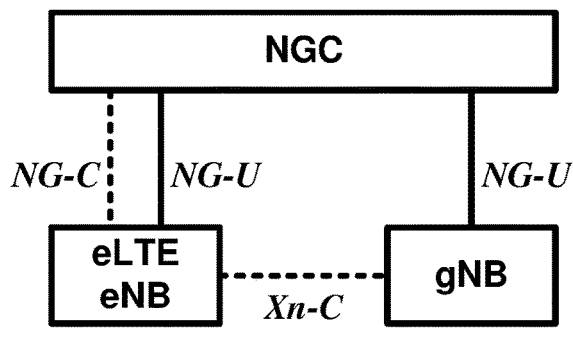

eLTE eNB connected to NGC with non-standalone gNB.
gNB user plane connected to NGC directly.

FIG. 11F

Radio protocol architecture for split bearer and SCG bearer. LTE eNB connected to EPC with non-standalone gNB.

Radio protocol architecture for split bearer and SCG bearer. gNB connected to NGC with non-standalone eLTE eNB.

Radio protocol architecture for split bearer and SCG bearer. eLTE eNB connected to NGC with non-standalone gNB.

Non-centralized deployment

Centralized deployment

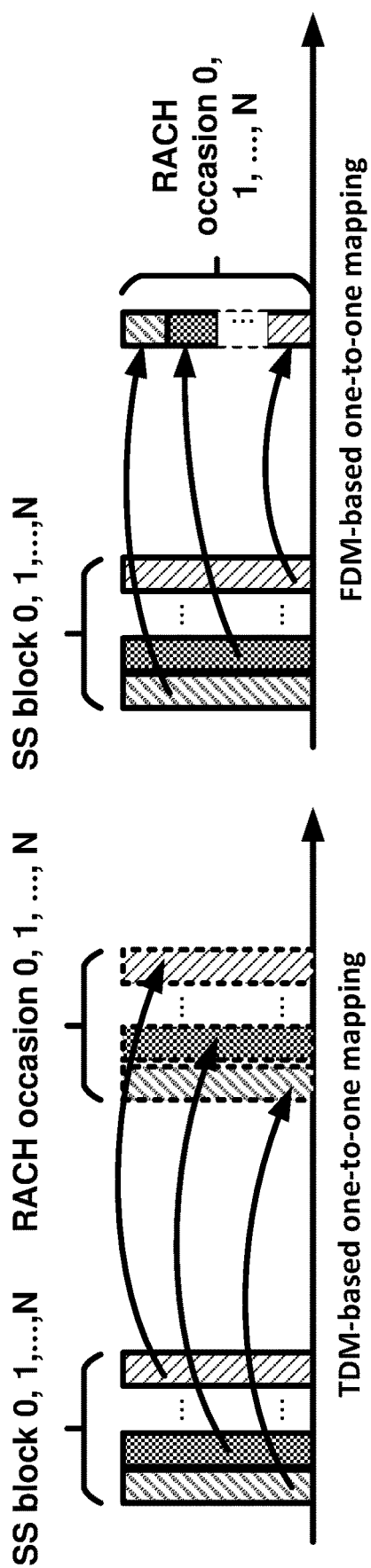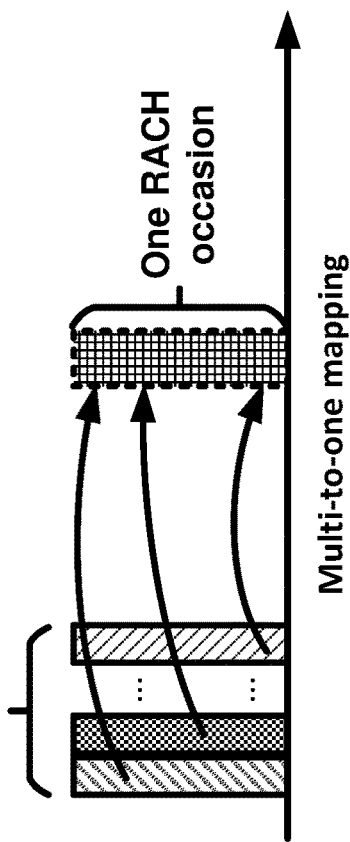
FIG. 20A
FIG. 20B
FIG. 20C

| Preamble Format | DELTA_PREAMBLE value |
|---|---|
| 0 | 0 dB |
| 1 | 0 dB |
| 2 | -3 dB |
| 3 | -3 dB |
| 4 | 8 dB |

FIG. 25

| TDD UL/DL Configuration | subframe number $i$ | | | | | | | | | |
|---|---|---|---|---|---|---|---|---|---|---|
| | 0 | 1 | 2 | 3 | 4 | 5 | 6 | 7 | 8 | 9 |
| 0 | - | - | 6 | 7 | 4 | - | - | 6 | 7 | 4 |
| 1 | - | - | 6 | 4 | - | - | - | 6 | 4 | - |
| 2 | - | - | 4 | - | - | - | - | 4 | - | - |
| 3 | - | - | 4 | 4 | 4 | - | - | - | - | - |
| 4 | - | - | 4 | 4 | - | - | - | - | - | - |
| 5 | - | - | 4 | - | - | - | - | - | - | - |
| 6 | - | - | 7 | 7 | 5 | - | - | 7 | 7 | - |

FIG. 29

| TPC Command Field in DCI format 0/0A/0B/3/4/4A/4B/6-0A/3B | Accumulated $\delta_{PUSCH,c}$ [dB] | Absolute $\delta_{PUSCH,c}$ [dB] in DCI format 0/0A/0B/4/4A/4B/6-0A |
|---|---|---|
| 0 | -1 | -4 |
| 1 | 0 | -1 |
| 2 | 1 | 1 |
| 3 | 3 | 4 |

FIG. 30A

| TPC Command Field in DCI format 3A/3B | Accumulated $\delta_{PUSCH,c}$ [dB] |
|---|---|
| 0 | -1 |
| 1 | 1 |

FIG. 30B

| TPC Command Field in DCI format 1A/1B/1D/1/2A/2B/2C/2D/2/3/6-1A | $\delta_{PUCCH}$ [dB] |
|---|---|
| 0 | -1 |
| 1 | 0 |
| 2 | 1 |
| 3 | 3 |

FIG. 31

| TPC Command Field in DCI format 3A | $\delta_{PUCCH}$ [dB] |
|---|---|
| 0 | -1 |
| 1 | 1 |

FIG. 32

Receive, by a wireless device, message(s) indicating: configuration parameter(s) of a periodic CSI-RS of a cell; and a power offset value associated with the periodic CSI-RS of the cell
4010

Receive, a control order for transmission of a random access preamble via the cell
4020

Determine, a transmission power for the random access preamble
4030 wireless device being configured with the periodic CSI-RS for the cell?
4032

↓ Yes transmission power is at least based on the power offset value
4036

Transmit, the random access preamble using the transmission power
4040

FIG. 40

```
┌─────────────────────────────────────────────────────────────┐
│  Receive, by a wireless device from a base station,         │
│  message(s) comprising configuration parameters of          │
│  random access channel(s) for beam(s) of a cell             │
│                          4210                                │
└─────────────────────────────────────────────────────────────┘
                              │
                              ▼
┌─────────────────────────────────────────────────────────────┐
│  Initiate, by the wireless device, a random access          │
│  procedure for parallel transmissions of random access      │
│  preamble(s) via the random access channel(s) for the       │
│  beam(s)                                                     │
│                          4220                                │
└─────────────────────────────────────────────────────────────┘
                              │
                              ▼
┌─────────────────────────────────────────────────────────────┐
│  Determine a transmission power(s) corresponding to the     │
│  parallel transmissions of the random access preamble(s)    │
│                          4230                                │
└─────────────────────────────────────────────────────────────┘
                              │
                              ▼
        ╱─────────────────────────────────────────╲
       ╱  1st calculated transmit power comprising  ╲
      ╱  the transmission power(s) exceed a first    ╲
      ╲  value?                                      ╱
       ╲              4240                          ╱
        ╲───────────────────────────────────────── ╱
                              │ Yes
                              ▼
┌─────────────────────────────────────────────────────────────┐
│  drop at least one of the parallel transmissions            │
│                          4250                                │
└─────────────────────────────────────────────────────────────┘
                              │
                              ▼
┌─────────────────────────────────────────────────────────────┐
│  Transmit, by the wireless device via at least one of the   │
│  random access channel(s), at least one of the random       │
│  access preamble(s)                                          │
│                          4260                                │
└─────────────────────────────────────────────────────────────┘
```

FIG. 42

200~# PARALLEL PREAMBLE TRANSMISSIONS VIA A CELL OF A WIRELESS DEVICE

This application is a continuation of U.S. patent application Ser. No. 15/972,057, filed May 4, 2018, which claims the benefit of U.S. Provisional Application No. 62/501,508, filed May 4, 2017, which is hereby incorporated by reference in its entirety.

BRIEF DESCRIPTION OF THE SEVERAL VIEWS OF THE DRAWINGS

Examples of several of the various embodiments of the present invention are described herein with reference to the drawings.

FIG. 5A, FIG. 5B, FIG. 5C and FIG. 5D are example diagrams for uplink and downlink signal transmission as per an aspect of an embodiment of the present disclosure.

FIG. 8 shows example TAG configurations as per an aspect of an embodiment of the present disclosure.

FIG. 11A, FIG. 11B, FIG. 11C, FIG. 11D, FIG. 11E, and FIG. 11F are example diagrams for architectures of tight interworking between 5G RAN (e.g. gNB) and LTE RAN (e.g. (e)LTE eNB) as per an aspect of an embodiment of the present disclosure.

FIG. 20A, FIG. 20B, and FIG. 20C are example diagrams for a TDM and FDM mapping of PRACH resources as per an aspect of an embodiment of the present disclosure.

FIG. 25 is an example diagram for a TRP transmitting IDLE mode RS with wide beams and CSI-RS narrow beams as per an aspect of an embodiment of the present disclosure.

FIG. 29 is an example diagram for $K_{PUSCH}$ as per an aspect of an embodiment of the present disclosure.

FIG. 30A and FIG. 30B are example diagrams for $\delta_{PUSCH,c}$ as per an aspect of an embodiment of the present disclosure.

FIG. 31 is an example diagram for $\delta_{PUCCH}$ as per an aspect of an embodiment of the present disclosure.

FIG. 32 is an example diagram for $\delta_{PUCCH}$ as per an aspect of an embodiment of the present disclosure.

FIG. 40 is an example flow diagram as per an aspect of an embodiment of the present disclosure.

FIG. 42 is an example flow diagram as per an aspect of an embodiment of the present disclosure.

DETAILED DESCRIPTION OF EMBODIMENTS

Figure 1:
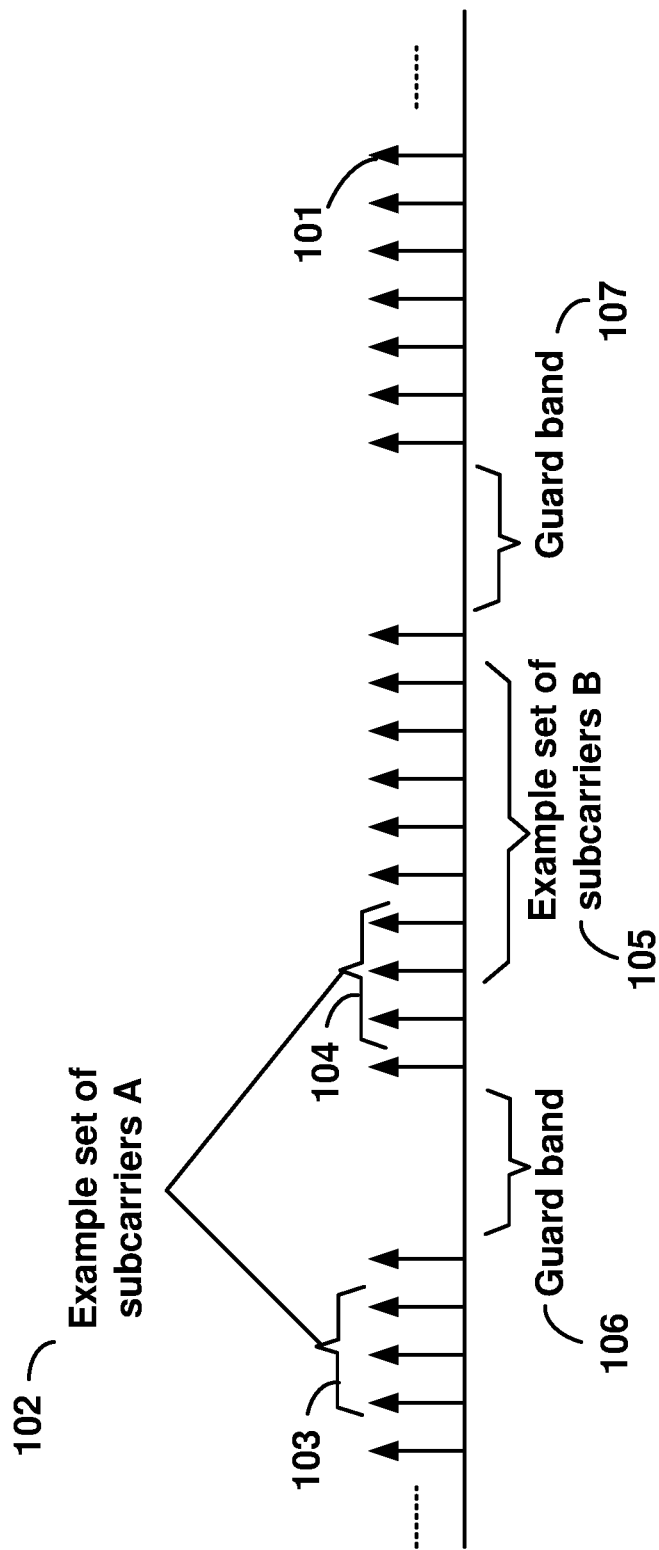
FIG. 1 is a diagram depicting example sets of OFDM subcarriers as per an aspect of an embodiment of the present disclosure.

Example embodiments of the present invention enable operation of carrier aggregation. Embodiments of the technology disclosed herein may be employed in the technical field of multicarrier communication systems. More particularly, the embodiments of the technology disclosed herein may relate to signal timing in a multicarrier communication systems.

The following Acronyms are used throughout the present disclosure:
- ASIC application-specific integrated circuit
- BPSK binary phase shift keying
- CA carrier aggregation
- CSI channel state information
- CDMA code division multiple access
- CSS common search space
- CPLD complex programmable logic devices
- CC component carrier
- CP cyclic prefix
- DL downlink
- DCI downlink control information
- DC dual connectivity
- eMBB enhanced mobile broadband
- EPC evolved packet core
- E-UTRAN evolved-universal terrestrial radio access network
- FPGA field programmable gate arrays
- FDD frequency division multiplexing
- HDL hardware description languages
- HARQ hybrid automatic repeat request
- IE information element
- LTE long term evolution
- MCG master cell group
- MeNB master evolved node B
- MIB master information block
- MAC media access control
- MAC media access control
- MME mobility management entity
- mMTC massive machine type communications
- NAS non-access stratum
- NR new radio
- OFDM orthogonal frequency division multiplexing
- PDCP packet data convergence protocol
- PDU packet data unit
- PHY physical
- PDCCH physical downlink control channel
- PHICH physical HARQ indicator channel
- PUCCH physical uplink control channel
- PUSCH physical uplink shared channel
- PCell primary cell
- PCell primary cell
- PCC primary component carrier
- PSCell primary secondary cell
- pTAG primary timing advance group
- QAM quadrature amplitude modulation
- QPSK quadrature phase shift keying
- RBG resource block groups
- RLC radio link control
- RRC radio resource control
- RA random access
- RB resource blocks
- SCC secondary component carrier
- SCell secondary cell
- Scell secondary cells
- SCG secondary cell group
- SeNB secondary evolved node B
- sTAGs secondary timing advance group
- SDU service data unit
- S-GW serving gateway
- SRB signaling radio bearer
- SC-OFDM single carrier-OFDM
- SFN system frame number
- SIB system information block
- TAI tracking area identifier
- TAT time alignment timer
- TDD time division duplexing
- TDMA time division multiple access
- TA timing advance
- TAG timing advance group
- TTI transmission time intervalTB transport block
- UL uplink
- UE user equipment
- URLLC ultra-reliable low-latency communications
- VHDL VHSIC hardware description language
- CU central unit
- DU distributed unit
- Fs-C Fs-control plane
- Fs-U Fs-user plane
- gNB next generation node B
- NGC next generation core
- NG CP next generation control plane core
- NG-C NG-control plane
- NG-U NG-user plane
- NR new radio
- NR MAC new radio MAC
- NR PHY new radio physical
- NR PDCP new radio PDCP
- NR RLC new radio RLC
- NR RRC new radio RRC
- NSSAI network slice selection assistance information
- PLMN public land mobile network
- UPGW user plane gateway
- Xn-C Xn-control plane
- Xn-U Xn-user plane
- Xx-C Xx-control plane
- Xx-U Xx-user plane Example embodiments of the invention may be implemented using various physical layer modulation and transmission mechanisms. Example transmission mechanisms may include, but are not limited to: CDMA, OFDM, TDMA, Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement QAM using BPSK, QPSK, 16-QAM, 64-QAM, 256-QAM, and/or the like. Physical radio transmission may be enhanced by dynamically or semi-dynamically changing the modulation and coding scheme depending on transmission requirements and radio conditions.

FIG. 1 is a diagram depicting example sets of OFDM subcarriers as per an aspect of an embodiment of the present invention. As illustrated in this example, arrow(s) in the diagram may depict a subcarrier in a multicarrier OFDM system. The OFDM system may use technology such as OFDM technology, DFTS-OFDM, SC-OFDM technology, or the like. For example, arrow 101 shows a subcarrier transmitting information symbols. FIG. 1 is for illustration purposes, and a typical multicarrier OFDM system may include more subcarriers in a carrier. For example, the number of subcarriers in a carrier may be in the range of 10 to 10,000 subcarriers. FIG. 1 shows two guard bands 106 and 107 in a transmission band. As illustrated in FIG. 1, guard band 106 is between subcarriers 103 and subcarriers 104. The example set of subcarriers A 102 includes subcarriers 103 and subcarriers 104. FIG. 1 also illustrates an example set of subcarriers B 105. As illustrated, there is no guard band between any two subcarriers in the example set of subcarriers B 105. Carriers in a multicarrier OFDM communication system may be contiguous carriers, non-contiguous carriers, or a combination of both contiguous and non-contiguous carriers.

Figure 2:
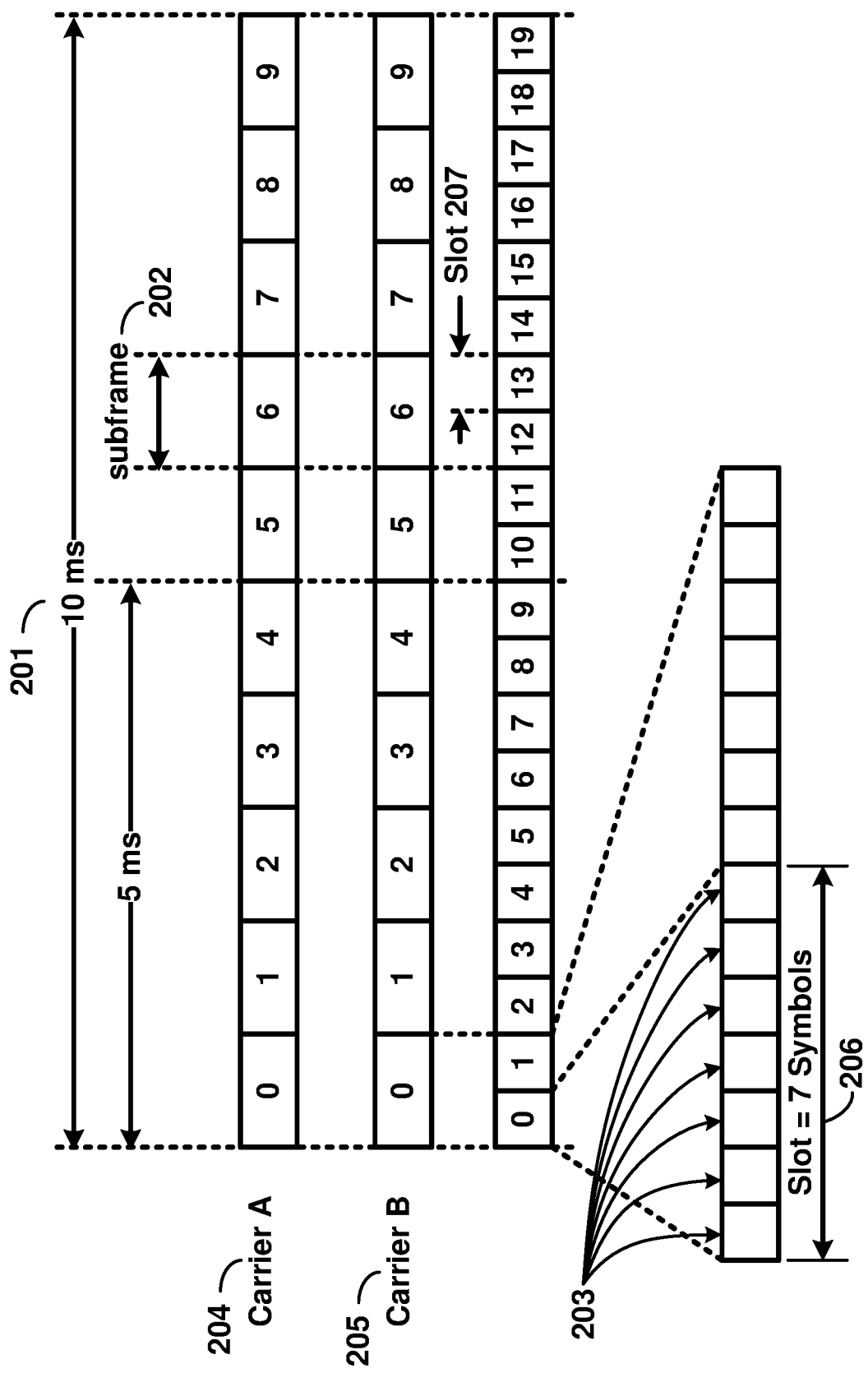
FIG. 2 is a diagram depicting an example transmission time and reception time for two carriers in a carrier group as per an aspect of an embodiment of the present disclosure.

FIG. 2 is a diagram depicting an example transmission time and reception time for two carriers as per an aspect of an embodiment of the present invention. A multicarrier OFDM communication system may include one or more carriers, for example, ranging from 1 to 10 carriers. Carrier A 204 and carrier B 205 may have the same or different timing structures. Although FIG. 2 shows two synchronized carriers, carrier A 204 and carrier B 205 may or may not be synchronized with each other. Different radio frame structures may be supported for FDD and TDD duplex mechanisms. FIG. 2 shows an example FDD frame timing. Downlink and uplink transmissions may be organized into radio frames 201. In this example, radio frame duration is 10 msec. Other frame durations, for example, in the range of 1 to 100 msec may also be supported. In this example, each 10 ms radio frame 201 may be divided into ten equally sized subframes 202. Other subframe durations such as including 0.5 msec, 1 msec, 2 msec, and 5 msec may also be supported. Subframe(s) may consist of two or more slots (e.g. slots 206 and 207). For the example of FDD, 10 subframes may be available for downlink transmission and 10 subframes may be available for uplink transmissions in each 10 ms interval. Uplink and downlink transmissions may be separated in the frequency domain. A slot may be 7 or 14 OFDM symbols for the same subcarrier spacing of up to 60 kHz with normal CP. A slot may be 14 OFDM symbols for the same subcarrier spacing higher than 60 kHz with normal CP. A slot may contain all downlink, all uplink, or a downlink part and an uplink part and/or alike. Slot aggregation may be supported, e.g., data transmission may be scheduled to span one or multiple slots. In an example, a mini-slot may start at an OFDM symbol in a subframe. A mini-slot may have a duration of one or more OFDM symbols. Slot(s) may include a plurality of OFDM symbols 203. The number of OFDM symbols 203 in a slot 206 may depend on the cyclic prefix length and subcarrier spacing.

Figure 3:
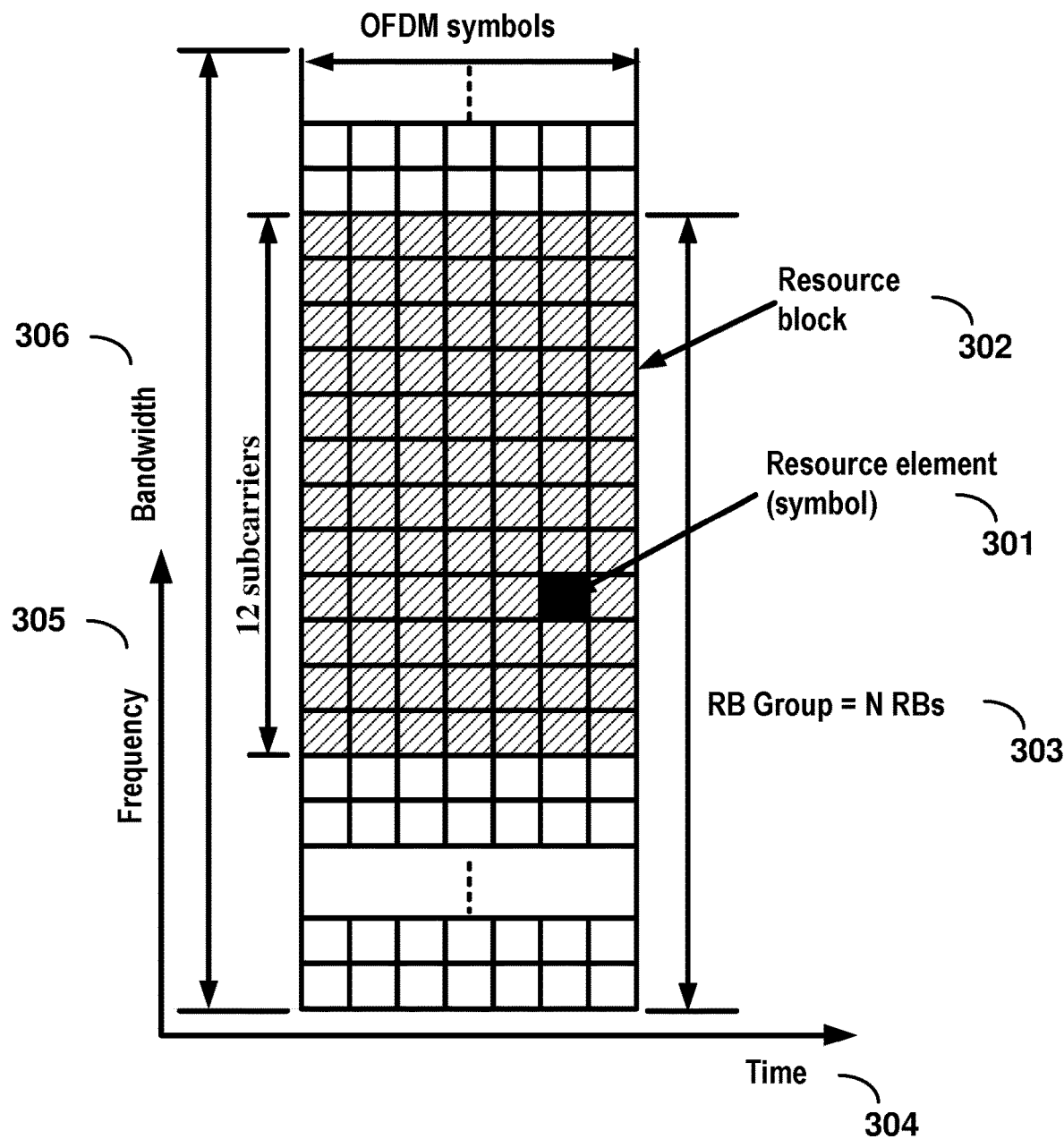
FIG. 3 is a diagram depicting OFDM radio resources as per an aspect of an embodiment of the present disclosure.

FIG. 3 is a diagram depicting OFDM radio resources as per an aspect of an embodiment of the present invention. The resource grid structure in time 304 and frequency 305 is illustrated in FIG. 3. The quantity of downlink subcarriers or RBs may depend, at least in part, on the downlink transmission bandwidth 306 configured in the cell. The smallest radio resource unit may be called a resource element (e.g. 301). Resource elements may be grouped into resource blocks (e.g. 302). Resource blocks may be grouped into larger radio resources called Resource Block Groups (RBG) (e.g. 303). The transmitted signal in slot 206 may be described by one or several resource grids of a plurality of subcarriers and a plurality of OFDM symbols. Resource blocks may be used to describe the mapping of certain physical channels to resource elements. Other pre-defined groupings of physical resource elements may be implemented in the system depending on the radio technology. For example, 24 subcarriers may be grouped as a radio block for a duration of 5 msec. In an illustrative example, a resource block may correspond to one slot in the time domain and 180 kHz in the frequency domain (for 15 KHz subcarrier bandwidth and 12 subcarriers).

In an example embodiment, multiple numerologies may be supported. In an example, a numerology may be derived by scaling a basic subcarrier spacing by an integer N. In an example, scalable numerology may allow at least from 15 kHz to 480 kHz subcarrier spacing. The numerology with 15 kHz and scaled numerology with different subcarrier spacing with the same CP overhead may align at a symbol boundary every 1 ms in a NR carrier.

FIG. 5A, FIG. 5B, FIG. 5C and FIG. 5D are example diagrams for uplink and downlink signal transmission as per an aspect of an embodiment of the present invention. FIG. 5A shows an example uplink physical channel. The baseband signal representing the physical uplink shared channel may perform the following processes. These functions are illustrated as examples and it is anticipated that other mechanisms may be implemented in various embodiments. The functions may comprise scrambling, modulation of scrambled bits to generate complex-valued symbols, mapping of the complex-valued modulation symbols onto one or several transmission layers, transform precoding to generate complex-valued symbols, precoding of the complex-valued symbols, mapping of precoded complex-valued symbols to resource elements, generation of complex-valued time-domain DFTS-OFDM/SC-FDMA signal for each antenna port, and/or the like.

Example modulation and up-conversion to the carrier frequency of the complex-valued DFTS-OFDM/SC-FDMA baseband signal for each antenna port and/or the complex-valued PRACH baseband signal is shown in FIG. 5B. Filtering may be employed prior to transmission.

An example structure for Downlink Transmissions is shown in FIG. 5C. The baseband signal representing a downlink physical channel may perform the following processes. These functions are illustrated as examples and it is anticipated that other mechanisms may be implemented in various embodiments. The functions include scrambling of coded bits in each of the codewords to be transmitted on a physical channel; modulation of scrambled bits to generate complex-valued modulation symbols; mapping of the complex-valued modulation symbols onto one or several transmission layers; precoding of the complex-valued modulation symbols on each layer for transmission on the antenna ports; mapping of complex-valued modulation symbols for each antenna port to resource elements; generation of complex-valued time-domain OFDM signal for each antenna port, and/or the like.

Example modulation and up-conversion to the carrier frequency of the complex-valued OFDM baseband signal for each antenna port is shown in FIG. 5D. Filtering may be employed prior to transmission.

Figure 4:
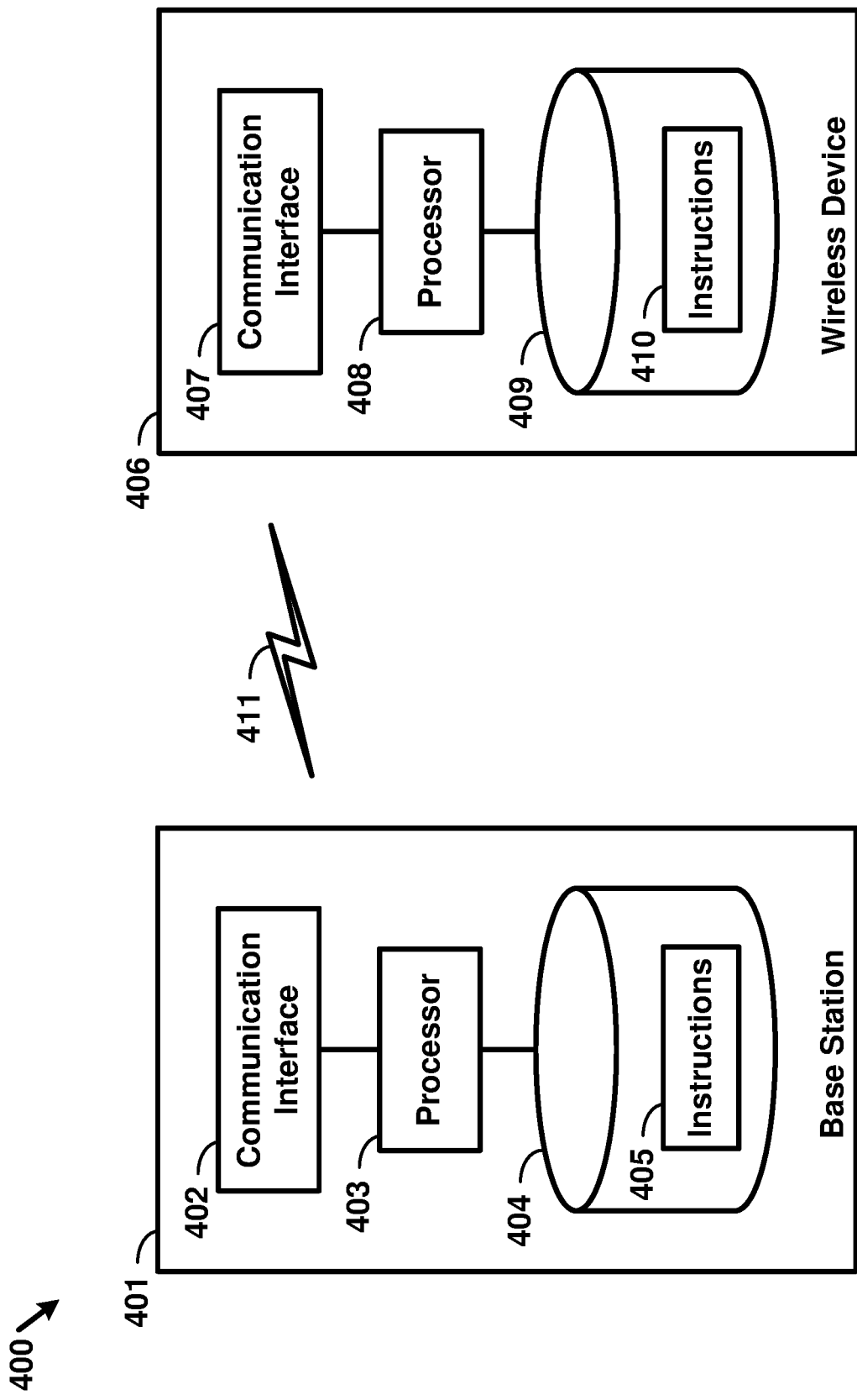
FIG. 4 is a block diagram of a base station and a wireless device as per an aspect of an embodiment of the present disclosure.

FIG. 4 is an example block diagram of a base station 401 and a wireless device 406, as per an aspect of an embodiment of the present invention. A communication network 400 may include at least one base station 401 and at least one wireless device 406. The base station 401 may include at least one communication interface 402, at least one processor 403, and at least one set of program code instructions 405 stored in non-transitory memory 404 and executable by the at least one processor 403. The wireless device 406 may include at least one communication interface 407, at least one processor 408, and at least one set of program code instructions 410 stored in non-transitory memory 409 and executable by the at least one processor 408. Communication interface 402 in base station 401 may be configured to engage in communication with communication interface 407 in wireless device 406 via a communication path that includes at least one wireless link 411. Wireless link 411 may be a bi-directional link. Communication interface 407 in wireless device 406 may also be configured to engage in a communication with communication interface 402 in base station 401. Base station 401 and wireless device 406 may be configured to send and receive data over wireless link 411 using multiple frequency carriers. According to some of the various aspects of embodiments, transceiver(s) may be employed. A transceiver is a device that includes both a transmitter and receiver. Transceivers may be employed in devices such as wireless devices, base stations, relay nodes, and/or the like. Example embodiments for radio technology implemented in communication interface 402, 407 and wireless link 411 are illustrated are FIG. 1, FIG. 2, FIG. 3, FIG. 5, and associated text.

An interface may be a hardware interface, a firmware interface, a software interface, and/or a combination thereof. The hardware interface may include connectors, wires, electronic devices such as drivers, amplifiers, and/or the like. A software interface may include code stored in a memory device to implement protocol(s), protocol layers, communication drivers, device drivers, combinations thereof, and/or the like. A firmware interface may include a combination of embedded hardware and code stored in and/or in communication with a memory device to implement connections, electronic device operations, protocol(s), protocol layers, communication drivers, device drivers, hardware operations, combinations thereof, and/or the like.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics in the device, whether the device is in an operational or non-operational state.

Figure 10A:
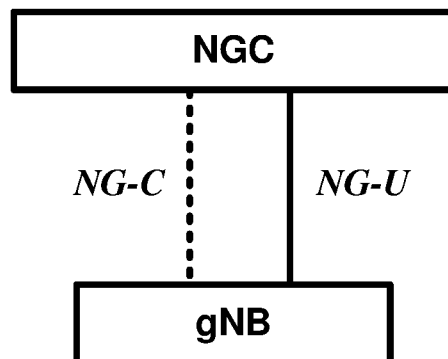
FIG. 10A and FIG. 10B are example diagrams for interfaces between a 5G core network (e.g. NGC) and base stations (e.g. gNB and eLTE eNB) as per an aspect of an embodiment of the present disclosure.
Figure 10B:
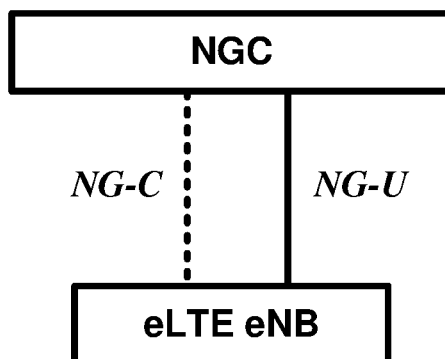

According to some of the various aspects of embodiments, a 5G network may include a multitude of base stations, providing a user plane NR PDCP/NR RLC/NR MAC/NR PHY and control plane (NR RRC) protocol terminations towards the wireless device. The base station(s) may be interconnected with other base station(s) (e.g. employing an Xn interface). The base stations may also be connected employing, for example, an NG interface to an NGC. FIG. 10A and FIG. 10B are example diagrams for interfaces between a 5G core network (e.g. NGC) and base stations (e.g. gNB and eLTE eNB) as per an aspect of an embodiment of the present invention. For example, the base stations may be interconnected to the NGC control plane (e.g. NG CP) employing the NG-C interface and to the NGC user plane (e.g. UPGW) employing the NG-U interface. The NG interface may support a many-to-many relation between 5G core networks and base stations.

A base station may include many sectors for example: 1, 2, 3, 4, or 6 sectors. A base station may include many cells, for example, ranging from 1 to 50 cells or more. A cell may be categorized, for example, as a primary cell or secondary cell. At RRC connection establishment/re-establishment/handover, one serving cell may provide the NAS (non-access stratum) mobility information (e.g. TAI), and at RRC connection re-establishment/handover, one serving cell may provide the security input. This cell may be referred to as the Primary Cell (PCell). In the downlink, the carrier corresponding to the PCell may be the Downlink Primary Component Carrier (DL PCC), while in the uplink, it may be the Uplink Primary Component Carrier (UL PCC). Depending on wireless device capabilities, Secondary Cells (SCells) may be configured to form together with the PCell a set of serving cells. In the downlink, the carrier corresponding to an SCell may be a Downlink Secondary Component Carrier (DL SCC), while in the uplink, it may be an Uplink Secondary Component Carrier (UL SCC). An SCell may or may not have an uplink carrier.

A cell, comprising a downlink carrier and optionally an uplink carrier, may be assigned a physical cell ID and a cell index. A carrier (downlink or uplink) may belong to only one cell. The cell ID or Cell index may also identify the downlink carrier or uplink carrier of the cell (depending on the context it is used). In the specification, cell ID may be equally referred to a carrier ID, and cell index may be referred to carrier index. In implementation, the physical cell ID or cell index may be assigned to a cell. A cell ID may be determined using a synchronization signal transmitted on a downlink carrier. A cell index may be determined using RRC messages. For example, when the specification refers to a first physical cell ID for a first downlink carrier, the specification may mean the first physical cell ID is for a cell comprising the first downlink carrier. The same concept may apply to, for example, carrier activation. When the specification indicates that a first carrier is activated, the specification may equally mean that the cell comprising the first carrier is activated.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices may support multiple technologies, and/or multiple releases of the same technology. Wireless devices may have some specific capability(ies) depending on its wireless device category and/or capability(ies). A base station may comprise multiple sectors. When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of wireless devices in a coverage area that may not comply with the disclosed methods, for example, because those wireless devices perform based on older releases of LTE or 5G technology.

Figure 6:
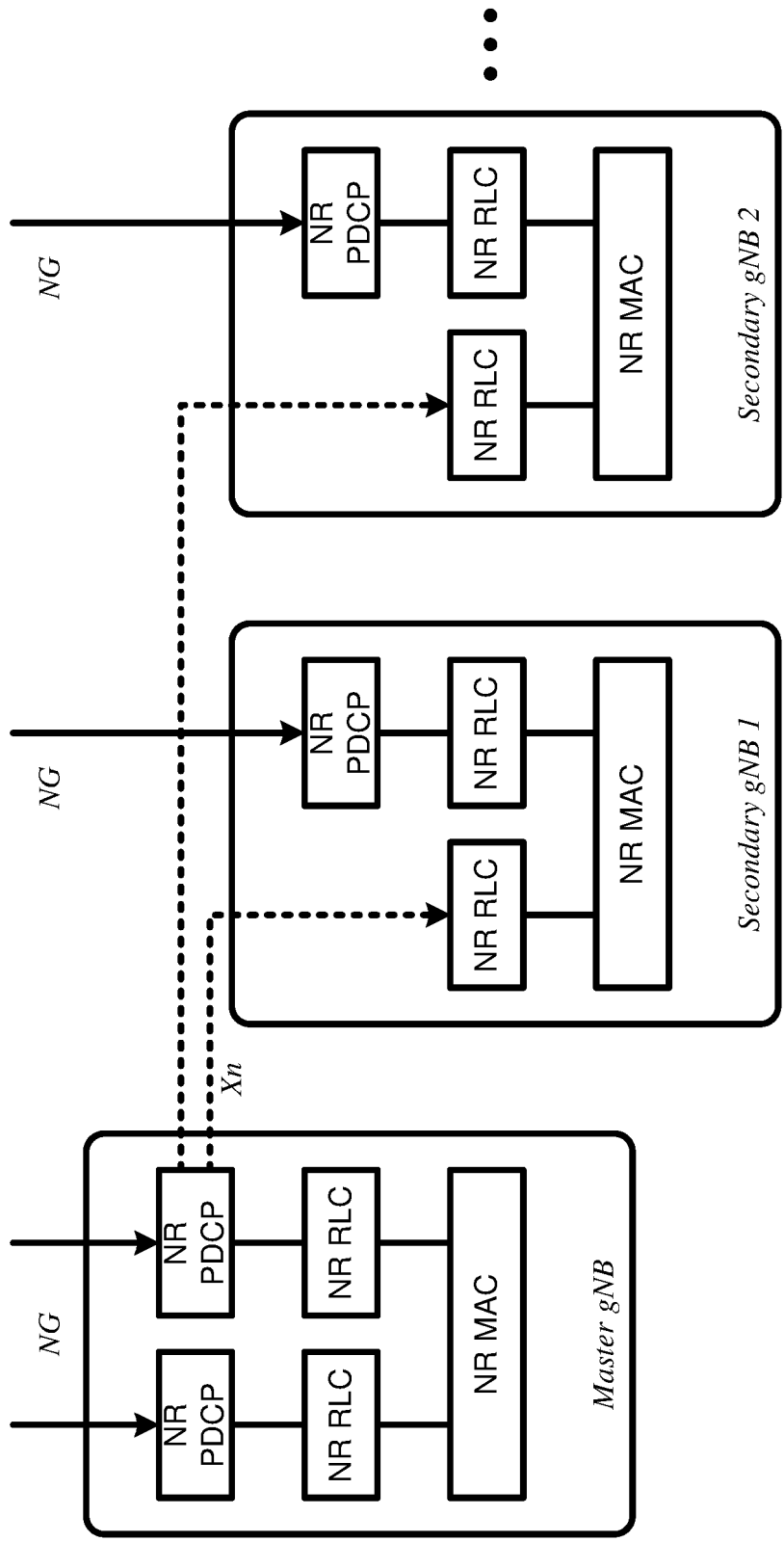
FIG. 6 is an example diagram for a protocol structure with multi-connectivity as per an aspect of an embodiment of the present disclosure.
Figure 7:
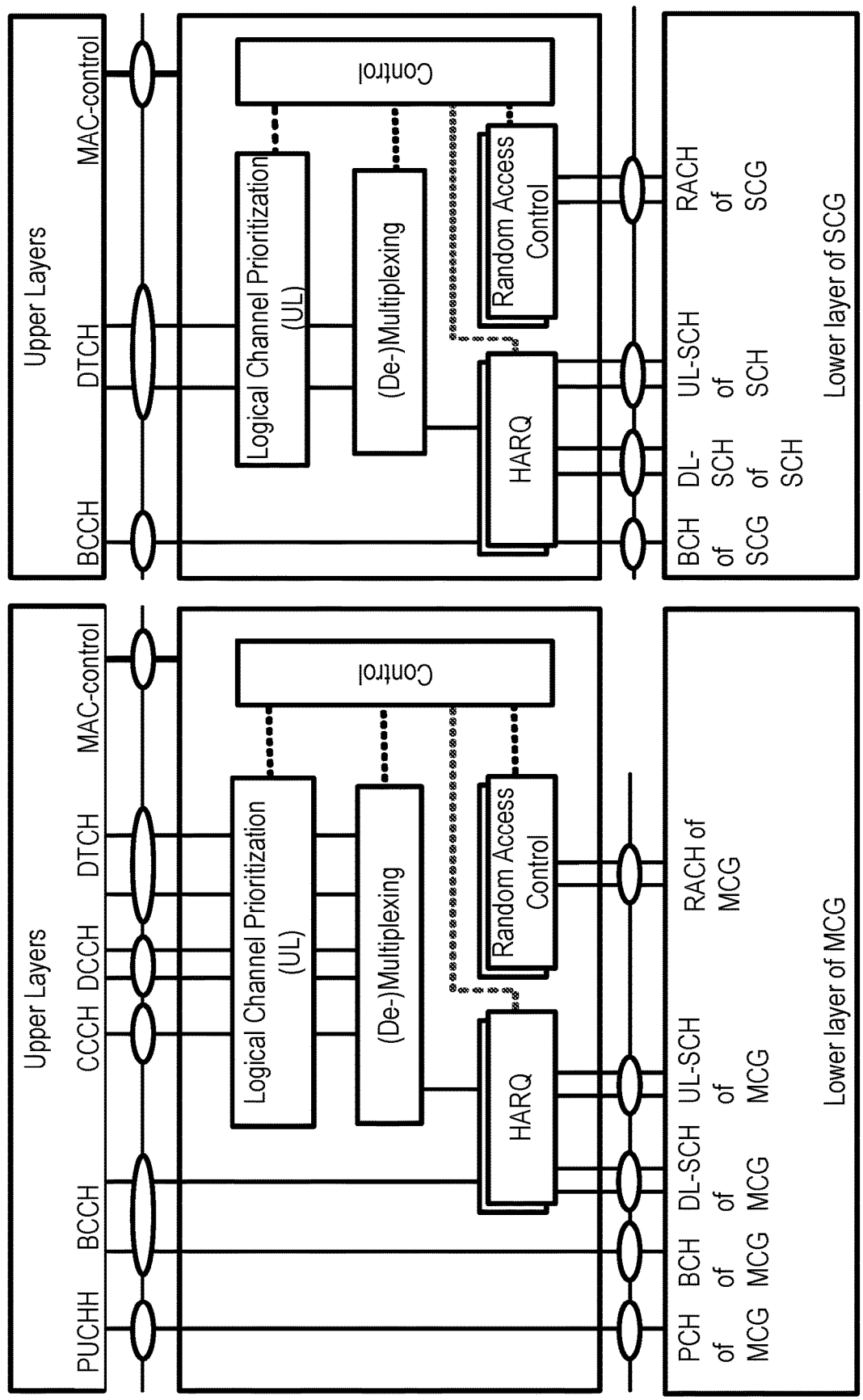
FIG. 7 is an example diagram for a protocol structure with CA and DC as per an aspect of an embodiment of the present disclosure.

FIG. 6 and FIG. 7 are example diagrams for protocol structure with CA and multi-connectivity as per an aspect of an embodiment of the present invention. NR may support multi-connectivity operation whereby a multiple RX/TX UE in RRC_CONNECTED may be configured to utilize radio resources provided by multiple schedulers located in multiple gNBs connected via a non-ideal or ideal backhaul over the Xn interface. gNBs involved in multi-connectivity for a certain UE may assume two different roles: a gNB may either act as a master gNB or as a secondary gNB. In multi-connectivity, a UE may be connected to one master gNB and one or more secondary gNBs. FIG. 7 illustrates one example structure for the UE side MAC entities when a Master Cell Group (MCG) and a Secondary Cell Group (SCG) are configured, and it may not restrict implementation. Media Broadcast Multicast Service (MBMS) reception is not shown in this figure for simplicity.

In multi-connectivity, the radio protocol architecture that a particular bearer uses may depend on how the bearer is setup. Three alternatives may exist, an MCG bearer, an SCG bearer and a split bearer as shown in FIG. 6. NR RRC may be located in master gNB and SRBs may be configured as a MCG bearer type and may use the radio resources of the master gNB. Multi-connectivity may also be described as having at least one bearer configured to use radio resources provided by the secondary gNB. Multi-connectivity may or may not be configured/implemented in example embodiments of the invention.

In the case of multi-connectivity, the UE may be configured with multiple NR MAC entities: one NR MAC entity for master gNB, and other NR MAC entities for secondary gNBs. In multi-connectivity, the configured set of serving cells for a UE may comprise of two subsets: the Master Cell Group (MCG) containing the serving cells of the master gNB, and the Secondary Cell Groups (SCGs) containing the serving cells of the secondary gNBs. For a SCG, one or more of the following may be applied: at least one cell in the SCG has a configured UL CC and one of them, named PSCell (or PCell of SCG, or sometimes called PCell), is configured with PUCCH resources; when the SCG is configured, there may be at least one SCG bearer or one Split bearer; upon detection of a physical layer problem or a random access problem on a PSCell, or the maximum number of NR RLC retransmissions has been reached associated with the SCG, or upon detection of an access problem on a PSCell during a SCG addition or a SCG change: a RRC connection re-establishment procedure may not be triggered, UL transmissions towards cells of the SCG are stopped, a master gNB may be informed by the UE of a SCG failure type, for split bearer, the DL data transfer over the master gNB is maintained; the NR RLC AM bearer may be configured for the split bearer; like PCell, PSCell may not be de-activated; PSCell may be changed with a SCG change (e.g. with security key change and a RACH procedure); and/or a direct bearer type change between a Split bearer and a SCG bearer or simultaneous configuration of a SCG and a Split bearer may or may not be supported.

With respect to the interaction between a master gNB and secondary gNBs for multi-connectivity, one or more of the following principles may be applied: the master gNB may maintain the RRM measurement configuration of the UE and may, (e.g, based on received measurement reports or traffic conditions or bearer types), decide to ask a secondary gNB to provide additional resources (serving cells) for a UE; upon receiving a request from the master gNB, a secondary gNB may create a container that may result in the configuration of additional serving cells for the UE (or decide that it has no resource available to do so); for UE capability coordination, the master gNB may provide (part of) the AS configuration and the UE capabilities to the secondary gNB; the master gNB and the secondary gNB may exchange information about a UE configuration by employing of NR RRC containers (inter-node messages) carried in Xn messages; the secondary gNB may initiate a reconfiguration of its existing serving cells (e.g., PUCCH towards the secondary gNB); the secondary gNB may decide which cell is the PSCell within the SCG; the master gNB may or may not change the content of the NR RRC configuration provided by the secondary gNB; in the case of a SCG addition and a SCG SCell addition, the master gNB may provide the latest measurement results for the SCG cell(s); both a master gNB and secondary gNBs may know the SFN and subframe offset of each other by OAM, (e.g., for the purpose of DRX alignment and identification of a measurement gap). In an example, when adding a new SCG SCell, dedicated NR RRC signaling may be used for sending required system information of the cell as for CA, except for the SFN acquired from a MIB of the PSCell of a SCG.

In an example, serving cells may be grouped in a TA group (TAG). Serving cells in one TAG may use the same timing reference. For a given TAG, user equipment (UE) may use at least one downlink carrier as a timing reference. For a given TAG, a UE may synchronize uplink subframe and frame transmission timing of uplink carriers belonging to the same TAG. In an example, serving cells having an uplink to which the same TA applies may correspond to serving cells hosted by the same receiver. A UE supporting multiple TAs may support two or more TA groups. One TA group may contain the PCell and may be called a primary TAG (pTAG). In a multiple TAG configuration, at least one TA group may not contain the PCell and may be called a secondary TAG (sTAG). In an example, carriers within the same TA group may use the same TA value and/or the same timing reference. When DC is configured, cells belonging to a cell group (MCG or SCG) may be grouped into multiple TAGs including a pTAG and one or more sTAGs.

FIG. 8 shows example TAG configurations as per an aspect of an embodiment of the present invention. In Example 1, pTAG comprises PCell, and an sTAG comprises SCell1. In Example 2, a pTAG comprises a PCell and SCell1, and an sTAG comprises SCell2 and SCell3. In Example 3, pTAG comprises PCell and SCell1, and an sTAG1 includes SCell2 and SCell3, and sTAG2 comprises SCell4. Up to four TAGs may be supported in a cell group (MCG or SCG) and other example TAG configurations may also be provided. In various examples in this disclosure, example mechanisms are described for a pTAG and an sTAG. Some of the example mechanisms may be applied to configurations with multiple sTAGs.

In an example, an eNB may initiate an RA procedure via a PDCCH order for an activated SCell. This PDCCH order may be sent on a scheduling cell of this SCell. When cross carrier scheduling is configured for a cell, the scheduling cell may be different than the cell that is employed for preamble transmission, and the PDCCH order may include an SCell index. At least a non-contention based RA procedure may be supported for SCell(s) assigned to sTAG(s).

Figure 9:
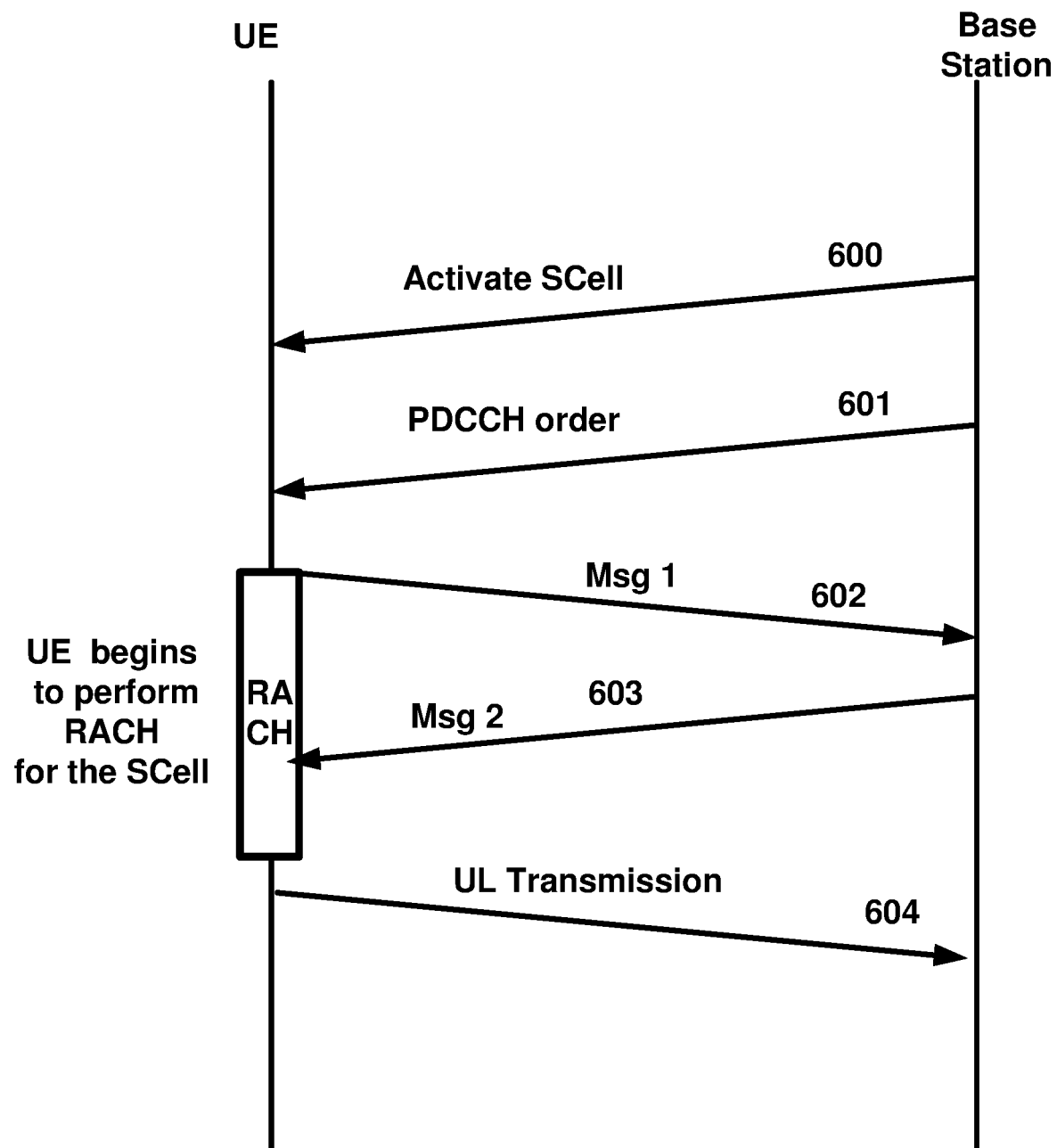
FIG. 9 is an example message flow in a random access process in a secondary TAG as per an aspect of an embodiment of the present disclosure.

FIG. 9 is an example message flow in a random access process in a secondary TAG as per an aspect of an embodiment of the present invention. An eNB transmits an activation command 600 to activate an SCell. A preamble 602 (Msg1) may be sent by a UE in response to a PDCCH order 601 on an SCell belonging to an sTAG. In an example embodiment, preamble transmission for SCells may be controlled by the network using PDCCH format 1A. Msg2 message 603 (RAR: random access response) in response to the preamble transmission on the SCell may be addressed to RA-RNTI in a PCell common search space (CSS). Uplink packets 604 may be transmitted on the SCell in which the preamble was transmitted.

According to some of the various aspects of embodiments, initial timing alignment may be achieved through a random access procedure. This may involve a UE transmitting a random access preamble and an eNB responding with an initial TA command NTA (amount of timing advance) within a random access response window. The start of the random access preamble may be aligned with the start of a corresponding uplink subframe at the UE assuming NTA=0. The eNB may estimate the uplink timing from the random access preamble transmitted by the UE. The TA command may be derived by the eNB based on the estimation of the difference between the desired UL timing and the actual UL timing. The UE may determine the initial uplink transmission timing relative to the corresponding downlink of the sTAG on which the preamble is transmitted.

The mapping of a serving cell to a TAG may be configured by a serving eNB with RRC signaling. The mechanism for TAG configuration and reconfiguration may be based on RRC signaling. According to some of the various aspects of embodiments, when an eNB performs an SCell addition configuration, the related TAG configuration may be configured for the SCell. In an example embodiment, an eNB may modify the TAG configuration of an SCell by removing (releasing) the SCell and adding(configuring) a new SCell (with the same physical cell ID and frequency) with an updated TAG ID. The new SCell with the updated TAG ID may initially be inactive subsequent to being assigned the updated TAG ID. The eNB may activate the updated new SCell and start scheduling packets on the activated SCell. In an example implementation, it may not be possible to change the TAG associated with an SCell, but rather, the SCell may need to be removed and a new SCell may need to be added with another TAG. For example, if there is a need to move an SCell from an sTAG to a pTAG, at least one RRC message, for example, at least one RRC reconfiguration message, may be send to the UE to reconfigure TAG configurations by releasing the SCell and then configuring the SCell as a part of the pTAG (when an SCell is added/configured without a TAG index, the SCell may be explicitly assigned to the pTAG). The PCell may not change its TA group and may be a member of the pTAG.

The purpose of an RRC connection reconfiguration procedure may be to modify an RRC connection, (e.g. to establish, modify and/or release RBs, to perform handover, to setup, modify, and/or release measurements, to add, modify, and/or release SCells). If the received RRC Connection Reconfiguration message includes the sCellToReleaseList, the UE may perform an SCell release. If the received RRC Connection Reconfiguration message includes the sCellToAddModList, the UE may perform SCell additions or modification.

In LTE Release-10 and Release-11 CA, a PUCCH is only transmitted on the PCell (PSCell) to an eNB. In LTE-Release 12 and earlier, a UE may transmit PUCCH information on one cell (PCell or PSCell) to a given eNB.

As the number of CA capable UEs and also the number of aggregated carriers increase, the number of PUCCHs and also the PUCCH payload size may increase. Accommodating the PUCCH transmissions on the PCell may lead to a high PUCCH load on the PCell. A PUCCH on an SCell may be introduced to offload the PUCCH resource from the PCell. More than one PUCCH may be configured for example, a PUCCH on a PCell and another PUCCH on an SCell. In the example embodiments, one, two or more cells may be configured with PUCCH resources for transmitting CSI/ACK/NACK to a base station. Cells may be grouped into multiple PUCCH groups, and one or more cell within a group may be configured with a PUCCH. In an example configuration, one SCell may belong to one PUCCH group. SCells with a configured PUCCH transmitted to a base station may be called a PUCCH SCell, and a cell group with a common PUCCH resource transmitted to the same base station may be called a PUCCH group.

In an example embodiment, a MAC entity may have a configurable timer timeAlignmentTimer per TAG. The timeAlignmentTimer may be used to control how long the MAC entity considers the Serving Cells belonging to the associated TAG to be uplink time aligned. The MAC entity may, when a Timing Advance Command MAC control element is received, apply the Timing Advance Command for the indicated TAG; start or restart the timeAlignmentTimer associated with the indicated TAG. The MAC entity may, when a Timing Advance Command is received in a Random Access Response message for a serving cell belonging to a TAG and/or if the Random Access Preamble was not selected by the MAC entity, apply the Timing Advance Command for this TAG and start or restart the timeAlignmentTimer associated with this TAG. Otherwise, if the timeAlignmentTimer associated with this TAG is not running, the Timing Advance Command for this TAG may be applied and the timeAlignmentTimer associated with this TAG started. When the contention resolution is considered not successful, a timeAlignmentTimer associated with this TAG may be stopped. Otherwise, the MAC entity may ignore the received Timing Advance Command.

In example embodiments, a timer is running once it is started, until it is stopped or until it expires; otherwise it may not be running. A timer can be started if it is not running or restarted if it is running. For example, a timer may be started or restarted from its initial value.

Example embodiments of the invention may enable operation of multi-carrier communications. Other example embodiments may comprise a non-transitory tangible computer readable media comprising instructions executable by one or more processors to cause operation of multi-carrier communications. Yet other example embodiments may comprise an article of manufacture that comprises a non-transitory tangible computer readable machine-accessible medium having instructions encoded thereon for enabling programmable hardware to cause a device (e.g. wireless communicator, UE, base station, etc.) to enable operation of multi-carrier communications. The device may include processors, memory, interfaces, and/or the like. Other example embodiments may comprise communication networks comprising devices such as base stations, wireless devices (or user equipment: UE), servers, switches, antennas, and/or the like.

FIG. 11A, FIG. 11B, FIG. 11C, FIG. 11D, FIG. 11E, and FIG. 11F are example diagrams for architectures of tight interworking between 5G RAN and LTE RAN as per an aspect of an embodiment of the present invention. The tight interworking may enable a multiple RX/TX UE in RRC_CONNECTED to be configured to utilize radio resources provided by two schedulers located in two base stations (e.g. (e)LTE eNB and gNB) connected via a non-ideal or ideal backhaul over the Xx interface between LTE eNB and gNB or the Xn interface between eLTE eNB and gNB. Base stations involved in tight interworking for a certain UE may assume two different roles: a base station may either act as a master base station or as a secondary base station. In tight interworking, a UE may be connected to one master base station and one secondary base station. Mechanisms implemented in tight interworking may be extended to cover more than two base stations.

In FIG. 11A and FIG. 11B, a master base station may be an LTE eNB, which may be connected to EPC nodes (e.g. to an MME via the S1-C interface and to an S-GW via the S1-U interface), and a secondary base station may be a gNB, which may be a non-standalone node having a control plane connection via an Xx-C interface to an LTE eNB. In the tight interworking architecture of FIG. 11A, a user plane for a gNB may be connected to an S-GW through an LTE eNB via an Xx-U interface between LTE eNB and gNB and an S1-U interface between LTE eNB and S-GW. In the architecture of FIG. 11B, a user plane for a gNB may be connected directly to an S-GW via an S1-U interface between gNB and S-GW.

In FIG. 11C and FIG. 11D, a master base station may be a gNB, which may be connected to NGC nodes (e.g. to a control plane core node via the NG-C interface and to a user plane core node via the NG-U interface), and a secondary base station may be an eLTE eNB, which may be a non-standalone node having a control plane connection via an Xn-C interface to a gNB. In the tight interworking architecture of FIG. 11C, a user plane for an eLTE eNB may be connected to a user plane core node through a gNB via an Xn-U interface between eLTE eNB and gNB and an NG-U interface between gNB and user plane core node. In the architecture of FIG. 11D, a user plane for an eLTE eNB may be connected directly to a user plane core node via an NG-U interface between eLTE eNB and user plane core node.

In FIG. 11E and FIG. 11F, a master base station may be an eLTE eNB, which may be connected to NGC nodes (e.g. to a control plane core node via the NG-C interface and to a user plane core node via the NG-U interface), and a secondary base station may be a gNB, which may be a non-standalone node having a control plane connection via an Xn-C interface to an eLTE eNB. In the tight interworking architecture of FIG. 11E, a user plane for a gNB may be connected to a user plane core node through an eLTE eNB via an Xn-U interface between eLTE eNB and gNB and an NG-U interface between eLTE eNB and user plane core node. In the architecture of FIG. 11F, a user plane for a gNB may be connected directly to a user plane core node via an NG-U interface between gNB and user plane core node.

Figure 12A:
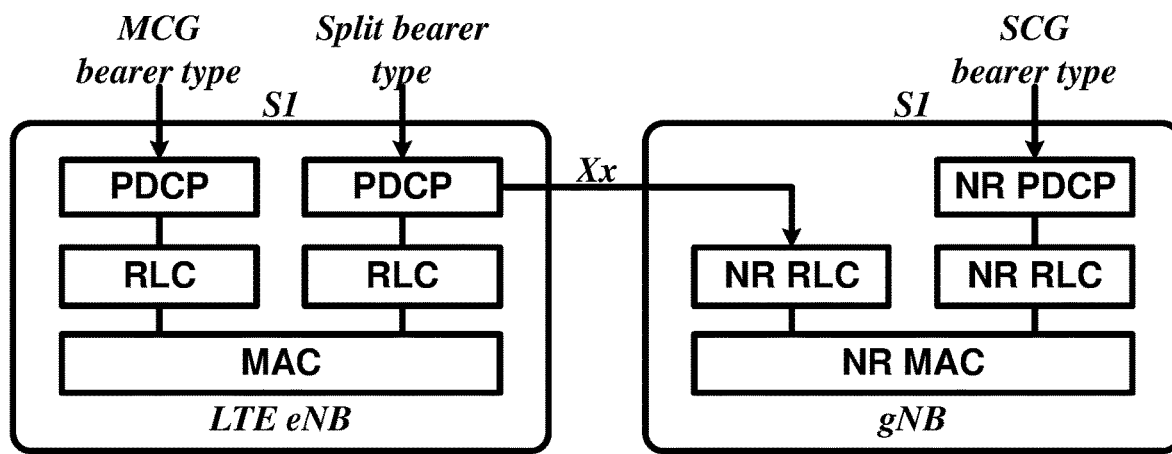
FIG. 12A, FIG. 12B, and FIG. 12C are example diagrams for radio protocol structures of tight interworking bearers as per an aspect of an embodiment of the present disclosure.
Figure 12B:
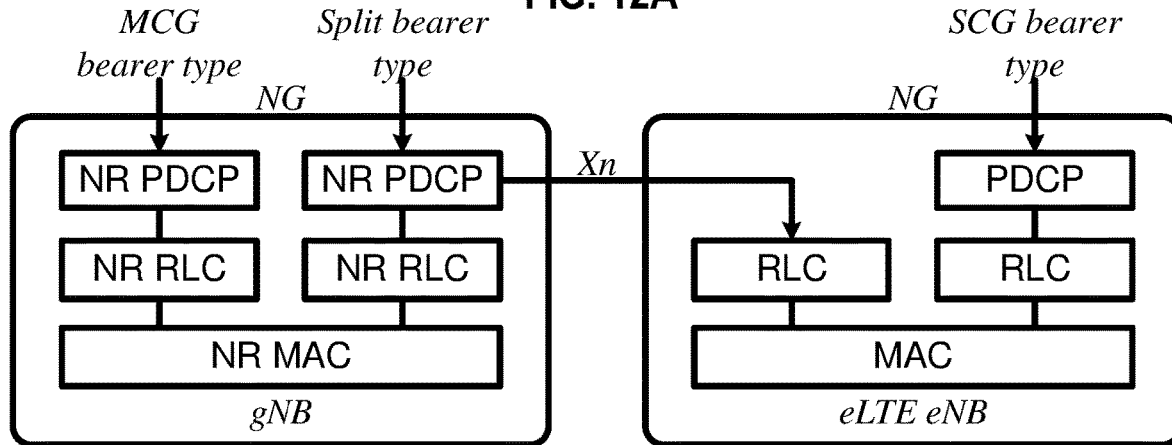
Figure 12C:
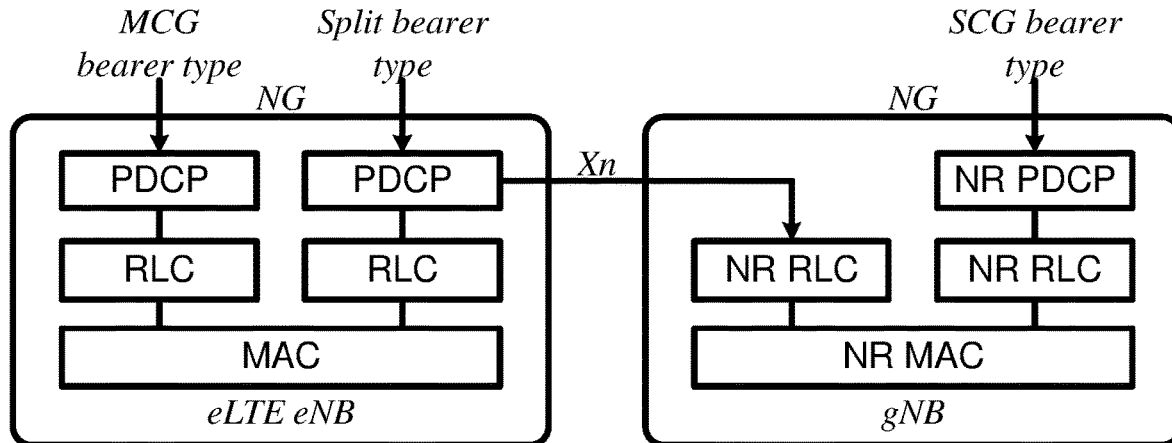

FIG. 12A, FIG. 12B, and FIG. 12C are example diagrams for radio protocol structures of tight interworking bearers as per an aspect of an embodiment of the present invention. In FIG. 12A, an LTE eNB may be a master base station, and a gNB may be a secondary base station. In FIG. 12B, a gNB may be a master base station, and an eLTE eNB may be a secondary base station. In FIG. 12C, an eLTE eNB may be a master base station, and a gNB may be a secondary base station. In 5G network, the radio protocol architecture that a particular bearer uses may depend on how the bearer is setup. Three alternatives may exist, an MCG bearer, an SCG bearer, and a split bearer as shown in FIG. 12A, FIG. 12B, and FIG. 12C. NR RRC may be located in master base station, and SRBs may be configured as an MCG bearer type and may use the radio resources of the master base station. Tight interworking may also be described as having at least one bearer configured to use radio resources provided by the secondary base station. Tight interworking may or may not be configured/implemented in example embodiments of the invention.

In the case of tight interworking, the UE may be configured with two MAC entities: one MAC entity for master base station, and one MAC entity for secondary base station. In tight interworking, the configured set of serving cells for a UE may comprise of two subsets: the Master Cell Group (MCG) containing the serving cells of the master base station, and the Secondary Cell Group (SCG) containing the serving cells of the secondary base station. For a SCG, one or more of the following may be applied: at least one cell in the SCG has a configured UL CC and one of them, named PSCell (or PCell of SCG, or sometimes called PCell), is configured with PUCCH resources; when the SCG is configured, there may be at least one SCG bearer or one split bearer; upon detection of a physical layer problem or a random access problem on a PSCell, or the maximum number of (NR) RLC retransmissions has been reached associated with the SCG, or upon detection of an access problem on a PSCell during a SCG addition or a SCG change: a RRC connection re-establishment procedure may not be triggered, UL transmissions towards cells of the SCG are stopped, a master base station may be informed by the UE of a SCG failure type, for split bearer, the DL data transfer over the master base station is maintained; the RLC AM bearer may be configured for the split bearer; like PCell, PSCell may not be de-activated; PSCell may be changed with a SCG change (e.g. with security key change and a RACH procedure); and/or neither a direct bearer type change between a Split bearer and a SCG bearer nor simultaneous configuration of a SCG and a Split bearer are supported.

With respect to the interaction between a master base station and a secondary base station, one or more of the following principles may be applied: the master base station may maintain the RRM measurement configuration of the UE and may, (e.g, based on received measurement reports, traffic conditions, or bearer types), decide to ask a secondary base station to provide additional resources (serving cells) for a UE; upon receiving a request from the master base station, a secondary base station may create a container that may result in the configuration of additional serving cells for the UE (or decide that it has no resource available to do so); for UE capability coordination, the master base station may provide (part of) the AS configuration and the UE capabilities to the secondary base station; the master base station and the secondary base station may exchange information about a UE configuration by employing of RRC containers (inter-node messages) carried in Xn or Xx messages; the secondary base station may initiate a reconfiguration of its existing serving cells (e.g., PUCCH towards the secondary base station); the secondary base station may decide which cell is the PSCell within the SCG; the master base station may not change the content of the RRC configuration provided by the secondary base station; in the case of a SCG addition and a SCG SCell addition, the master base station may provide the latest measurement results for the SCG cell(s); both a master base station and a secondary base station may know the SFN and subframe offset of each other by OAM, (e.g., for the purpose of DRX alignment and identification of a measurement gap). In an example, when adding a new SCG SCell, dedicated RRC signaling may be used for sending required system information of the cell as for CA, except for the SFN acquired from a MIB of the PSCell of a SCG.

Figure 13A:
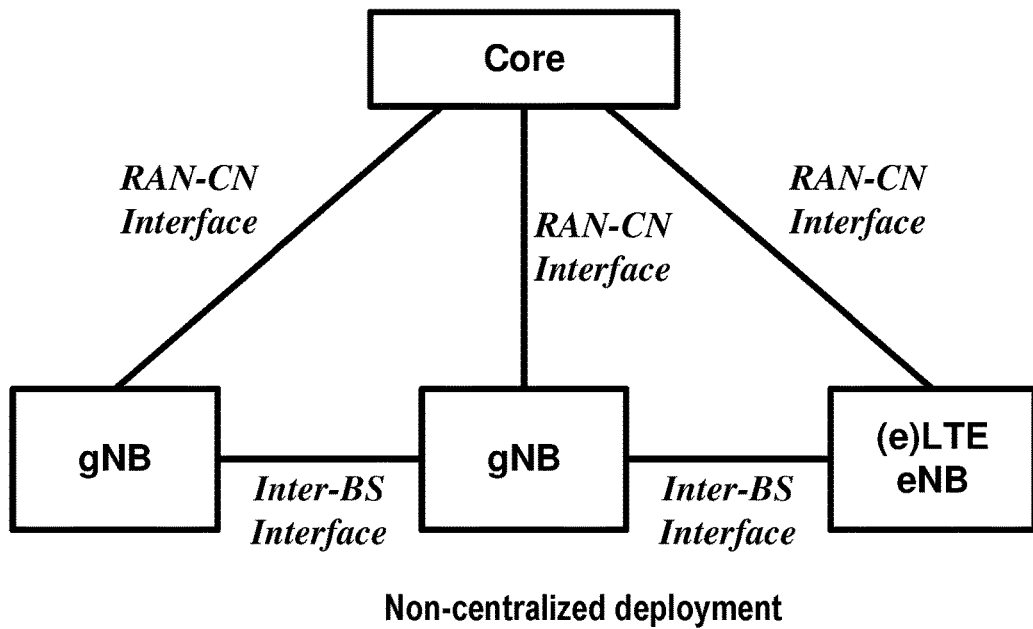
FIG. 13A and FIG. 13B are example diagrams for gNB deployment scenarios as per an aspect of an embodiment of the present disclosure.
Figure 13B:
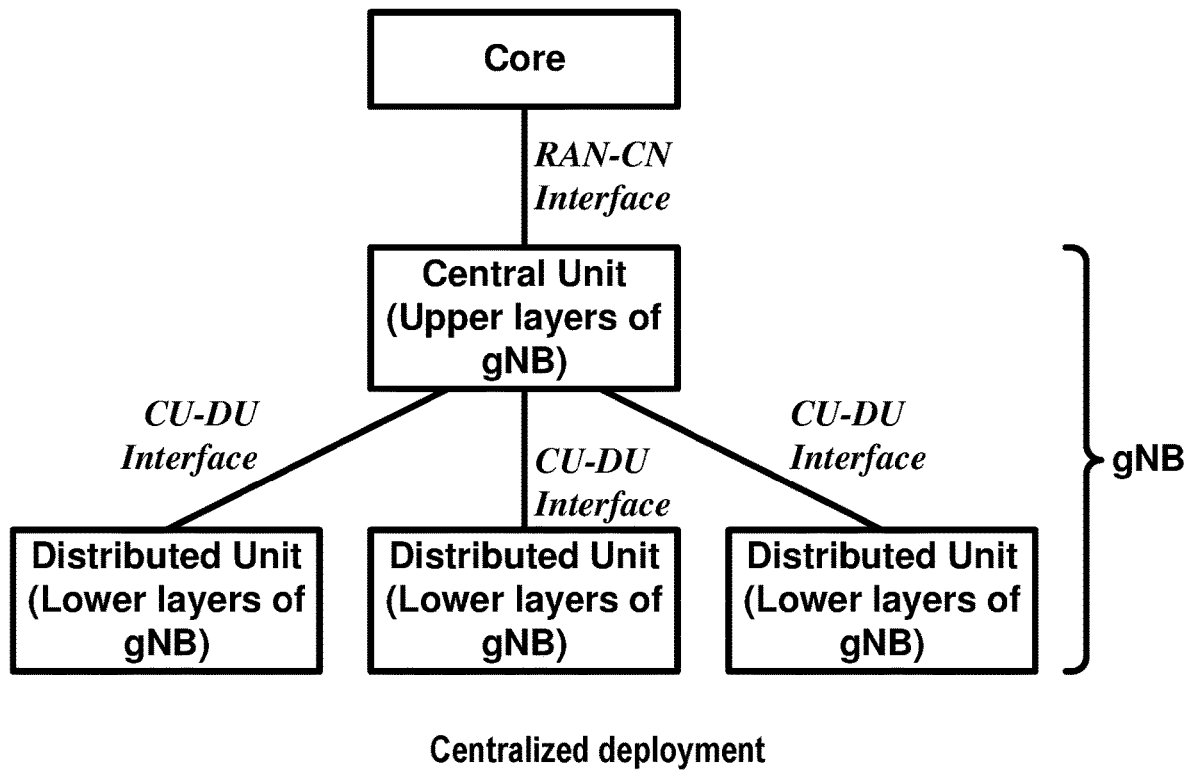

FIG. 13A and FIG. 13B are example diagrams for gNB deployment scenarios as per an aspect of an embodiment of the present invention. In the non-centralized deployment scenario in FIG. 13A, the full protocol stack (e.g. NR RRC, NR PDCP, NR RLC, NR MAC, and NR PHY) may be supported at one node. In the centralized deployment scenario in FIG. 13B, upper layers of gNB may be located in a Central Unit (CU), and lower layers of gNB may be located in Distributed Units (DU). The CU-DU interface (e.g. Fs interface) connecting CU and DU may be ideal or non-ideal. Fs-C may provide a control plane connection over Fs interface, and Fs-U may provide a user plane connection over Fs interface. In the centralized deployment, different functional split options between CU and DUs may be possible by locating different protocol layers (RAN functions) in CU and DU. The functional split may support flexibility to move RAN functions between CU and DU depending on service requirements and/or network environments. The functional split option may change during operation after Fs interface setup procedure, or may change only in Fs setup procedure (i.e. static during operation after Fs setup procedure).

Figure 14:
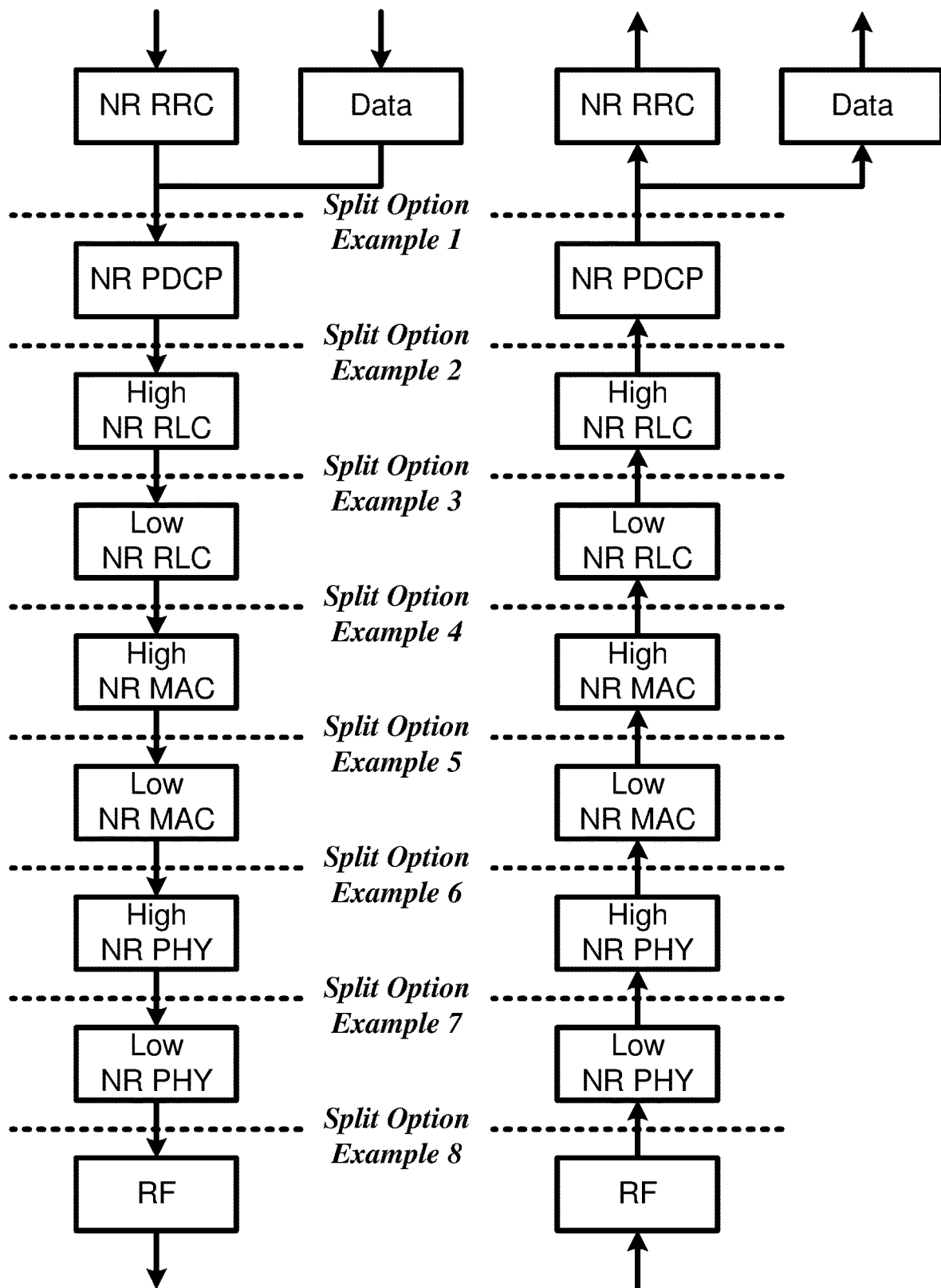
FIG. 14 is an example diagram for functional split option examples of the centralized gNB deployment scenario as per an aspect of an embodiment of the present disclosure.

FIG. 14 is an example diagram for different functional split option examples of the centralized gNB deployment scenario as per an aspect of an embodiment of the present invention. In the split option example 1, an NR RRC may be in CU, and NR PDCP, NR RLC, NR MAC, NR PHY, and RF may be in DU. In the split option example 2, an NR RRC and NR PDCP may be in CU, and NR RLC, NR MAC, NR PHY, and RF may be in DU. In the split option example 3, an NR RRC, NR PDCP, and partial function of NR RLC may be in CU, and the other partial function of NR RLC, NR MAC, NR PHY, and RF may be in DU. In the split option example 4, an NR RRC, NR PDCP, and NR RLC may be in CU, and NR MAC, NR PHY, and RF may be in DU. In the split option example 5, an NR RRC, NR PDCP, NR RLC, and partial function of NR MAC may be in CU, and the other partial function of NR MAC, NR PHY, and RF may be in DU. In the split option example 6, an NR RRC, NR PDCP, NR RLC, and NR MAC may be in CU, and NR PHY and RF may be in DU. In the split option example 7, an NR RRC, NR PDCP, NR RLC, NR MAC, and partial function of NR PHY may be in CU, and the other partial function of NR PHY and RF may be in DU. In the split option example 8, an NR RRC, NR PDCP, NR RLC, NR MAC, and NR PHY may be in CU, and RF may be in DU.

The functional split may be configured per CU, per DU, per UE, per bearer, per slice, or with other granularities. In per CU split, a CU may have a fixed split, and DUs may be configured to match the split option of CU. In per DU split, each DU may be configured with a different split, and a CU may provide different split options for different DUs. In per UE split, a gNB (CU and DU) may provide different split options for different UEs. In per bearer split, different split options may be utilized for different bearer types. In per slice splice, different split options may be applied for different slices.

In an example embodiment, the new radio access network (new RAN) may support different network slices, which may allow differentiated treatment customized to support different service requirements with end to end scope. The new RAN may provide a differentiated handling of traffic for different network slices that may be pre-configured, and may allow a single RAN node to support multiple slices. The new RAN may support selection of a RAN part for a given network slice, by one or more slice ID(s) or NSSAI(s) provided by a UE or a NGC (e.g. NG CP). The slice ID(s) or NSSAI(s) may identify one or more of pre-configured network slices in a PLMN. For initial attach, a UE may provide a slice ID and/or an NSSAI, and a RAN node (e.g. gNB) may use the slice ID or the NSSAI for routing an initial NAS signaling to an NGC control plane function (e.g. NG CP). If a UE does not provide any slice ID or NSSAI, a RAN node may send a NAS signaling to a default NGC control plane function. For subsequent accesses, the UE may provide a temporary ID for a slice identification, which may be assigned by the NGC control plane function, to enable a RAN node to route the NAS message to a relevant NGC control plane function. The new RAN may support resource isolation between slices. The RAN resource isolation may be achieved by avoiding that shortage of shared resources in one slice breaks a service level agreement for another slice.

The amount of data traffic carried over cellular networks is expected to increase for many years to come. The number of users/devices is increasing and each user/device accesses an increasing number and variety of services, e.g. video delivery, large files, images. This requires not only high capacity in the network, but also provisioning very high data rates to meet customers' expectations on interactivity and responsiveness. More spectrum is therefore needed for cellular operators to meet the increasing demand. Considering user expectations of high data rates along with seamless mobility, it is beneficial that more spectrum be made available for deploying macro cells as well as small cells for cellular systems.

Striving to meet the market demands, there has been increasing interest from operators in deploying some complementary access utilizing unlicensed spectrum to meet the traffic growth. This is exemplified by the large number of operator-deployed Wi-Fi networks and the 3GPP standardization of LTE/WLAN interworking solutions. This interest indicates that unlicensed spectrum, when present, can be an effective complement to licensed spectrum for cellular operators to help addressing the traffic explosion in some scenarios, such as hotspot areas. LAA offers an alternative for operators to make use of unlicensed spectrum while managing one radio network, thus offering new possibilities for optimizing the network's efficiency.

In an example embodiment, Listen-before-talk (clear channel assessment) may be implemented for transmission in an LAA cell. In a listen-before-talk (LBT) procedure, equipment may apply a clear channel assessment (CCA) check before using the channel. For example, the CCA utilizes at least energy detection to determine the presence or absence of other signals on a channel in order to determine if a channel is occupied or clear, respectively. For example, European and Japanese regulations mandate the usage of LBT in the unlicensed bands. Apart from regulatory requirements, carrier sensing via LBT may be one way for fair sharing of the unlicensed spectrum.

In an example embodiment, discontinuous transmission on an unlicensed carrier with limited maximum transmission duration may be enabled. Some of these functions may be supported by one or more signals to be transmitted from the beginning of a discontinuous LAA downlink transmission. Channel reservation may be enabled by the transmission of signals, by an LAA node, after gaining channel access via a successful LBT operation, so that other nodes that receive the transmitted signal with energy above a certain threshold sense the channel to be occupied. Functions that may need to be supported by one or more signals for LAA operation with discontinuous downlink transmission may include one or more of the following: detection of the LAA downlink transmission (including cell identification) by UEs; time & frequency synchronization of UEs.

In an example embodiment, DL LAA design may employ subframe boundary alignment according to LTE-A carrier aggregation timing relationships across serving cells aggregated by CA. This may not imply that the eNB transmissions can start only at the subframe boundary. LAA may support transmitting PDSCH when not all OFDM symbols are available for transmission in a subframe according to LBT. Delivery of necessary control information for the PDSCH may also be supported.

LBT procedure may be employed for fair and friendly coexistence of LAA with other operators and technologies operating in unlicensed spectrum. LBT procedures on a node attempting to transmit on a carrier in unlicensed spectrum require the node to perform a clear channel assessment to determine if the channel is free for use. An LBT procedure may involve at least energy detection to determine if the channel is being used. For example, regulatory requirements in some regions, e.g., in Europe, specify an energy detection threshold such that if a node receives energy greater than this threshold, the node assumes that the channel is not free. While nodes may follow such regulatory requirements, a node may optionally use a lower threshold for energy detection than that specified by regulatory requirements. In an example, LAA may employ a mechanism to adaptively change the energy detection threshold, e.g., LAA may employ a mechanism to adaptively lower the energy detection threshold from an upper bound. Adaptation mechanism may not preclude static or semi-static setting of the threshold. In an example Category 4 LBT mechanism or other type of LBT mechanisms may be implemented.

Various example LBT mechanisms may be implemented. In an example, for some signals, in some implementation scenarios, in some situations, and/or in some frequencies no LBT procedure may performed by the transmitting entity. In an example, Category 2 (e.g. LBT without random back-off) may be implemented. The duration of time that the channel is sensed to be idle before the transmitting entity transmits may be deterministic. In an example, Category 3 (e.g. LBT with random back-off with a contention window of fixed size) may be implemented. The LBT procedure may have the following procedure as one of its components. The transmitting entity may draw a random number N within a contention window. The size of the contention window may be specified by the minimum and maximum value of N. The size of the contention window may be fixed. The random number N may be employed in the LBT procedure to determine the duration of time that the channel is sensed to be idle before the transmitting entity transmits on the channel. In an example, Category 4 (e.g. LBT with random back-off with a contention window of variable size) may be implemented. The transmitting entity may draw a random number N within a contention window. The size of contention window may be specified by the minimum and maximum value of N. The transmitting entity may vary the size of the contention window when drawing the random number N. The random number N is used in the LBT procedure to determine the duration of time that the channel is sensed to be idle before the transmitting entity transmits on the channel.

LAA may employ uplink LBT at the UE. The UL LBT scheme may be different from the DL LBT scheme (e.g. by using different LBT mechanisms or parameters) for example, since the LAA UL is based on scheduled access which affects a UE's channel contention opportunities. Other considerations motivating a different UL LBT scheme include, but are not limited to, multiplexing of multiple UEs in a single subframe.

In an example, a DL transmission burst may be a continuous transmission from a DL transmitting node with no transmission immediately before or after from the same node on the same CC. An UL transmission burst from a UE perspective may be a continuous transmission from a UE with no transmission immediately before or after from the same UE on the same CC. In an example, UL transmission burst is defined from a UE perspective. In an example, an UL transmission burst may be defined from an eNB perspective. In an example, in case of an eNB operating DL+UL LAA over the same unlicensed carrier, DL transmission burst(s) and UL transmission burst(s) on LAA may be scheduled in a TDM manner over the same unlicensed carrier. For example, an instant in time may be part of a DL transmission burst or an UL transmission burst.

Figure 15:
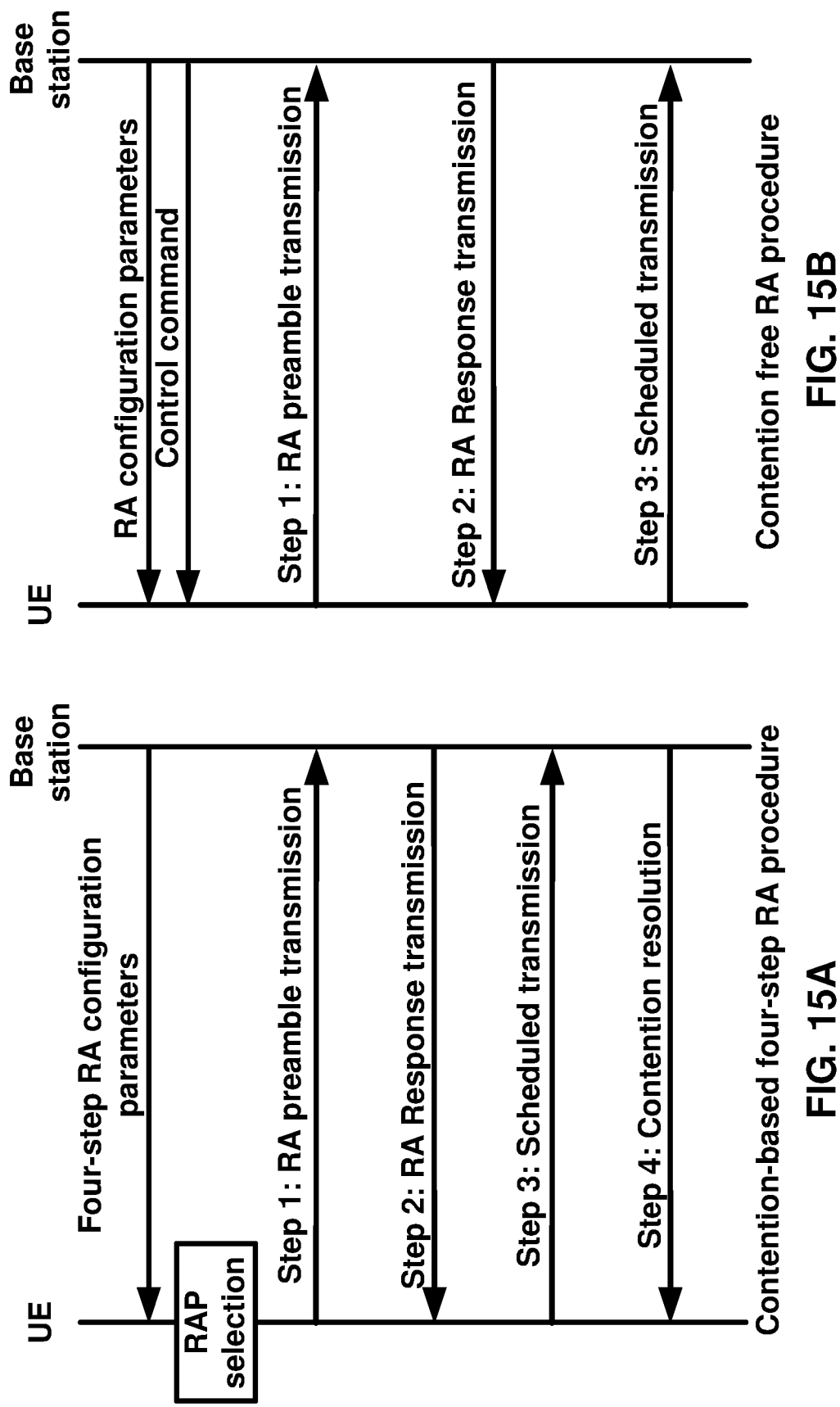
FIG. 15A and FIG. 15B are example diagrams for a contention-based four-step RA procedure and contention free RA procedure as per an aspect of an embodiment of the present disclosure.

A four-step random access (RA) procedure may comprise RA preamble (RAP) transmission in the first step, random access response (RAR) transmission in the second step, scheduled transmission of one or more transport blocks (TBs) in the third step, and contention resolution in the fourth step as illustrated in FIG. 15A. For contention-free RA, the first two steps, the RAP and RAR transmissions, may be implemented. Contention resolution may not be implemented due to a dedicated RA preamble as illustrated in FIG. 15B.

In the first step, a wireless device may transmit a RAP using a configured RA preamble format with a single particular Tx beam. RA channel (RACH) resource may be defined as a time-frequency resource to transmit a RAP. Broadcast system information may inform whether a wireless device needs to transmit one or multiple/repeated preamble within a subset of RACH resources.

A base station may configure an association between DL signal/channel, and a subset of RACH resources and/or a subset of RAP indices, for determining the downlink (DL) transmission in the second step. Based on the DL measurement and the corresponding association, a wireless device may select the subset of RACH resources and/or the subset of RAP indices. In an example, there may be two RAP groups informed by broadcast system information and one may be optional. If a base station configures the two groups in the four-step RA procedure, a wireless device may use a size of the message transmitted by the wireless device in the third step and the pathloss to determine which group the wireless device selects a RAP. A base station may use a group type to which a RAP belongs as an indication of the message size in the third step and the radio conditions at a wireless device. A base station may broadcast the RAP grouping information along with one or more thresholds on system information.

If a UE has been requested to perform a contention-free RA, for example for handover to a new cell, the preamble to use may be explicitly indicated from the base station. To avoid collisions, the base station may select the contention-free preamble from sequences outside the two subsets used for contention-based random access.

In the second step of the four-step RA procedure, a base station may transmit a RA response (RAR) to the wireless device in response to reception of a RAP that the wireless device transmits. A wireless device may monitor the physical-layer downlink control channel for RARs identified by the RA-RNTI in a RA Response window which may starts at the subframe that contains the end of a RAP transmission plus three subframes and has length ra-ResponseWindowSize. A wireless device may compute the RA-RNTI associated with the PRACH in which the wireless device transmits a RAP as:

$$RA\text{-}RNTI = 1 + t\_id + 10 * f\_id$$

where t_id is the index of the first subframe of the specified PRACH ($0 \leq t\_id < 10$), and f_id is the index of the specified PRACH within that subframe, in ascending order of frequency domain (0≤f_id<6) except for NB-IoT UEs, BL UEs or UEs in enhanced coverage. In an example, different types of UEs, e.g. NB-IoT, BL-UE, and/or a UE in enhanced coverage may employ different formulas for RA-RNTI calculations.

For BL UEs and UEs in enhanced coverage, RA-RNTI associated with the PRACH in which the Random Access Preamble is transmitted, may be computed as:

$$RA\text{-}RNTI = 1 + t\_id + 10 * f\_id + 60 * (SFN\_id \bmod(W\max/10))$$

where t_id is the index of the first subframe of the specified PRACH (0≤t_id<10), f_id is the index of the specified PRACH within that subframe, in ascending order of frequency domain (0≤f_id<6), SFN_id is the index of the first radio frame of the specified PRACH, and Wmax is 400, maximum possible RAR window size in subframes for BL UEs or UEs in enhanced coverage.

For NB-IoT UEs, the RA-RNTI associated with the PRACH in which the Random Access Preamble is transmitted, may be computed as:

$$RA\text{-}RNTI = 1 + \operatorname{floor}(SFN\_id/4)$$

where SFN_id is the index of the first radio frame of the specified PRACH.

Figure 16:
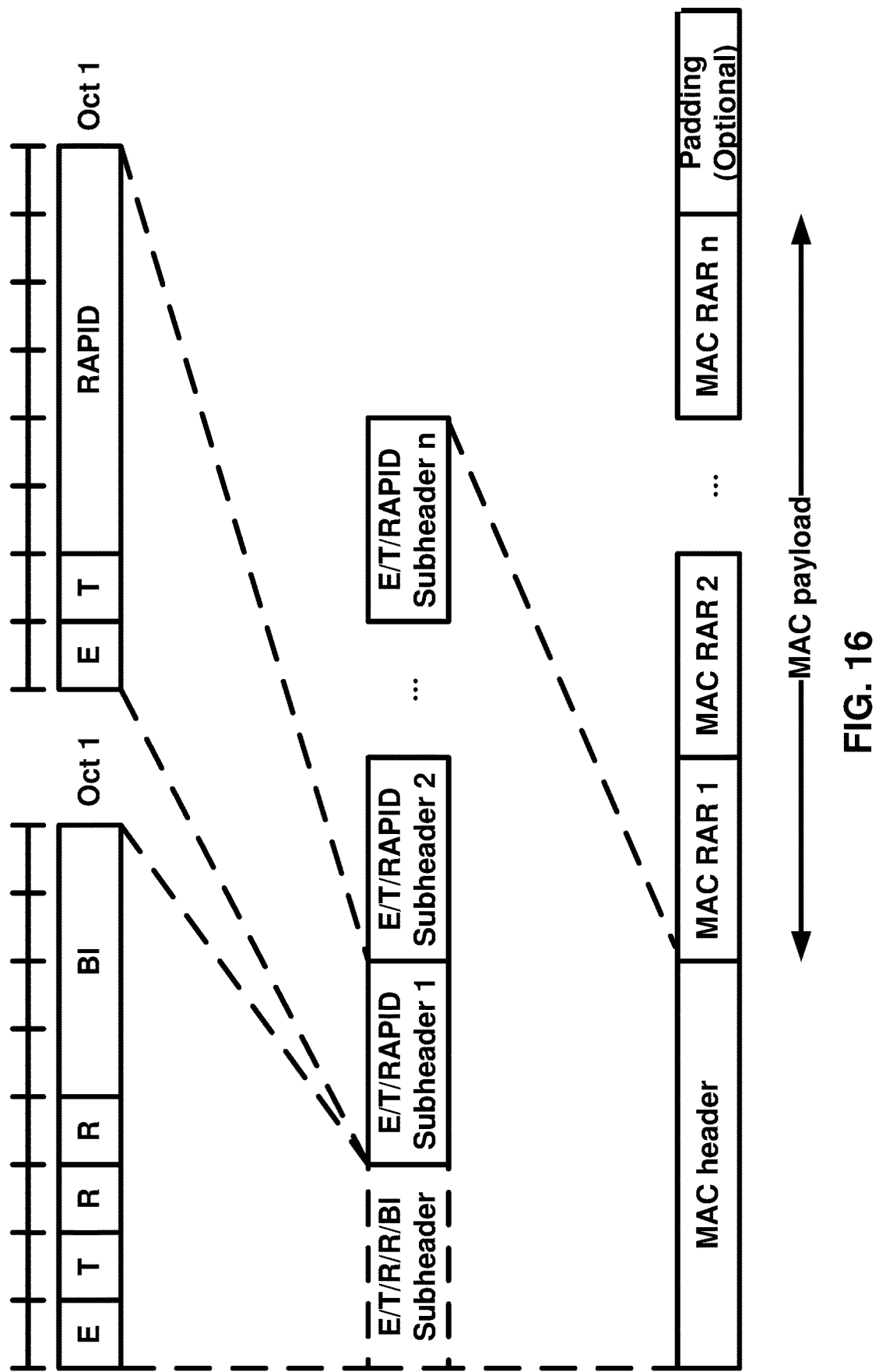
FIG. 16 is an example diagram for a MAC PDU format as per an aspect of an embodiment of the present disclosure.

A wireless device may stop monitoring for RAR(s) after decoding of a MAC packet data unit (PDU) for RAR comprising a RAP identifier (RAPID) that matches the RAP transmitted by the wireless device. The MAC PDU may comprise one or more MAC RARs and a MAC header that may comprise a subheader having a backoff indicator (BI) and one or more subheader that comprises RAPIDs. FIG. 16 illustrates an example of a MAC PDU comprising a MAC header and MAC RARs for four-step RA procedure. If a RAR comprises a RAPID corresponding to a RAP that a wireless device transmits, the wireless device may process the data, such as a timing advance (TA) command, a UL grant, and a Temporary C-RNTI (TC-RNTI), in the RAR.

Figures 17A, 17B, 17C:
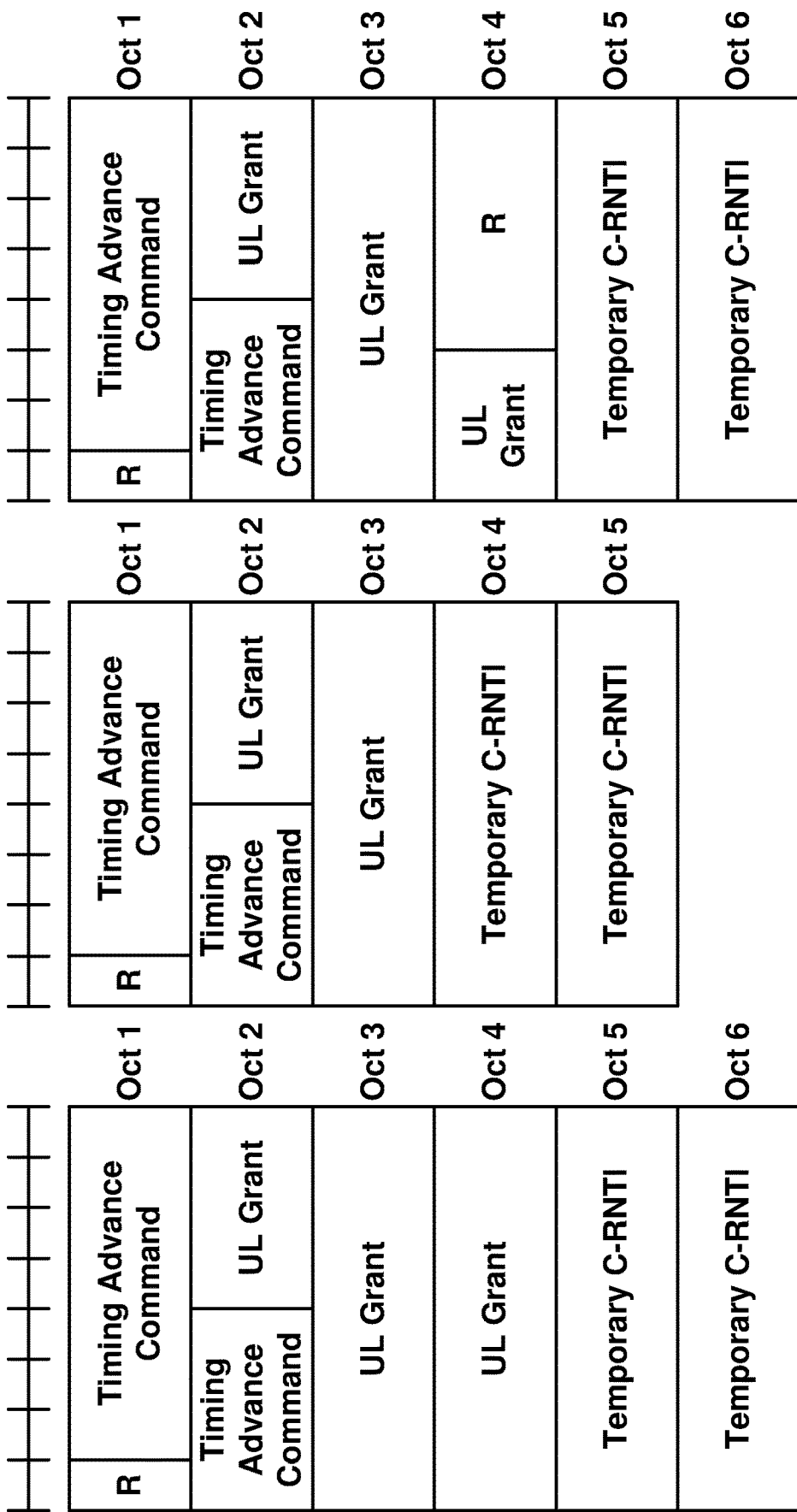
FIG. 17A, FIG. 17B, and FIG. 17C are example diagrams for MAC RAR formats as per an aspect of an embodiment of the present disclosure.

FIG. 17A, FIG. 17B, and FIG. 17C illustrate examples of MAC RAR comprising a timing advanced command, a UL grant, and a TC-RNTI.

If contention-free random access using a dedicated preamble is used, then this second step may be the last step of RA procedure. There may be no need to handle contention and/or the UE already may have a unique identity allocated in the form of a C-RNTI.

In the third step of the four-step RA procedure, a wireless may adjust UL time alignment by using the TA value corresponding to the TA command in the received RAR in the second step and may transmit the one or more TBs to a base station using the UL resources assigned in the UL grant in the received RAR. The TBs that a wireless device transmits in the third step may comprise RRC signaling, such as RRC connection request, RRC connection Re-establishment request, or RRC connection resume request, and a wireless device identity, as the identity is used as part of the contention-resolution mechanism in the fourth step.

The fourth step in the four-step RA procedure may comprise a DL message for contention resolution. From the second step, one or more wireless devices may perform simultaneous RA attempts using the same RAP in the first step, receive the same RAR with the same TC-RNTI in the second step. The contention resolution in the fourth step may be to ensure that a wireless device does not incorrectly use another wireless device Identity. The contention resolution mechanism may be based on either C-RNTI on PDCCH or Contention Resolution Identity on DL-SCH depending on whether a wireless device has a C-RNTI or not. If a wireless device has C-RNTI, upon detection of C-RNTI on the PDCCH, the wireless device may determine the success of RA procedure. If a wireless device does not have C-RNTI pre-assigned, the wireless device may monitor DL-SCH associated with TC-RNTI that a base station transmits in a RAR of the second step and compare the identity in the data transmitted by the base station on DL-SCH in the fourth step with the identity that the wireless device transmits in the third step. If the two identities are identical, the wireless device may determine the success of RA procedure and promote the TC-RNTI to the C-RNTI. The forth step in the four-step RA procedure may allow HARQ retransmission. A wireless device may start mac-ContentionResolutionTimer when the wireless device transmits one or more TBs to a base station in the third step and may restart mac-ContentionResolutionTimer at a HARQ retransmission. When a wireless device receives data on the DL resources identified by C-RNTI or TC-RNTI in the fourth step, the wireless device may stop the mac-ContentionResolutionTimer. If the wireless device does not detect the contention resolution identity that matches to the identity transmitted by the wireless device in the third step, the wireless device may determine the failure of RA procedure and discard the TC-RNTI. If mac-ContentionResolutionTimer expires, the wireless device may determine the failure of RA procedure and discard the TC-RNTI. If the contention resolution is failed, a wireless device may flush the HARQ buffer used for transmission of the MAC PDU and may restart the four-step RA procedure from the first step. The wireless device may delay the subsequent RAP transmission by the backoff time randomly selected according to a uniform distribution between 0 and the backoff parameter value corresponding the BI in the MAC PDU for RAR.

In a four-step RA procedure, the usage of the first two steps may be to obtain UL time alignment for a wireless device and obtain an uplink grant. The UL time alignment may not be necessary in one or more scenarios. For example, in small cells or for stationary wireless devices, the process for acquiring the UL time alignment may not be necessary if either a TA equal to zero may be sufficient (e.g., small cells) or a stored TA value from the last RA may serve for the current RA (stationary wireless device). For the case that a wireless device may be in RRC connected with a valid TA value and no resource configured for UL transmission, the UL time alignment may not be necessary when the wireless device needs to obtain an UL grant.

A NR (New Radio) may support both single beam and multi-beam operations. In a multi-beam system, gNB may need a downlink beam sweep to provide coverage for DL synchronization signals (SSs) and common control channels. To enable UEs to access the cell, the UEs may need the similar sweep for UL direction as well.

In the single beam scenarios, the network may configure time-repetition within one synchronization signal (SS) block, which may comprise at least PSS (Primary synchronization signal), SSS (Secondary synchronization signal), and PBCH (Physical broadcast channel), in a wide beam. In multi-beam scenarios, the network may configure at least some of these signals and physical channels (e.g. SS Block) in multiple beams such that a UE identifies at least OFDM symbol index, slot index in a radio frame and radio frame number from an SS block.

Figure 18:
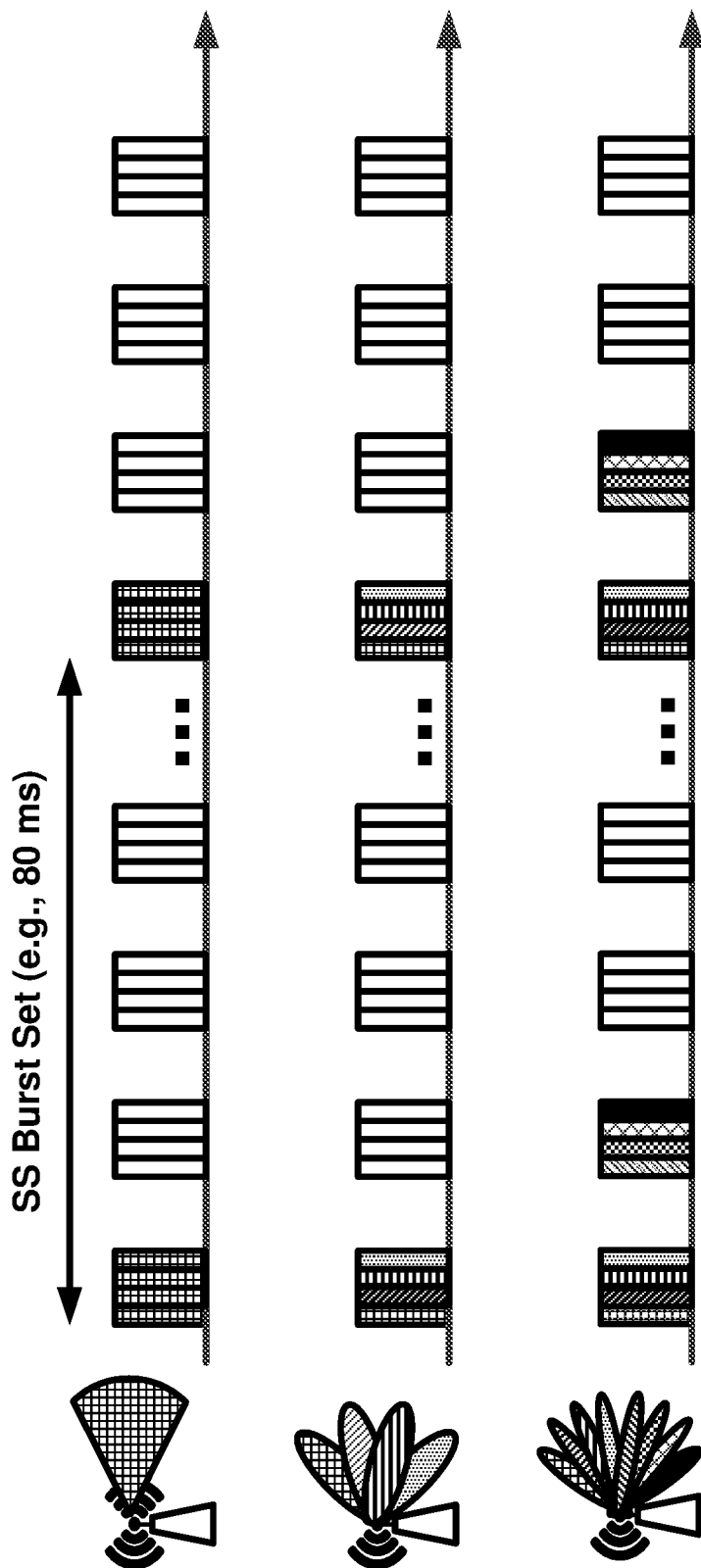
FIG. 18 is an example diagram for different configurations of an SS Burst Set as per an aspect of an embodiment of the present disclosure.

An RRC_INACTIVE or RRC_IDLE UE may need to assume that an SS Block may form an SS Block Set and, an SS Block Set Burst, having a given periodicity. In multi-beam scenarios, the SS Block may be transmitted in multiple beams, together forming an SS Burst. If multiple SS Bursts are needed to transmit beams, these SS Bursts together may form an SS Burst Set as illustrated in FIG. 18.

In the multi-beam scenario, for the same cell, PSS/SSS/PBCH may be repeated to support cell selection/reselection and initial access procedures. There may be some differences in the conveyed PRACH configuration implied by the TSS (Tertiary synchronization signal) on a beam basis within an SS Burst. Under the assumption that PBCH carries the PRACH configuration, a gNB may broadcast PRACH configurations possibly per beam where the TSS may be utilized to imply the PRACH configuration differences.

In an example, the base station may transmit to a wireless device one or more messages comprising configuration parameters of one or more cells. The configuration parameters may comprise parameters of a plurality of CSI-RS signal format and/or resources. Configuration parameters of a CSI-RS may comprise one or more parameters indicating CSI-RS periodicity, one or more parameters indicating CSI-RS subcarriers (e.g. resource elements), one or more parameters indicating CSI-RS sequence, and/or other parameters. Some of the parameters may be combined into one or more parameters. A plurality of CSI-RS signals may be configured. In an example, the one or more message may indicate the correspondence between SS blocks and CSI-RS signals. The one or more messages may be RRC connection setup message, RRC connection resume message, and/or RRC connection reconfiguration message. In an example, a UE in RRC-Idle mode may not be configured with CSI-RS signals and may receive SS blocks and may measure a pathloss based on SS signals. A UE in RRC-connected mode, may be configured with CSI-RS signals and may be measure pathloss based on CSI-RS signals. In an example, a UE in RRC inactive mode may measure the pathloss based on SS blocks, e.g. when the UE moves to a different base station that has a different CSI-RS configuration compared with the anchor base station.

Figure 19:
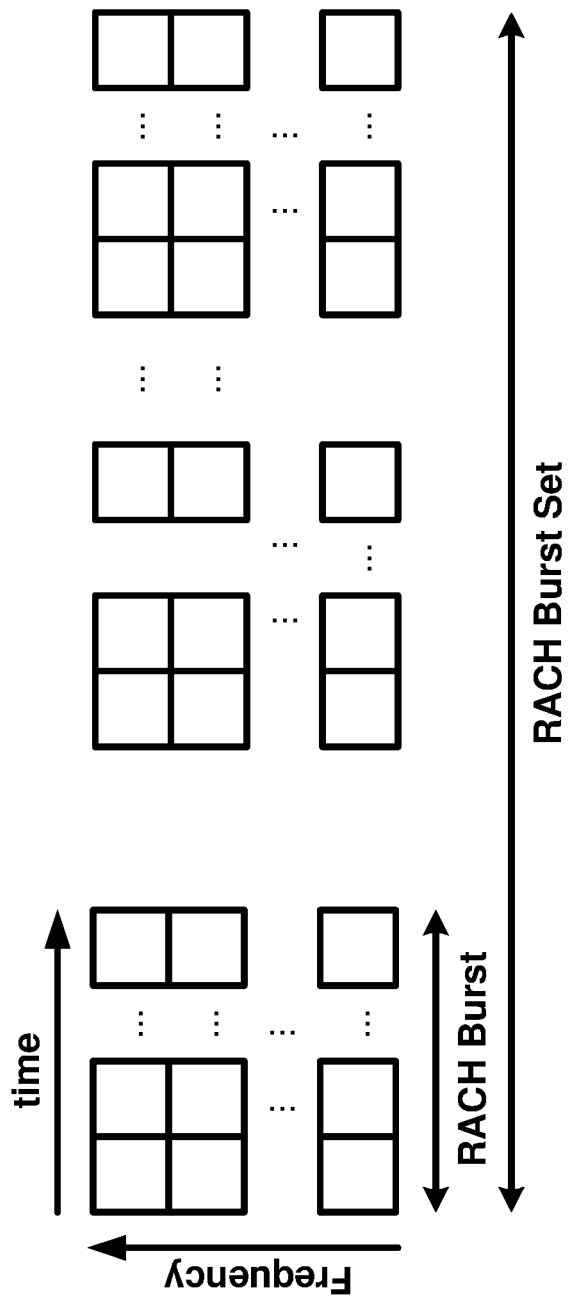
FIG. 19 is an example diagram for a RACH Occasion, a RACH Burst and a RACH Burst Set as per an aspect of an embodiment of the present disclosure.

In a multi-beam system, a NR may configure different types of PRACH resources that may be associated with SS blocks and/or DL beams. In NR, a PRACH transmission occasion may be defined as the time-frequency resource on which a UE transmits a preamble using the configured PRACH preamble format with a single particular Tx beam and for which gNB performs PRACH preamble detection. One PRACH occasion may be used to cover the beam non-correspondence case. gNB may perform RX sweep during PRACH occasion as UE TX beam alignment is fixed during single occasion. A PRACH burst may mean a set of PRACH occasions allocated consecutively in time domain, and a PRACH burst set may mean a set of PRACH bursts to enable full RX sweep. FIG. 19 illustrates an example of configured PRACH occasion, PRACH burst, and PRACH burst set.

There may be an association between SS blocks (DL signal/channel) and PRACH occasion and a subset of PRACH preamble resources. One PRACH occasion may comprise a set of preambles. In multi beam operation, the gNB may need to know which beam or set of beams it may use to send RAR and the preambles may be used to indicate that. NR may configure following partitioning and mappings in multi beam operation:

The timing from SS block to the PRACH resource may be indicated in the MIB. In an example, different TSS may be used for different timings such that the detected sequence within TSS indicates the PRACH resource. This PRACH configuration may be specified as a timing relative to the SS block, and may be given as a combination of the payload in the MIB and another broadcasted system information.

Association between SS block and a subset of RACH resources and/or a subset of preamble indices may be configured so that TRP may identify the best DL beam for a UE according to resource location or preamble index of received preamble. An association may be independent and at least either a subset of RACH resources or subset of preamble indices may not be allowed to be associated with multiple SS blocks.

PRACH resources may be partitioned on SS-blocks basis in multiple beams operation. There may be one to one and/or many to one mapping between SS-blocks and PRACH occasions. FIG. 20A, FIG. 20B, and FIG. 20C illustrate examples of TDD (FIG. 20A)/FDD (FIG. 20B) based one to one mapping and multi-to-one mapping (FIG. 20C) between SS-blocks and PRACH occasions.

UE may detect SS-block based on DL synchronization signals and differentiate SS-blocks based on the time index. With one-to-one mapping of beam or beams used to transmit SS-block and a specific PRACH occasion, the transmission of PRACH preamble resource may be an indication informed by a UE to gNB of the preferred SS-block. This way the PRACH preamble resources of single PRACH occasion may correspond to specific SS-block and mapping may be done based on the SS-block index. There may be one to one mapping between an SS-block beam and a PRACH occasion. There may not be such mapping for the SS-block periodicity and RACH occasion periodicity.

Depending on the gNB capability (e.g. the used beamforming architecture), there may not be one to one mapping between single SS-block and single RACH occasion. In case beam or beams used for transmitting SS-block and receiving during RACH occasion do not correspond directly, e.g., gNB may form receive beams that cover multiple SS-blocks beams, the preambles of PRACH occasion may be divided between the different SS-blocks in a manner that a subset of PRACH preambles map to specific SS-block.

With beam-specific PRACH resources, a gNB DL TX beam may be associated with a subset of preambles. The beam specific PRACH preambles resources may be associated with DL TX beams that are identified by periodical beam and cell specific CSI-RS for L3 Mobility (same signals may be used for L2 beam management/intra-cell mobility as well). A UE may detect the beams without RRC configuration, e.g., reading the beam configuration from minimum SI (MIB/SIB).

Figure 21B:
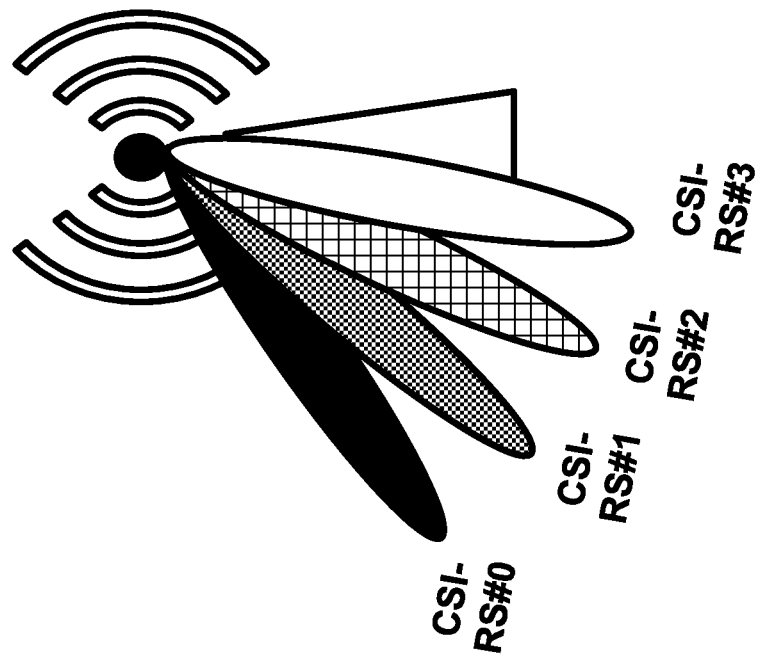
FIG. 21A and FIG. 21B are example diagrams for an association between SS block and one or more CSI-RSs as per an aspect of an embodiment of the present disclosure.
Figure 21A:
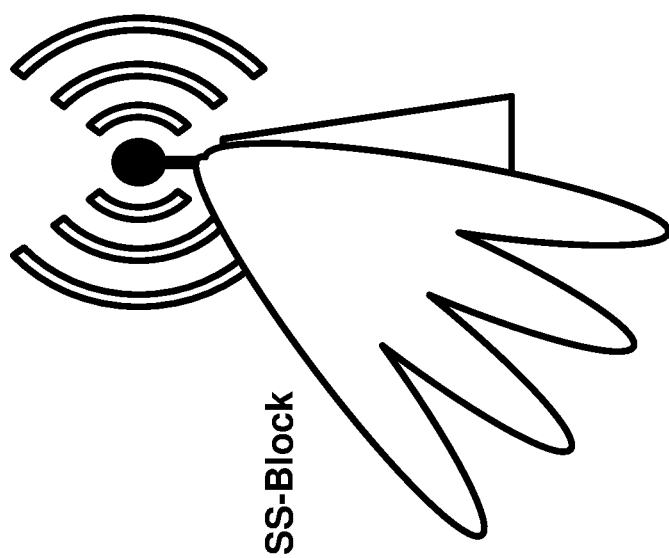

The PRACH resource mapping to specific beams may use SS-block association. Specific beams may be associated with the beams used for transmitting SS-block as illustrated in FIG. 21A and FIG. 21B. In FIG. 21A, gNB may transmit SS-block using one or multiple beams (in case of analogue/hybrid beamforming), but individual beams may not be detected. From the UE perspective, this is a single beam transmission. In FIG. 21B, gNB may transmit CSI-RS (for Mobility) using individual beams associated with specific SS-block. A UE may detect individual beams based on the CSI-RS.

Figure 22A:
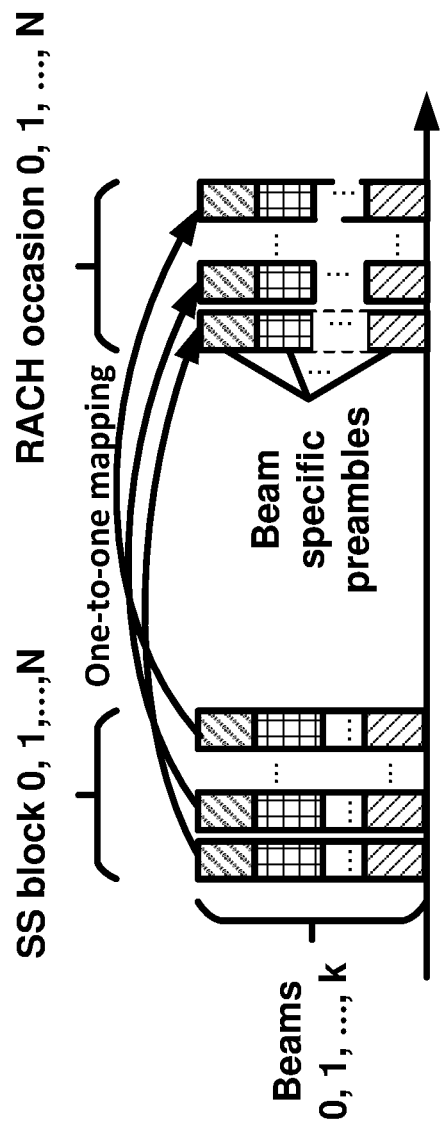
FIG. 22A and FIG. 22B are example diagrams for a mapping between beam specific preambles to PRACH occasions as per an aspect of an embodiment of the present disclosure.
Figure 22B:
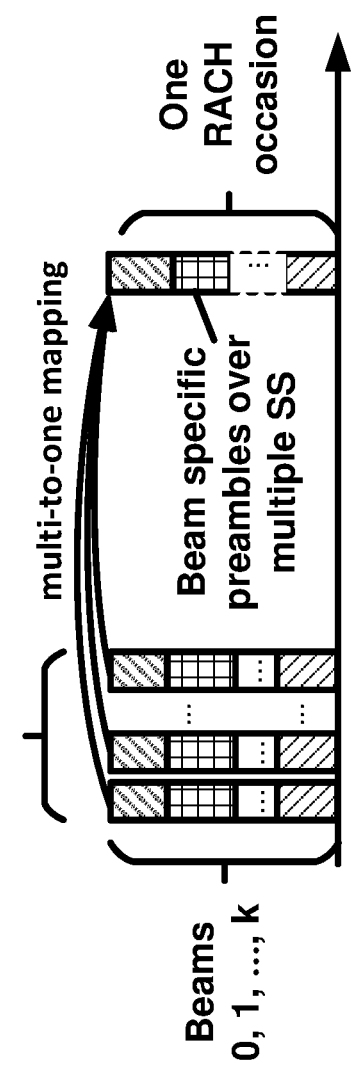

A PRACH occasion may be mapped to corresponding a SS-block, and a set of PRACH preambles may be divided between beams as illustrated in FIG. 22A. Similar to mapping of multiple SS-blocks to single PRACH occasion, multiple beams of an SS-block may be mapped to at least one PRACH occasion as illustrated in FIG. 22B.

If a PRACH occasion is configured with k preambles, and a PRACH occasion is configured to be SS-block specific, the whole set of preambles may be used to indicate the specific SS-block. In this case, there may be N PRACH occasions corresponding to N SS-blocks.

If multiple SS-blocks are mapped to single PRACH occasion, then the preambles may be divided between SS-blocks and depending on the number of SS-blocks, the available preambles per SS-block may be K/N (K preambles, N SS-blocks).

If K SS-block specific preambles are divided between CSI-RS beams in the corresponding PRACH occasions, the number of available preambles per beam may be determined by the K preambles/number of beams.

If the preambles are partitioned in SS-block specific manner, the UE may indicate preferred SS-block but not the preferred individual DL TX beam to gNB.

The network may configure mapping/partitioning PRACH preamble resources to SS-blocks and/or to individual beams. A UE may determine the used partitioning of PRACH preambles, as much as possible, e.g. based on the PRACH configuration.

Beam-specific PRACH configurations may be configurable when a gNB uses analog RX beamforming. In that case, when a UE sends, for example, a preamble in a beam-specific time/frequency slot associated with one or multiple SS Block transmissions, then the gNB may use the appropriate RX beamforming when receiving the preamble in that time/frequency slot and use the corresponding DL beam when transmitting the RAR. Hence, beam-specific PRACH configurations may allow the gNB to direct its Rx beamforming in the direction of the same beam when monitoring the associated PRACH resources.

Figure 23:
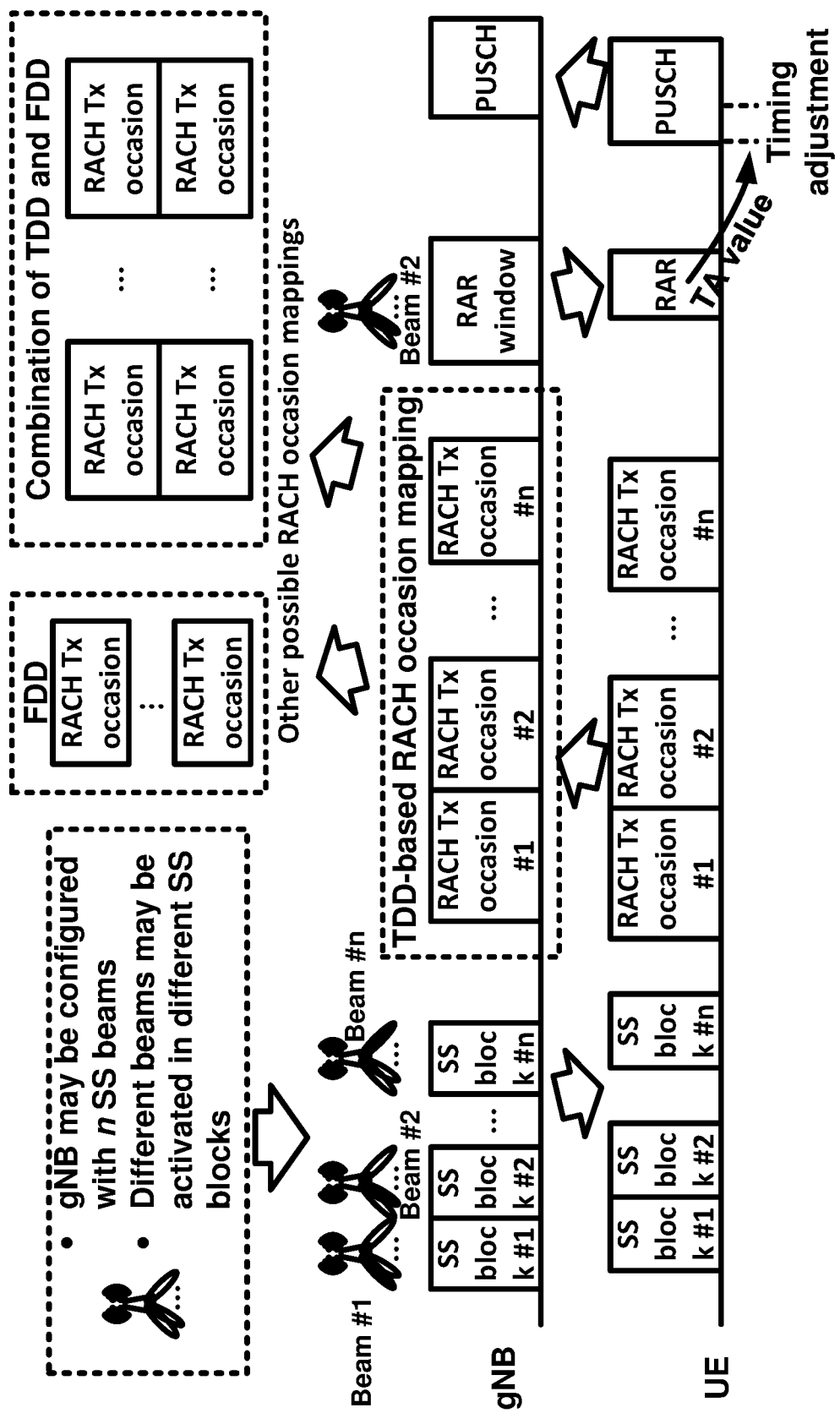
FIG. 23 is an example diagram for a RA procedure with multi-beam as per an aspect of an embodiment of the present disclosure.

In the multi-beam RACH scenario, thanks to the mapping between DL SS beams and PRACH configuration, e.g. time/frequency slot and possibly preamble partitioning, a UE may be under the coverage of a given DL beam or at least a subset of them in a cell. That may enable the network to send a RAR in this best DL beam and/or perform a more optimized beam sweeping procedure e.g. not transmitting the same RAR message in possible beams (e.g. transmitting the RAR in a single beam as in the figure below) as illustrated in FIG. 23.

NR may support the contention-free scenarios in a way to provide a dedicated RACH resource for the preamble transmission as in LTE for handover, DL data arrival, positioning and obtaining timing advance alignment for a secondary TAG. For the handover case, a UE may be configured to measure on one or more SS blocks or other RS in a neighboring cell. If one of the neighboring cell SS-block measurements triggers a handover request, the source gNB may signal a preferred beam index in a handover request to the target gNB. The target gNB in turn may provide a beam-specific dedicated RACH resource (including preamble) in the handover command. In an example, the target gNB may provide a set of dedicated resources e.g. one for at least one SS-block in the handover command. The UE then may transmit Msg1 using the dedicated preamble corresponding to the preferred DL beam in the target cell.

Figures 24A, 24B:
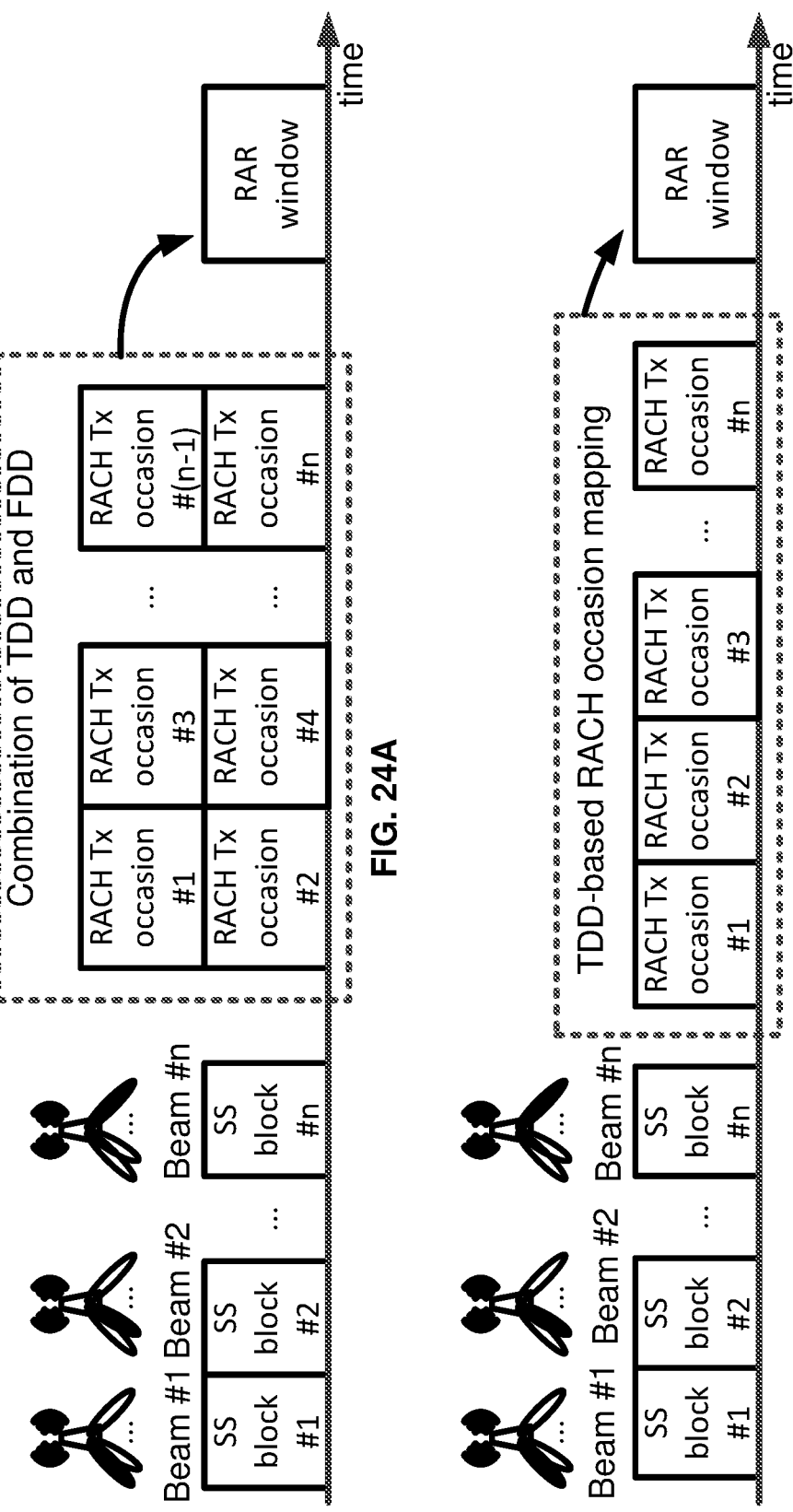
FIG. 24A and FIG. 24B are example diagrams for a multiple preamble transmissions before RAR window as per an aspect of an embodiment of the present disclosure.

When a UE transmits a preamble, the delay may be reduced if the UE is configured to transmit in PRACH preamble in more than one RACH transmission resource (e.g. occasion) before monitoring the RAR window. Two examples of Multiple Msg. 1 transmissions before RAR window are illustrated in FIG. 24A and FIG. 24B. In FIG. 24A, a UE may transmit Msg. 1 in RACH transmission occasions which are configured in frequency domain. In an example, this may be implemented when the UE has multiple antenna panels as the UE may generate beam in one direction using a single antenna panel. In FIG. 24B, a UE may transmit Msg. 1 in RACH transmission occasions which are configured in time domain. A UE without beam correspondence may transmit Msg. 1 via different UL TX beams in different RACH TX occasions and access the target cell with less delay. In an example, a UE may transmit multiple random access preambles in parallel in one or more RACH resources.

For the case of simultaneous multiple preamble transmission (e.g. on different frequency resources described in FIG. 24A or different random access preambles in a RACH resource), the total transmit power required for transmitting multiple preamble simultaneously may exceed the UE's configured maximum transmit power. In such a case, a UE may need a transmit power control (TPC) process to scale down one or more preamble transmission power and/or to drop one or more of preamble transmissions.

In New Radio, a base station may configure one or more radio resources, which are multiplexed in a frequency domain, for one or more RACH preamble transmissions. For example, the one or more RACH preamble transmissions may be for a contention-based RA. For example, the one or more RACH preamble transmissions may be for a contention free RA. The base station may configure a wireless device to transmit a plurality of preambles via the one or more radio resources. Implementation of existing random access mechanisms may result in inefficient uplink transmission power determination and increase battery power consumption.

There is a need to enhance uplink transmission power determination process(es) to improve uplink transmission in a wireless device. In an example embodiment, a new uplink transmission power determination process may be implemented when a plurality of preamble transmissions are configured. An example embodiment may determine transmission powers of the plurality of preambles by dropping at least one preamble transmission and/or scaling at least one of transmit power required for a plurality of preambles to improve uplink power control. Dropping at least one preamble transmission (e.g., when a total calculated required transmit power exceed a threshold) may increase a success rate of detecting and/or decoding a preamble transmission at a base station. In an example embodiment, a base station may transmit one or more messages (e.g. RRC messages) comprising the threshold for random access power determination in a wireless device. The example signaling mechanism may reduce a battery power consumption in a wireless device. Example embodiments dropping at least one preamble transmission and/or scaling a total transmit power reduces a number of retransmissions of preambles. For example, the reduced the number of retransmissions improve the battery power consumption in a wireless device. Example embodiments dropping at least one preamble transmission and/or scaling a total transmit power reduces an amount of interference generated. For example, the reduced the amount of interference may improve a success rate of detecting and/or decoding a preamble transmitted by other wireless device(s).

The frequency multiplexed radio resources for the one or more RACH preamble transmissions may be advantageous for a UE and/or the base station to complete the contention free RA (or contention-based RA) within a short period of time, for example, comparing with the time multiplexed radio resources.

In an example, a base station may configure a UE to transmit a plurality of RA preambles. For example, the base station may configure the UE with frequency multiplexed radio resources for the plurality of RA preambles. For example, the UE may transmit the plurality of RA preambles via frequency multiplexed radio resources in a same RACH TX occasion. In this case, a required transmit power to transmit the plurality of RA preambles may exceeds a maximum allowable transmit power. For example, the UE may determine the required transmit power based on a required transmit power of each of the plurality of RA preambles (e.g., a sum of each required transmit power of each of the plurality of RA preambles. For example, as a UE moves toward a cell edge area (away from a base station), a transmit power for a RA preamble becomes larger. If a UE transmits a plurality of RA preambles at a cell edge area, a required transmit power of each of the plurality of RA preambles may be larger, and a required transmit power of the plurality of RA preambles may exceed a threshold (e.g., the threshold may be a maximum allowable transmit power for a cell).

In an example, if a UE has not enough power to transmit a plurality of RA preambles, the UE may determine not to transmit the plurality of RA preambles (e.g., the UE may determine a RA failure) and measure one or more reference signals (SS blocks and/or CSI-RS), which may cause a delay in a RA procedure.

In an example, if a UE has not enough power to transmit a plurality of RA preambles, the UE may drop at least one transmission of the plurality of RA preambles. Selecting the at least one transmission of the plurality of RA preambles to be dropped impacts on a total period of time required for the UE and/or the base station to complete a RA procedure. Depending on which RA preamble(s) are selected among the plurality of RA preambles, a base station may or may not detect a transmission of the selected RA preambles. For example, when a UE drops a transmission of a first RA preamble and transmits a second RA preamble, a base station may not detect the second RA preamble if the received signal strength of the second RA preamble is low. The first RA preamble may be a better selection for a UE that may more reliably transmits a RA preamble (e.g., the first RA preamble) to the base station.

The question is then which RA preamble(s) among a plurality of RA preambles a UE selects when a total transmit power for the UE is limited (e.g., the total required transmit power for the plurality of RA preambles exceeds a threshold, e.g., total allowable transmit power). The selection of one or more RA preambles among a plurality of RA preambles may determine how quickly a UE complete a RA procedure. A UE may select one or more RA preambles among a plurality of RA preambles based on a pathloss measurement and/or total required transmit power of a plurality of RA preambles.

For example, a pathloss may be a metric that may show a channel quality between a UE and a base station in terms of a level of loss. For example, the larger a value of pathloss measurement, the larger a level of loss. A UE may drop one or more preambles based on their associated pathloss measurements (e.g., ascending and/or descending order of the values of pathloss measurements of a plurality of RA preambles).

For example, a UE may employ a required power for a preamble transmission as a metric to determine which RA preamble to be dropped. For example, a required power for a preamble transmission may depend on a pathloss measurement, a preamble received target power, and/or one or more power offsets. For example, there may be a case that a measured channel quality (e.g., a value of pathloss measurement) between a UE and a base station is good, its corresponding required power for a preamble transmission is large (e.g., a preamble received target power and/or one or more power offsets may increase the required power). For example, a UE may drop one or more preambles based on their associated required powers for the transmissions (e.g., ascending and/or descending order of the values of required powers for the transmissions of a plurality of RA preambles).

RAP dropping or scaling may be based on the pathloss, $P_{PRACH,s}$ (the required power for the s-th preamble transmission, preamble index, based on the random selection, and/or other parameters.

When a UE transmits multiple preambles in parallel on different frequency resources as described in example FIG. 24A, a UE may drop one or more of preamble transmissions if the total power required for simultaneous multiple preamble transmissions exceeds a threshold (e.g., $P_{CMAX,c}(i)$) The prioritization of dropping and/or scaling (adjusting) one or more preamble transmission may be based an order of PRACH resources. In an example, the prioritization of dropping and/or scaling (adjusting) one or more preamble transmission may be based on the estimated pathloss. For example, a UE may at least drop the preamble transmissions from the ($\bar{s}$+1)-th transmission such that the following condition $$\sum_{s=1}^{\bar{s}} w(s) P_{PRACH,PL_{c,(s)}} \leq P_{CMAX,c}(i)$$

is satisfied.

In an example, Path loss for a random access preamble may be calculated employing measurement of one or more reference signals. In an example, the one or more reference signals may comprise at least one of one or more SS blocks, CSI reference signals, DMRS reference signals. In an example, given S SS DL blocks, $PL_{c,s}$ may be the estimated pathloss for the s-th SS block on serving cell c where $s \in \{1, \cdots, S\}$. In an example, $PL_{c,s}$ may be the estimated pathloss for the s-th reference signal (CSI-RS, DMRS) on serving cell c. The ordered values of $PL_{c,1}, \ldots, PL_{c,S}$ in ascending order is defined by $PL_{c,(1)}, \cdots, PL_{c,(S)}$.

$PL_{c,(s)}$ is the (s)-th lowest pathloss among $PL_{c,1}, \cdots, PL_{c,S}$.

$PL_{c,(1)} = \min\{PL_{c,1}, \cdots, PL_{c,S}\}$ $PL_{c,(S)} = \max\{PL_{c,1}, \cdots, PL_{c,S}\}$ $PL_{c,(x)} \leq PL_{c,(y)}$ if $x < y$ where $x, y \in \{1, \cdots, s\}$.

$P_{PRACH,PL_{c,(s)}}$ may be the required power for preamble transmission corresponding to the pathloss $PL_{c,(s)}$, which is defined by $P_{PRACH,PL_{c,(s)}} = \min\{P_{CMAX,c}(i), \text{PREAMBLE\_RE-} \\ \text{CEIVED\_TARGET\_POWER} + PL_{c,(s)} + \\ P_{rach\text{-}offset}\}$ [dBm]

In an example, other parameters may be added to Preamble power calculations in addition to the above parameters. $P_{rach\text{-}offset}$ may be a factor depending on pathloss calculation process. In an example, $P_{rach\text{-}offset}$ may be zero. $P_{CMAC,c}(i)$ may be the configured UE transmit power for subframe i of serving cell c. $P_{rach\text{-}offset}$ may depend on pathloss reference and/or pathloss measurement process.

In an example, the prioritization of dropping and/or scaling (adjusting) one or more preamble transmission may be based on the ordered values of $P_{PRACH,1}, \ldots, P_{PRACH,S}$, where $P_{PRACH,s}$ for $s \in \{1, \cdots, S\}$ may be the required power corresponding to the s-th preamble transmission. For example, a UE may drop at least drop the preamble transmissions from the (s̄+1)-th transmission such that the condition $$\sum_{s=1}^{\bar{s}} w(s) P_{PRACH,(s)} \leq P_{CMAX,c}(i)$$

is satisfied where, $P_{PRACH,s}$ may be the required power for preamble transmission corresponding to the pathloss $PL_{c,s}$, which is defined by $P_{PRACH,s}=\min\{P_{CMAX,c}(i)), $ PREAMBLE_RECEIVED_TARGET_POWER+$PL_{c,s}$+$P_{rach-offset}\}$ [dBm].

The ordered values of $P_{PRACH,1}, \cdots, P_{PRACH,S}$ in ascending order is defined by $P_{PRACH,(1)}, \cdots, P_{PRACH,(S)}$. $P_{PRACH,(s)}$ is the (s)-th smallest calculated transmit power among $P_{PRACH,(1)}, \cdots, P_{PRACH,(S)}$, where $$P_{PRACH,(1)}=\min\{P_{PRACH,1}, \cdots, P_{PRACH,S}\}$$

$$P_{PRACH,(S)}=\max\{P_{PRACH,1}, \cdots, P_{PRACH,S}\}$$

$P_{PRACH,(x)} \leq P_{PRACH,(y)}$ if $x<y$ where $x,y \in \{1, \cdots, S\}$

In an example, when a UE transmits multiple preambles in parallel on different frequency resources as described in FIG. 24A, a UE may randomly transmits preambles out of S preambles by dropping (S−s̄) preambles such that the condition $$\sum_{s=1}^{\bar{s}} w(s) P_{PRACH,s} \leq P_{CMAX,c}(i)$$

is satisfied.

In an example, S preambles considered for parallel transmission. In an example, S may be a preconfigured number, e.g. 2, 4. In an example, at least one message (e.g. RRC) may comprise one or more parameters indicating a number(s) of random access preambles considered for paralleled transmission. In an example, S may depend on one or more RACH configuration parameter. In example, a base station may transmit a PDCCH order (a DCI) comprising one or more parameters indicating a number(s) of random access preamble transmissions. The PDCCH order may comprise one or more random access preamble indices, one or more mask indices, one or more PRACH resources, and/or the like. In an example, S may be the number of SS blocks.

In an example, preamble dropping may be implemented to control transmission power. s̄ preambles of S preambles may be transmitted, and S−s̄ preambles may be dropped. w(s) may be equal to 1 for transmitted preambles. In an example, preamble scaling may be implemented. s̄ may be equal to S. Preamble powers may be scaled down, e.g. according to a predefined rule using adjustment factors w(s). In an example, both preamble dropping and scaling may be implemented. One or more preambles may be dropped and one or more preamble powers may be adjusted (scaled down).

In an example, PREAMBLE_RECEIVED_TARGET_POWER may be set to $$PREAMBLE_{RECEIVED_{TARGET_{POWER}}} =$$

$$preambleInitialReceiveTargetPower+ DELTA_{PREAMBLE} +$$

$$(PREAMBLE_{TRANSMISSION_{COUNTER}} - 1)*powerRampingStep,$$

if the UE is a BL UE or a UE in enhanced coverage, the PREAMBLE_RECEIVED_TARGET_POWER may be set to PREAMBLE_RECEIVED_TARGET_POWER=
preambleInitialReceiveTargetPower−10*log$_{10}$
(numRepetitionPerPreambleAttempt), if NB-IoT:
   for enhanced coverage level 0, the PREAMBLE_RECEIVED_TARGET_POWER may be set to:

$$PREAMBLE\_RECEIVED\_TARGET\_POWER =$$

$$preambleInitialReceiveTargetPower-$$

$$10*\log_{10}(numRepetitionPerPreambleAttempt)$$

for other enhanced coverage levels, the PREAMBLE_RECEIVED_TARGET_POWER may be set corresponding to the max UE output power;

if the UE is an NB-IoT UE, a BL UE or a UE in enhanced coverage:
   may instruct the physical layer to transmit a preamble with the number of repetitions required for preamble transmission corresponding to the selected preamble group (e.g., numRepetitionPerPreambleAttempt) using the selected PRACH corresponding to the selected enhanced coverage level, corresponding RA-RNTI, preamble index or for NB-IoT subcarrier index, and PREAMBLE_RECEIVED_TARGET_POWER.

else:
   may instruct the physical layer to transmit a preamble using the selected PRACH, corresponding RA-RNTI, preamble index and PREAMBLE_RECEIVED_TARGET_POWER.

preambleInitialReceiveTargetPower, powerRampingStep, and numRepetitionPerPreambleAttempt may be from System Information Block (SIB). DELTA_PREAMBLE may be determined based on the preamble format, which is given by prach-ConfigIndex defined in System Information Block (SIB), as illustrated in FIG. 25. PREAMBLE_TRANSMISSION_COUNTER may begin from 0 and be incremented by 1 by the MAC entity whenever a random access response reception is considered not successful.

Figure 26:
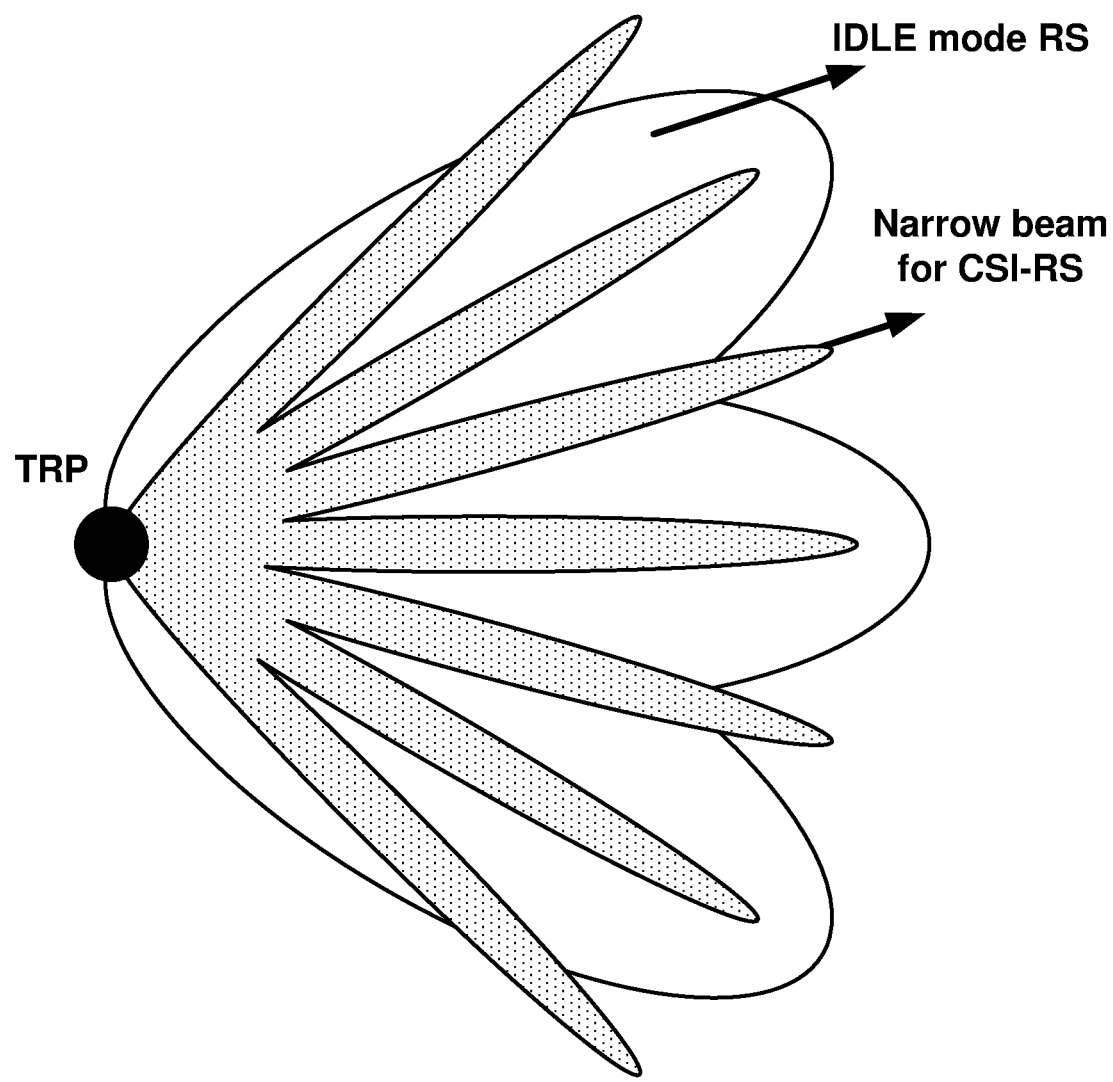
FIG. 26 is an example diagram for a counter as per an aspect of an embodiment of the present disclosure.

In an example, FIG. 26 shows an example of preamble dropping. A base station may configure a wireless device to transmit a plurality of RA preambles. The wireless device may measure one or more reference signals (e.g., SS blocks from 1 to n) and determine the plurality of RA preambles to transmit. FIG. 26 shows that the wireless device selects total n RA preambles but the required power to transmit the n RA preambles exceeds a first threshold. The wireless device drops a transmission of preamble #1 since its required transmit power is larger than other preamble transmission.

In an example, a wireless device may receive one or more messages comprising configuration parameters of one or more random access channels; initiate a random access procedure for transmitting a plurality of random access preambles in parallel via the one or more random access channels; calculate a preamble transmission power for one or more of the plurality of the random access preambles employing one or more parameters; scale or drop at least one preamble transmission power when a calculated total power of the one or more of the plurality of random access preambles exceeds a first value; transmit, via the one or more random access channels, at least one of the plurality of random access preambles.

In an example, the one or more parameters may comprise a pathloss value and a ramp-up value. When a wireless device may estimate one or more pathloss values for transmission of the plurality of random access preambles, a pathloss value in the one or more pathloss values may be employed, at least, for transmission of a random access preamble in the plurality of random access preambles.

In an example, the one or more parameters may comprise an offset value, where the offset value depends on a number of the plurality of random access preambles.

In an example, the calculated total power of the one or more of the plurality of random access preambles may be a sum of the preamble transmission power for the one or more of the plurality of the random access preambles. The first value may be a maximum allowable transmission power of the wireless device via a cell. A second calculated total power of the one or more of the plurality of random access preambles may be below or equal to the first value.

In an example, the dropping the at least one preamble transmission power may comprise dropping one or more preambles according to a corresponding pathloss value, where a first random access preamble is assigned lower priority compared with a second random access preamble if a pathloss value corresponding to the first random access preamble is smaller than a pathloss value corresponding to the second random access preamble.

In an example, the dropping the at least one preamble transmission power may comprise dropping one or more preambles according to a corresponding calculated preamble transmission power, where a first random access preamble is assigned lower priority compared with a second random access preamble if a preamble transmission power corresponding to the first random access preamble is smaller than a preamble transmission power corresponding to the second random access preamble.

In an example, the dropping the at least one preamble transmission power may comprise dropping one or more preambles according to a corresponding calculated preamble transmission power, where a first random access preamble is assigned lower priority compared with a second random access preamble based on a random selection.

In the random access procedure, IDLE mode RS (e.g., SS blocks), CSI-RS for L3 mobility, and/or DM-RS may be employed as DL signal to estimate the pathloss. The IDLE mode RS may be transmitted, e.g., with 5 ms periodicity. In an example, the periodicity may be as long as 160 ms. The periodicity may be valid for cells in a frequency layer. Even though a frequency layer is configured with a long IDLE mode RS periodicity, e.g. 160 ms, it may not be prohibited that some cells transmit IDLE mode RS more frequently in order to support the L3 mobility of CONNECTED mode UEs in the cells.

Figure 27:
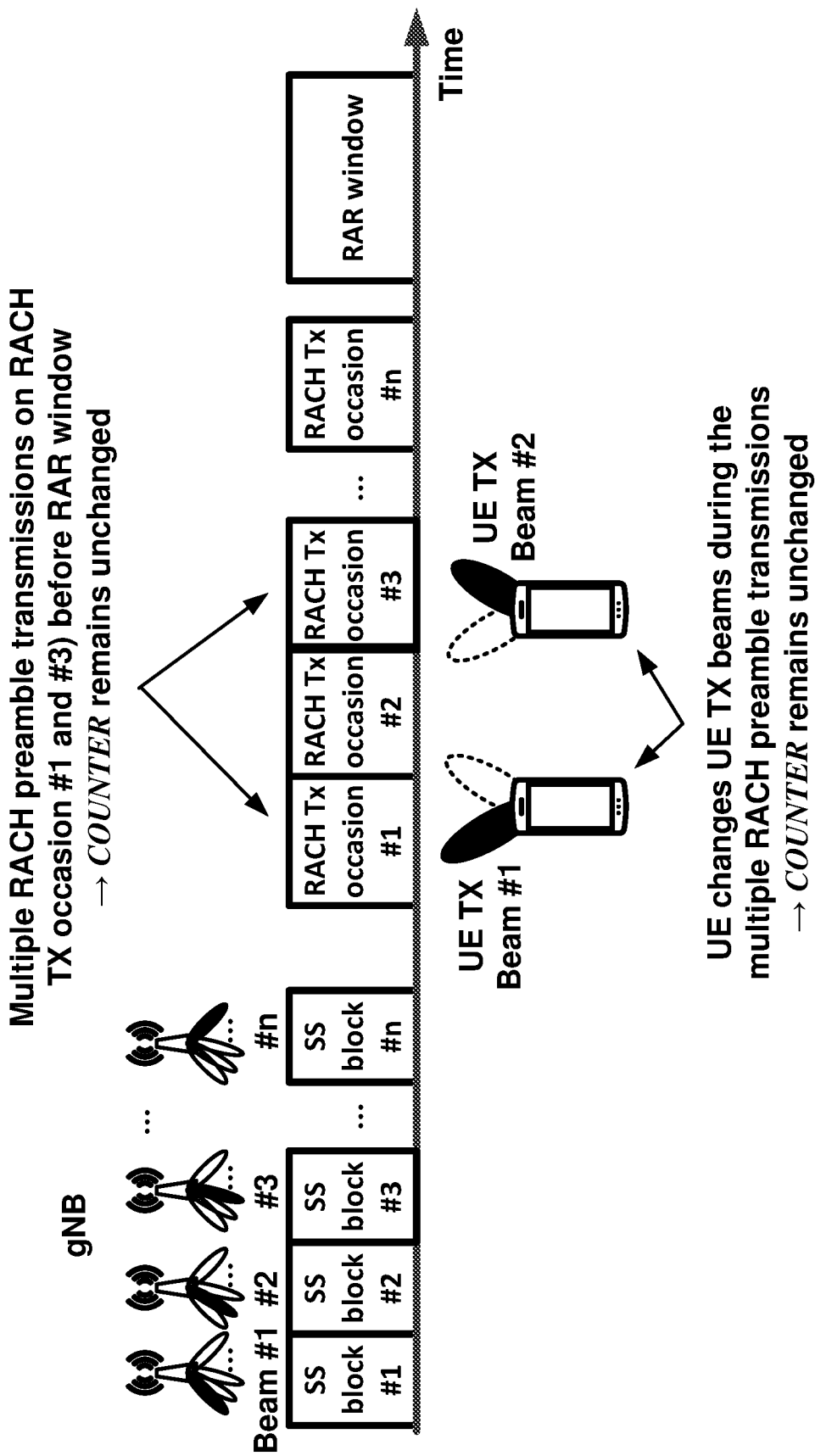
FIG. 27 is an example diagram for a counter as per an aspect of an embodiment of the present disclosure.

IDLE mode RS may provide sufficient measurement accuracy for CONNECTED mode in some example implementations, for example, when shorter periodicity is used. With longer IDLE mode RS periodicities, the measurement accuracy may be insufficient, for example, when combined with high UE speed. In multi-beam scenarios where control and data transmissions in CONNECTED mode may have highly directive beamforming gain in some cells, L3 mobility may be based on RRM measurements that incorporate such gains. The CSI-RS may provide a large number of such beamformed RS more efficiently than IDLE mode RS as illustrated in FIG. 27. NW may support the configurability of whether UEs use measurements on IDLE mode RS or CSI-RS for L3 mobility to select subsets of RACH resources and preambles.

IDLE mode RS may comprise at least the secondary synchronization signal (NR-SSS) that may be used for DL based RRM measurement for L3 mobility in IDLE mode. For CONNECTED mode RRM measurement for L3 mobility, CSI-RS may be used in addition to IDLE mode RS.

The CSI-RS for L3 mobility may not be always-on but be turned on/off semi-statically and transmitted periodically. When CSI-RS is turned off, a UE may need to use the IDLE mode RS as DL signal. The number of measured ports/beams/TRPs on IDLE mode RS may depend on the number of transmitted SS blocks per SS burst set.

A cell may transmit the CSI-RS for L3 mobility during SS burst sets. A UE may receive signals IDLE RS and CSI-RS for L3 mobility within a time window containing an SS burst set. The CSI-RS for L3 mobility may be transmitted on subcarriers not occupied by PSS/SSS/PBCH. Different simultaneous Tx beams during SS blocks may be supported in many scenarios, for example with multi-TRP cells or with a TRP with a digital or hybrid beamforming implementation.

A cell may transmit the CSI-RS for L3 mobility between SS burst sets in some scenarios. For instance, if the system bandwidth is similar to the SS block bandwidth, there may not be enough subcarriers for the CSI-RS during SS blocks. An example implementation may be with a single-TRP cell with analog beamforming. In this case, a single TRP Tx beam may be used at a time, which may mean that any CSI-RS transmitted during the SS block may have to use the same TRP Tx beam as used for the SS block. NW may configure the CSI-RS for L3 mobility outside the SS burst sets such that the CSI-RS may be reused for beam management, for instance with more narrow beams than used in the SS burst set.

A cell may transmit CSI-RS for L3 mobility both during SS burst sets and between SS burst sets, for instance with long SS burst set periodicities and in high-speed scenarios.

A cell may transmit CSI-RS for L3 mobility on-demand to minimize the always-on signals comprising NR-SS and NR-PBCH to support forward compatibility and resource efficiency. A UE may need a request mechanism to trigger transmission of CSI-RS for L3 mobility (for example, using a dedicated PRACH resource shared by UEs). This may allow fine beam searching using CSI-RS before RRC connection is established.

In New Radio, base station transmits multiple synchronization signal blocks corresponding to multiple SS downlink beams. In an example, a base station may configure one or more CSI-RS for a wireless device. Implementation of existing random access mechanisms may result in inefficient uplink transmission power determination and increase battery power consumption.

There is a need to enhance uplink transmission power determination process(es) to improve uplink transmission in a wireless device. In an example embodiment, a new uplink transmission power determination process may be implemented when CSI-RS is configured. An example embodiment may determine random access preamble transmission power based on CSI-RS or SS blocks to improve uplink power control. Using CSI-RS for random access preamble power calculation may provide a more accurate measurement for a pathloss calculation versus using SS blocks for random access preamble power calculations. Example embodiments provide a more efficient and accurate pathloss measurement in a wireless device. In an example embodiment, a base station may transmit one or more messages (e.g. RRC messages) comprising a power offset value for random access power determination in a wireless device when CSI-RS is configured. The example signaling mechanism may provide flexibility in configuring different transmission powers for SS blocks and CSI-RS. Example embodiments employing RRC messages improves both uplink and downlink power control mechanisms. In an example embodiment, an RRC message comprises a power offset value. Transmission of the offset value for CSI-RS relative to SS blocks may improve signaling efficiency for configuring power parameters of CSI-RS and random access transmission by reducing the number of overhead bits in RRC signaling.

In an example, a base station may transmit a PDCCH order to a wireless device to initiate a random access procedure. In an example, a base station may configure a UE with one or more CSI-RSs. The UE may measure one or more reference signal received powers of the one or more CSI-RSs for random access preamble transmission. Using CSI-RS for preamble power calculation (when CSI-RS is configured) provides more accuracy in uplink power control vs when SS blocks are used. This may reduce battery power consumption and reduce interference.

In an example, a reference signal power of CSI-RS may be different from the one for SS blocks. For example, if the CSI-RS may be configured with a narrower beam than the SS block, the reference signal power value of the CSI-RS may be smaller than a reference signal power value of the SS block. For example, a reference signal power value may depend on an antenna gain (e.g., beamforming gains). For example, a narrower beam may have a larger antenna gain (e.g., beamforming gain), which may result in a smaller (e.g., larger) reference signal power.

Depending on a type of reference signal configured with a UE, a base station may transmit one or more messages indicating configuration parameters of transmit power (e.g., a reference signal power value) associated with the type of reference signal. The type of reference signals may comprise SS, CSI-RS, and/or DMRS. Transmission of power parameters for various reference signals for random access preamble transmission may provide more flexibility and accuracy in reference signal selection and random access preamble power calculation. For example, if a UE is configured with one or more CSI-RS s, a base station may transmit a first reference signal power value to the UE. If a UE is not configured with a CSI-RS, a base station may transmit a second reference signal power value to the UE, wherein the second reference signal power may be associated with one or more SS blocks.

For example, a reference signal power may depend an antenna gain. For example, the first reference signal power value may be correlated with the second reference signal power. In an example, the CSI-RS and SS blocks may be transmitted from a same base station (or a same TRP) with different antenna gains. In this case, a difference between the first and second reference signal powers may depend on the different antenna gains (e.g., or different beamforming gains). In an example, the first reference signal power value may be decomposed into a second reference signal power value and a power offset value. In an example, the power offset value may compensate the different antenna gains between different types of reference signals and improve uplink power control efficiency.

In an example, a UE may calculate a first pathloss associated with the CSI-RS based on the first reference signal power value. The UE may receive, from a base station, the first reference signal received power for the CSI-RS. A UE may calculate a second pathloss associated with SS blocks based on the second reference signal power value. The UE may receive, from a base station, the second reference signal received power for the SS block. In an example, the first reference signal power value may be based on the second reference signal power value and a first offset value. In an example, the first pathloss, that may be calculated based on the first reference signal power value, may be decomposed into the second pathloss, that may be calculated based on the second reference signal power value, and a second offset value. For example, the first offset value and the second offset value may be the same.

For example, a reference signal power value may be ranged from a first value to a second value. In an example, for a range between −60 dBm and 50 dBm with a step size of 2 dB, a base station may include at least 6 bits in the configuration parameter to indicates a reference signal power value. If a base station does not configure a UE with a CSI-RS, the base station may transmit at least one message comprising at least 6 bits indicating a first reference signal power value associated with at least one SS block. If the base station configures the UE with the CSI-RS, the base station may transmit at least one second message comprising at least 6 bits indicating a second reference signal power value associated with the CSI-RS. When a base station switches a reference signal from a first type to a second type, it may be efficient to indicate a power offset value instead of transmitting a power value of the reference signal power associated with the second type. The power offset value may be indicated by a smaller number of bits (e.g., one or two bits) compared with the power value.

In an example, a base station may not configure a UE with a CSI-RS. The base station may transmit one or more first messages indicating a first reference signal power value associated with at least one SS block. When the base station configures the UE with the CSI-RS, if the base station transmits one or more second messages indicating a second reference signal power value associated with the CSI-RS, downlink signaling overhead may increase. For example, as the number of SS blocks and/or CSI-RSs that a base station configures a UE increases, the signaling overhead may increase. For example, if the first and the second reference signal power values are correlated with each other (associated with each other, and/or corresponding to each other), the base station may reduce a signaling overhead if the base station transmits the difference between the first and the second reference signal power values. For example, a reference signal power value may be ranged from a first value (e.g., −60 dBm) to a second value (e.g., 50 dBm), that may require a number of bits (e.g., at least 6 bits for the case of step size of 2 dB) to indicate one of values between the first value and the second value. For example, if a first SS block and a first CSI-RS are associated with each other, the power offset value may be small (e.g., less than 10 dB), which may be indicated by a small number of bits (e.g., 2 or 3 bits with a step size of 2 dB).

Figure 28:
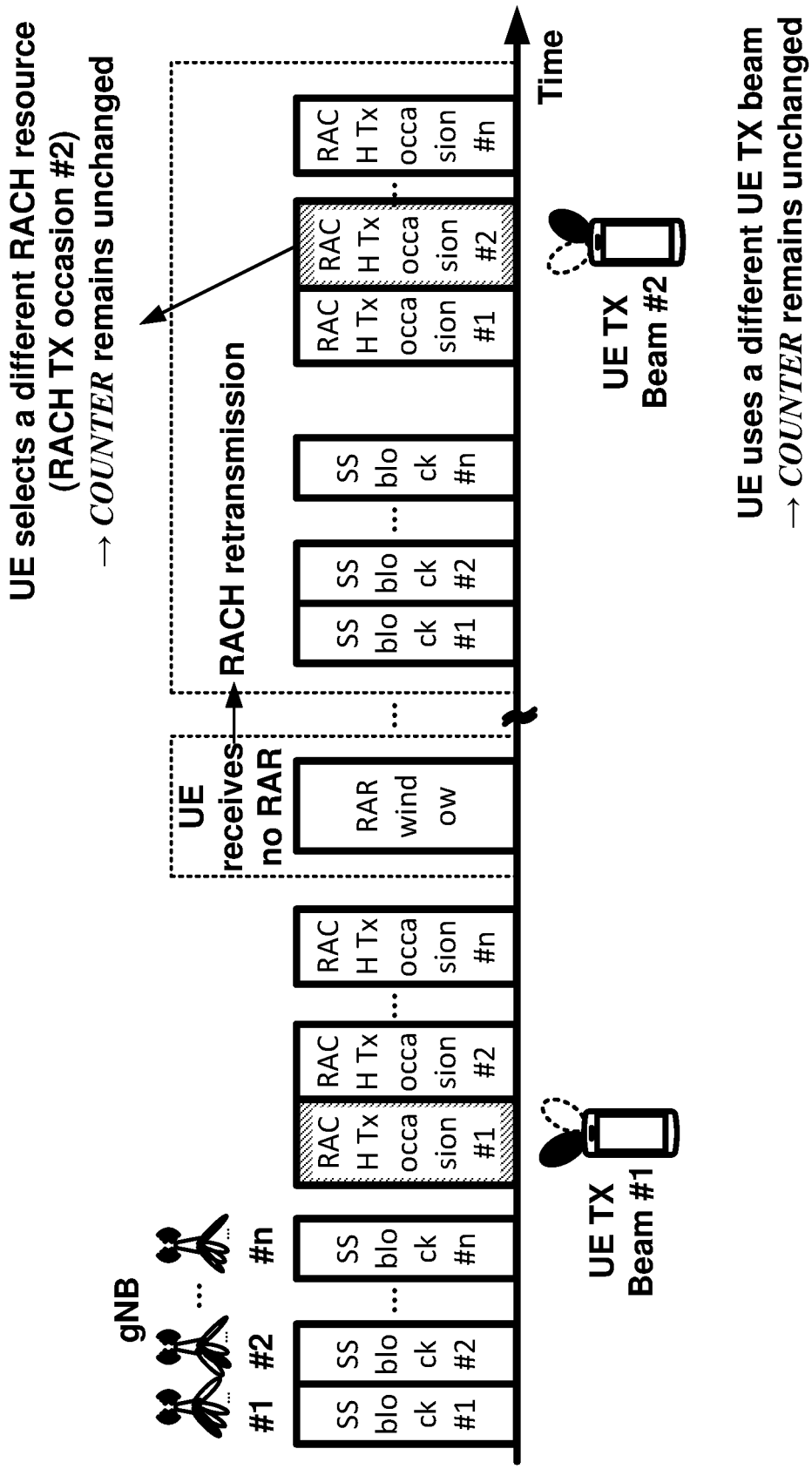
FIG. 28 is an example diagram for a DELTA_PREAMBLE determined based on the preamble format as per an aspect of an embodiment of the present disclosure.

FIG. 28 shows an example of calculating a preamble transmit power. For example, when a wireless device is not configured with a CSI-RS, the wireless device may determine a preamble transmit power based on a first measured pathloss, wherein the first measured pathloss may be based on a reference signal received power of at least one of SS blocks. The base station may transmit one or more messages comprising one or more CSI-RS configuration parameters, wherein the one or more CSI-RS configuration parameters may comprise a power offset value. The wireless device may be configured with a CSI RS in response to receiving the one or more CSI-RS configuration parameters. When the wireless device is configured with the CSI-RS, the wireless device may determine a preamble transmit power based on a second measured pathloss and the power offset value, wherein the second measure pathloss may be based on a reference signal received power of the CSI-RS.

When a UE transmits a preamble in the RA procedure, the UE determines the transmit power, denoted by $P_{PRACH}$, based on the pathloss measured by reference signals (RSs). CSI-RS and SS may be the RSs used for path loss estimation. For example, for a UE not configured with CSI-RS, the pathloss estimation may be based on SS. For a UE configured with a semi-persistent CSI-RS configured (activated), CSI-RS and/or SS may be a basis of the pathloss estimation. If the semi-persistent CSI-RS is released in the UE, then the UE may revert to base its path loss estimation on SS.

There may be a dynamic switching between measuring on different types of RSs. The RSs may be transmitted in different ways and may constitute different beamforming gains. Utilizing multiple RSs for pathloss estimation may imply that the UE estimates the pathloss from signals corresponding to different beamforming gains. A gNB may receive a UE's transmitted preamble with a utilized beamformer gain which is not necessarily equal to the beamforming gain used for transmitting the RSs.

There may be a framework for which RS/RS s the UE may use at any given time. If multiple RSs are utilized for pathloss estimation, a framework may be defined so that it is clear on which RS/RSs a UE may measure on at every point in time.

If multiple RSs are utilized for pathloss estimation, a UE may include an offset in $P_{PRACH}$ to compensate for the difference in beamforming gain. For example, a UE may determine $P_{PRACH}$ such that $$P_{PRACH} = \min\{P_{CMAC,c}(i), \text{PREAMBLE\_RECEIVED\_TARGET\_POWER} + PL_c + P_{rach\text{-}offset}\} \text{ [dBm]}.$$

In an example, $P_{CMAC,c}(i)$ may be the configured UE transmit power for subframe i of serving cell c. $PL_c$ may be the downlink path loss estimate calculated in the UE for serving cell c. $P_{rach\text{-}offset}$ may be a parameter whose value is given from which RS that was used when estimating $PL_c$. In an example, $P_{rach\text{-}offset}$ may depend on a state of a UE when the UE transmits a random access preamble. If SS is used, $P_{rach\text{-}offset}$ may take on a first value. If CSI-RS is used, $P_{rach\text{-}offset}$ may take on a second value. The first and second values per RS type for P rach-offset may be configurable by the gNB. A gNB may transmit one or more messages (e.g. RRC) comprising one or more parameters for one or more $P_{rach\text{-}offset}$ values. By performing the configuration, it may be possible to let the UE compensate for the difference in beamforming gain by the gNB when receiving an UL transmission and when transmitting a certain RS. In an example, the first value may be zero by default, and a second value may be a configurable value (or vice versa). In an example configuration, the first value may be configured the same value as the second value.

In an example, PREAMBLE_RECEIVED_TARGET_POWER may be set to

PREAMBLE_RECEIVED_TARGET_POWER =

$preambleInitialReceiveTargetPower +$ DELTA_PREAMBLE +

(PREAMBLE_TRANSMISSION_COUNTER − 1) ∗

$powerRampingStep$ if the UE is a BL UE or a UE in enhanced coverage, the PREAMBLE_RECEIVED_TARGET_POWER may be set to

PREAMBLE_RECEIVED_TARGET_POWER =

$preambleInitialReceiveTargetPower −$ $10 * \log_{10}(numRepetitionPerPreambleAttempt)$ if NB-IoT:
for enhanced coverage level 0, the PREAMBLE_RECEIVED_TARGET_POWER may be set to:

PREAMBLE_RECEIVED_TARGET_POWER =

$preambleInitialReceiveTargetPower −$ $10 * \log_{10}(numRepetitionPerPreambleAttempt)$ for other enhanced coverage levels, the PREAMBLE_RECEIVED_TARGET_POWER may be set corresponding to the max UE output power;
if the UE is an NB-IoT UE, a BL UE or a UE in enhanced coverage:
may instruct the physical layer to transmit a preamble with the number of repetitions required for preamble transmission corresponding to the selected preamble group (e.g., numRepetitionPerPreambleAttempt) using the selected PRACH corresponding to the selected enhanced coverage level, corresponding RA-RNTI, preamble index or for NB-IoT subcarrier index, and PREAMBLE_RECEIVED_TARGET_POWER.
else:
may instruct the physical layer to transmit a preamble using the selected PRACH, corresponding RA-RNTI, preamble index and
PREAMBLE_RECEIVED_TARGET_POWER.

In an example, preambleInitialReceiveTargetPower, powerRampingStep, and numRepetitionPerPreambleAttempt may be from System Information Block (SIB). In an example, DELTA_PREAMBLE may be determined based on the preamble format, which is given by prach-ConfigIndex defined in System Information Block (SIB), as illustrated in FIG. 25. PREAMBLE_TRANSMISSION_COUNTER may begin from 0 and be incremented by 1 by the MAC entity whenever a random access response reception is considered not successful.

In an example, a wireless device may receive one or more messages comprising configuration parameters of a random access channel; initiate a random access procedure for transmitting at least one random access preamble; estimate a pathloss value based on a measurement reference signal; calculate a preamble transmission power for one of the at least one random access preamble employing the pathloss value, a ramp-up value, a configured initial received target power, and a first offset value; and transmit, via the random access channel, the one of the at least one random access preamble with the preamble transmission power.

In an example, the first offset value may depend on a type of the measurement reference signal. The type of the measurement reference signal may comprise at least one of the following: a synchronization signal; a channel state information reference signal; a demodulation reference signal. The first offset value may depend on a state of the wireless device when the random access procedure is initiated. The state of the wireless device may comprise: an RRC idle state; an RRC connected state; and an RRC inactive state. The first offset value may depend on a number of preambles transmitted in parallel.

In an example, the first offset value may depend on an event type that initiated random access procedure. The event type that initiated random access procedure may comprise at least one of the following: an initial access when establishing a radio link; a re-establishment of a radio link after radio-link failure; a handover when uplink synchronization needs to be established to the new cell; an establishment of uplink synchronization if uplink or downlink data arrives when the terminal is in RRC_CONNECTED and the uplink is not synchronized; a positioning using positioning methods based on uplink measurements; and a scheduling request if no dedicated scheduling-request resources have been configured on PUCCH.

In an example, the calculating the preamble transmission power for the random access preamble may further employ a second offset value, the second offset value depends on a format of the random access preamble.

The preamble transmission power may comprise a reference preamble transmit power $P_0$, which may comprise the most recent estimated pathloss, and a power offset determined by PowerRampingCounter and PowerRampingStep such that $$P_{PRACH} = \min\{P_{CMAX,c}(i), P_0(PL_c) + \text{PowerOffset}\} \text{ [dBm]}$$

where PowerOffset=(PowerRampingCounter−1)*powerRampingStep, where $P_0$ may comprise $PL_c$, preambleInitialReceiveTargetPower, DELTA_PREAMBLE and/or $P_{ram\text{-}offset}$. In a single beam scenario, the PowerRampingCounter may keep incrementing with a RACH retransmission, which results in keeping PowerRampingCounter the same to a RACH retransmission counter.

In a multi-beam scenario, if a UE doesn't get the RAR corresponding to the RACH preamble transmission, the UE may re-attempt to transmit a preamble in different ways. For example, the UE may perform UE's Tx beam switching, may select a new RACH resource different from the previous RACH preamble transmission. In this case, depending on such different situation, PowerRampingCounter may be reset, remains unchanged, or keeps increasing.

For example, a UE may have PowerRampingCounter per a UE TX beam. A counter may be reset, remain unchanged, or keep increasing when the corresponding UE TX beam is used.

A UE may have one PowerRampingCounter that may be reset, remain unchanged, or keep increasing whenever the UE changes the UE TX beam. For example, if the UE selected a wrong UL Tx beam and still failed even power ramped up several times, the UE may switch to another UL Tx beam by resetting the power level, keeping it unchanged, or keeping it increasing. A UE may reset PowerRampingCounter not to generate any unnecessary interference, which may cause additional delay. A UE may decide to increase PowerRampingCounter to avoid such a delay, which may in turn generate a large amount of interference when the beam change in the UE side work as increase of received power, e.g., more than 10 dB. A UE may keep PowerRampingCounter unchanged to make a balance between latency and UL interferences.

In an example, when a UE decides to change the RACH resource during the RACH re-attempt, depending on the association between the changed RACH resource and the DL SS blocks that the UE responded with a RACH preamble transmission in the previous RACH attempt, PowerRampingCounter may be reset, remain unchanged, or keep increasing. For example, if the changed RACH resource is still associated with the same DL broadcast channel/signal, a UE may increase PowerRampingCounter in order to have a higher priority than a UE who fails less. If the changed RACH resource is not associated with the same DL broadcast channel/signal, a UE may reset PowerRampingCounter as a initial value.

In addition to PowerRampingCounter, a UE may have a retransmission counter to know whether the number of RACH preamble retransmission reaches the maximum number. A UE may increase the retransmission counter if the UE doesn't get the RAR corresponding to the RACH preamble transmission. For the case of PowerRampingCounter per a UE TX beam, a UE may have a total counter for UE Tx beams, and gNB may restrict the maximum number of retransmission based on the total counter and/or may restrict the maximum number of retransmission per a UE Tx beam based on the counter per a UE Tx beam.

In a multi-beam scenario, a UE may manage a ramping power and the number of RACH preamble retransmission employing a counter, denoted by COUNTER hereafter. A UE may increase COUNTER when within a RAR window the UE receives no RAR corresponding to one or more preamble transmissions performed before the RAR window.

In New Radio, a wireless device transmits a plurality of preambles before starting a RAR window or before the RAR window expires. In an example, Implementation of existing random access mechanisms may result in inefficient uplink transmission power determination, increase a battery power consumption, and increase the amount of interference.

There is a need to enhance management process(es) of a counter to improve uplink transmission for a random access procedure in a wireless device. In an example embodiment, a new single counter may be implemented when a plurality of preambles are transmitted. An example embodiment may increment a counter in response to an expiration of an RAR. Using the new single counter may keep an interference level in a more proper way in a cell. Example embodiments provide a higher success rate of preamble transmission of other wireless device by generating a less interference from a wireless device. The example counter management mechanism may provide a access fairness between wireless devices when the wireless devices transmits different numbers of preambles.

In an example, a UE may have a counter that may be used for ramping a transmit power of RA preamble for a retransmission and for counting a number of retransmissions. In this case, if a base station configures a UE with a plurality of RA preamble transmissions, the UE may determine when to increment the counter. A UE may increment the counter by one in response to transmitting a RA preamble. For example, if a UE initiates a RA procedure and transmits one or more RA preambles before receiving an RAR from a base station, the UE may increment the counter by one when the UE transmits each of the one or more RA preambles. This may cause a larger amount of interference to other UEs. This may cause an unfairness issue. For example, if a first UE and a second UE perform (or initiate) RA procedures in a same frequency band, wherein the first UE transmits a RA preamble, and the second UE transmits a plurality of RA preambles, a large ramping power used by the second UE may interfere with a RA transmission of the first UE. At a base station, a first received power of a first preamble transmitted by a first UE and a second received power of a second preamble transmitted by a second UE may be large, e.g., because of a ramping power used by the second UE. For example, a large gap of received powers of two signals at a base station may require a larger dynamic range of a signal processing system at the base station.

In an example, a UE may have a first counter (e.g., PowerRampingCounter and/or COUNTER). For example, a UE may determine a ramping power based on the first counter For example, a UE may reset, increment the first counter in response to UE's behavior (e.g., UE's TX beam switching, and/or RACH resource reselection). For example, UE's Tx beam switching and/or RACH resource reselection may be UE's implementation issues. For example, if a UE increments the first counter in response to UE's behavior, e.g., UE's Tx beam switching and/or RACH resource reselection, there may be a case that a UE may increment the counter aggressively, which may result in a larger ramping power in a RA transmission and a larger amount of interference to other UEs in a same cell. In an example, a UE may have a second counter that may count a number of RA retransmissions.

In an example, a UE may have a counter that may remain unchanged (is not incremented) in response to UE's behaviour (e.g., UE's TX beam switching, and/or RACH resource reselection). The UE may employ the counter to determine a RA ramping power. For example, the UE may increment the counter in response to performing a retransmission of RA preamble transmission that may be triggered in response to no RAR being detecting during a RAR window. For example, the UE may not reset and/or increment the counter in response to UE's TX beam switching, and/or RACH resource reselection. For example, the UE may not increment the counter a plurality of RA preamble transmissions prior to an RAR window expiration. In this case, the unfairly generated interference between UEs having different UEs' behaviour may be resolved. In an example, a UE may employ the counter to count a number of RA retransmissions and/or limiting a number of RA retransmissions (e.g., one or more RA transmission prior to an RAR window expiration may not be considered as a RA retransmission. The RA retransmission may be one or more RA transmissions in response to no RAR being detecting during a RAR window). In this case (e.g., a UE employs the counter to determine a RA ramping power and to limit a number of retransmission), it may be beneficial for a base station and a UE to simplify a process of managing a RA retransmission and/or RA ramping power, e.g., reduction of signalling overhead comparing with a case that a base station and a UE employ a plurality of counters, A UE may perform multiple RACH preamble transmissions on one or more RACH resources, which may comprise time, frequency, and/or preamble index, by holding a UE TX beam or by performing UE TX beam switching. If a UE perform such multiple RACH preamble transmissions with a UE TX beam before the RAR window, COUNTER may remain unchanged as illustrated in FIG. 29. If a UE perform the multiple RACH preamble transmissions by performing UE TX beam switching before the RAR window, COUNTER may remain unchanged as illustrated in FIG. 29.

After a UE performs one or more RACH preamble transmissions, if the UE receives no RAR within a RAR window, or if none of received RARs contains any of one or more RA preamble identifiers corresponding the transmitted one or more RA preambles, the UE may consider that the RAR reception is not successful and may increase COUNTER by 1.

In an example, the UE may transmit a plurality of preambles via different resources and/or radio beams before monitoring for a random access response during a random access response window. The COUNTER may be incremented by one for transmission of the plurality of random access preambles. In an example, the preamble may be incremented if the UE receives no RAR within a RAR window, or if none of received RARs contains any of one or more RA preamble identifiers corresponding the transmitted one or more RA preambles. In an example, the preamble may be incremented before transmission of the plurality of preambles or before the random access window. The example embodiment enhances random access procedure by incrementing the COUNTER by one for transmission of a plurality of random access preambles and by employing the same COUNTER for calculating transmission power for the plurality of preambles.

There may be a threshold, for example preambleTransMax in LTE, informed from system information broadcast or preconfigured that restricts the total number of RACH retransmissions. If the incremented COUNTER is equal to the threshold (or e.g. threshold+1), a UE may terminate the RA procedure. The UE may determine a RA problem, e.g., MAC entity may indicate the RA problem to upper layers. If the incremented COUNTER is lower than the threshold (or e.g. threshold+1), a UE may re-attempt the RACH preamble transmission. The preamble transmit power may be $$P_{PRACH} = \min\{P_{CMAX,c}(i), \text{PREAMBLE\_RECEIVED\_TARGET\_POWER} + PL_c + P_{rach\text{-}offset}\} \text{ [dBm]},$$

where $P_{CMAC,c}(i)$ may be the configured UE transmit power for subframe i of serving cell c.

$P_{rach\text{-}offset}$ may be a parameter whose value is given from which RS that was used when estimating $PL_c$. In an example, $P_{rach\text{-}offset}$ may depend on a state of a UE when the UE transmits a random access preamble. If SS is used, $P_{rach\text{-}offset}$ may take on a first value. If CSI-RS is used, $P_{rach\text{-}offset}$ may take on a second value. The first and second values per RS type for $P_{rach\text{-}offset}$ may be configurable by the gNB. A gNB may transmit one or more messages (e.g. RRC) comprising one or more parameters for one or more $P_{rach\text{-}offset}$ values. By performing the configuration, it may be possible to let the UE compensate for the difference in beamforming gain by the gNB when receiving an UL transmission and when transmitting a certain RS. In an example, the first value may be zero by default, and a second value may be a configurable value (or vice versa). In an example configuration, the first value may be configured the same value as the second value.

PREAMBLE_RECEIVED_TARGET_POWER may be set to $$\text{PREAMBLE\_RECEIVED\_TARGET\_POWER} =$$

$$preambleInitialReceiveTargetPower+$$

$$\text{DELTA\_PREAMBLE} + (\text{COUNTER} - 1) * powerRampingStep$$

if the UE is a BL UE or a UE in enhanced coverage, the PREAMBLE_RECEIVED_TARGET_POWER may be set to $$PREAMBLE\_RECEIVED\_TARGET\_POWER =$$
$$preambleInitialReceiveTargetPower-$$
$$10*\log_{10}(numRepetitionPerPreambleAttempt)$$

if NB-IoT:
  for enhanced coverage level 0, the PREAMBLE_RECEIVED_TARGET_POWER may be set to:

$$PREAMBLE\_RECEIVED\_TARGET\_POWER =$$
$$preambleInitialReceiveTargetPower-$$
$$10*\log_{10}(numRepetitionPerPreambleAttempt)$$

for other enhanced coverage levels, the PREAMBLE_RECEIVED_TARGET_POWER may be set corresponding to the max UE output power;
if the UE is an NB-IoT UE, a BL UE or a UE in enhanced coverage:
  may instruct the physical layer to transmit a preamble with the number of repetitions required for preamble transmission corresponding to the selected preamble group (e.g., numRepetitionPerPreambleAttempt) using the selected PRACH corresponding to the selected enhanced coverage level, corresponding RA-RNTI, preamble index or for NB-IoT subcarrier index, and PREAMBLE_RECEIVED_TARGET_POWER.
else:
  may instruct the physical layer to transmit a preamble using the selected PRACH, corresponding RA-RNTI, preamble index and PREAMBLE_RECEIVED_TARGET_POWER.

In an example, preambleInitialReceiveTargetPower, powerRampingStep, and numRepetitionPerPreambleAttempt may be from System Information Block (SIB). DELTA_PREAMBLE may be determined based on the preamble format, which is given by prach-ConfigIndex defined in System Information Block (SIB), as illustrated in FIG. 25. COUNTER may begin from 0 and be incremented by 1 by the MAC entity whenever a random access response reception is considered not successful.

In the RACH preamble retransmission, if a UE select a RACH resources different from the one selected in the previous RACH attempt, COUNTER may remain unchanged as illustrated in FIG. 30. In the RACH preamble retransmission, if a UE use a UE TX beam different from the one used in previous RACH attempt, COUNTER may remain unchanged as illustrated in FIG. 30.

Figure 35:
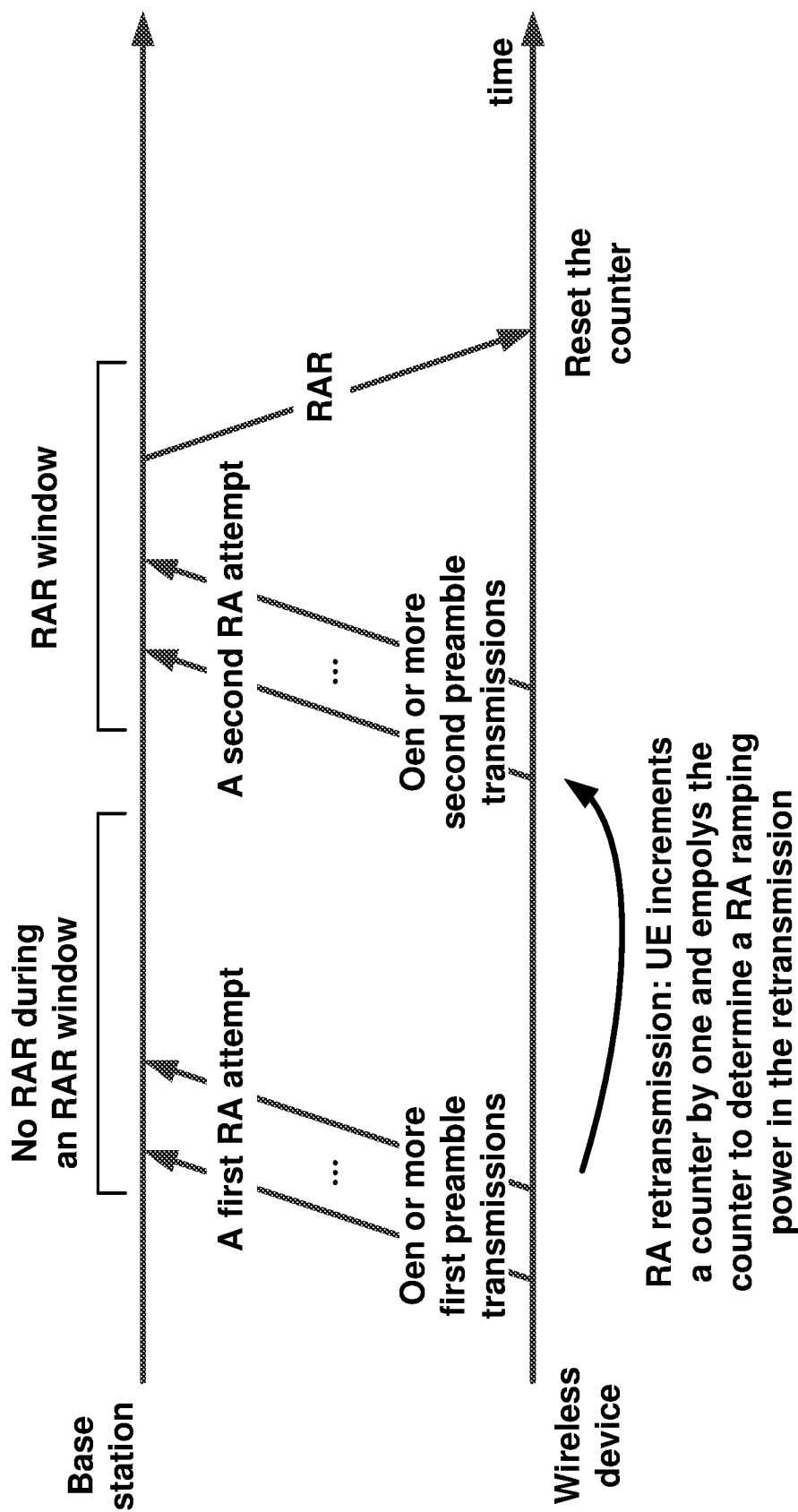
FIG. 35 is an example diagram for managing a counter as per an aspect of an embodiment of the present disclosure.

FIG. 35 shows an example of a counter. In an example, a wireless device may perform a first RA attempt during which the wireless device may transmit one or more first preambles to a base station before an expiration of an RAR window. The wireless device may employ a counter that may remain unchanged during a transmission of the one or more first preambles before an expiration of the RAR window. In response to no RAR detected during the RAR window, the wireless device may perform a second RA attempt, wherein the wireless device may transmit one or more second preambles. In response to no RAR detected, the wireless device may increment the counter by one and employ the counter to determine a RA ramping power value for the one or more second preamble transmissions during the second RA attempt. For example, the wireless device may compare the counter value with a threshold (preconfigured, and/or predefined) to determine if the wireless device transmit the one or more second preambles. If the counter value exceeds the threshold, the wireless device may determine a failure of RA procedure. In response to the failure of RA procedure, the wireless device may reset the counter. If the counter does not exceed the threshold, the wireless device may transmit the one or more second preambles. In response to receiving at least one RAR from a base station the wireless device may consider the RA procedure is successfully completed and may reset the counter.

In an example, a wireless device may receive one or more messages comprising configuration parameters of one or more random access channels; initiate a random access procedure for transmitting a plurality of random access preambles via the one or more random access channels; calculate one or more preamble transmission powers for each of a first plurality of random access preambles employing a first counter; monitor a control channel for a random access response during a random access response window; and increment the first counter by one for transmitting the first plurality of random access preambles on a plurality of radio beams; terminate the random access procedure when the first counter reaches a first value and no random access response is received.

In an example, the incrementing may be performed if the wireless device receives no RAR within a RAR window, or if none of received RARs contains any of one or more RA preamble identifiers corresponding the transmitted one or more RA preamble.

In the 4-step RA procedure under the multi-beam scenario, the DL Tx beam determination may be based on the reception of preamble transmission at gNB.

In the RA procedure, a UE may select a DL timing reference based on received SS block from gNB, select a subset of RACH preamble indices, and transmit a PRACH preamble based on the DL timing. The gNB may identify which SS block (NR-PSS, NR-SSS, PBCH and perhaps NR-TSS) beam is the best for the UE based on the association between SS blocks and the receiving PRACH preamble indices. The gNB may inform the UE of the detected best beam via a RAR identified by RA-RATI, and the informed beam may be used for subsequent DL transmission and/or for selecting a gNB RX beam for receiving subsequent UL transmission based on the gNB TX/RX beam correspondence. If the informed beam is used for subsequent DL/UL transmission, the UE may use the total power ramp-up accumulated from the first to the last preamble retransmission (when preamble is ramped up at least once) in the RA procedure in the same cell as a power offset in the UL transmit power of subsequent UL data transmission.

A UE may switch to another beam during the RA procedure. For example, if measurement reports on multiple beams are available at an early time during the RA procedure, gNB and/or a UE may switch the beams and/or trigger the beam refinement procedure to have a narrower beam. Such beam measurement reporting may be based on a SS-block and/or periodic CSI-RS RSRP measurements. Enhancing beam management (e.g., beam switching and/or beam refinement) during the RA procedure may be based on reporting one or more DL Tx beams and/or quality. A UE may include such beam information in Msg1 transmission. For example, the RA procedure may have an association between CSI-RS for L3 mobility and subset of RACH resources and/or subset of RACH preamble indices in addition to the association between SS blocks and subset of RACH resources and/or subset of RACH preamble indices. The RACH resource/preamble partitioning may be based on the pathloss measured at a UE. It may be possible that a CSI-RS for L3 mobility and a SS block may be mapped to the same subset of RACH resources and/or subset of RACH preamble indices to implicitly inform the association between CSI-RS for L3 mobility and SS blocks. In such a case, if both SS and CSI-RS measurements are available to a UE, then the UE may inform gNB of the preferred beams and/or beam quality corresponding to SS blocks and/or CSI-RS by selecting associated subset of RACH resources and/or subset of RACH preamble indices. From the reception of preamble transmissions, gNB may identify one or more SS beams as well as one or more CSI-RS beam that the UE prefers. gNB may transmit a RAR using the SS beam that the UE prefers. The RAR may contain an indicator of beam switching to CSI-RS beam, which is reported with preferred SS beams by the UE. In this case, the UE may reset a ramp-up power value to zero as a power offset in the UL transmit power, not using the total power ramp-up accumulated from the first to the last preamble retransmission. In an example, a UE may change a beam and select a different beam compared with the beam employed for preamble transmission. In this case, the UE may reset a ramp-up power value to zero as a power offset in the UL transmit power, not using the total power ramp-up accumulated from the first to the last preamble retransmission.

In New Radio, a wireless device switches a beam from a first beam to a second beam during a random access procedure. In an example, Implementation of existing random access mechanisms may result in inefficient uplink transmission power determination, increase a battery power consumption, and increase the amount of interference.

There is a need to enhance uplink transmission power determination process(es) to improve uplink transmission in a wireless device. In an example embodiment, a new uplink transmission power determination process may be implemented when switching a beam from a first beam to a second beam. An example embodiment may determine transmission powers of a transmissions subsequent to a RA procedure to improve uplink power control. Determination to reuse or not to reuse a ramping power in a subsequent transmission may improve an uplink transmit power control, and reduce an amount of interference to generate. In an example embodiment, a base station may transmit one or more messages (e.g. RAR) comprising a request of beam switching for a wireless device. The example mechanism may reduce a battery power consumption in a wireless device. Example embodiments improve an accuracy of uplink power control.

In an example, a UE may transmit to and/or receive from a base station one or more signals to switch one beam to another beam, e.g., between SS block associated beams, between CSI-RS associated beam, and/or between a SS bock associated beam and a CSI-RS associated beam. For example, the one or more signals may comprise at least one of a first message requesting beam switching, a second message configuring the beam switching, and/or a third message confirming a confirmation of implementation of the beam switching. Switching a beam during a RA procedure may significantly reduce a signaling overhead. For example, a base station may employ the switching the beam during the RA procedure for a beam refinement purpose. In an example, there may need two beam management procedures to switch a wide beam to a narrower beam: a first beam management procedure to determine the wide beam; and a second beam management procedure to switch from the wide beam to the narrower beam. Each procedure may require one or more signals exchanged between a base station and a UE. If the second beam management procedure is integrated into the first beam management procedure, the signal overhead may be reduced dramatically.

In an example, a UE may receive, from a base station, an RAR that may request to switch a beam from a first beam to a second beam. The UE may have a non-zero ramping power accumulated based on the first beam. For example, the UE may have performed one or more RA retransmission with the first beam wherein the UE increase the ramping power for at least one of the one or more RA retransmission. For example, the UE may determine the ramping power value by taking into account the RF environment of the first beam. When the UE switches the first beam to the second beam the RF environment may change, e.g., the antenna gain and/or pathloss exponent may change. If the UE employ the ramping power, that has increased based on the first beam, for a transmission with the second beam, the transmission may generate unnecessary interference, e.g., because of the changed RF environment. If the UE employ the ramping power, that has increased based on the first beam, for a transmission with the second beam, a transmit power for the transmission may not enough for a base station to detect and/or to decode data in the transmission. Thus, the UE may determine if the UE employ a ramping power accumulated during a RA procedure for the switched beam.

Figure 36:
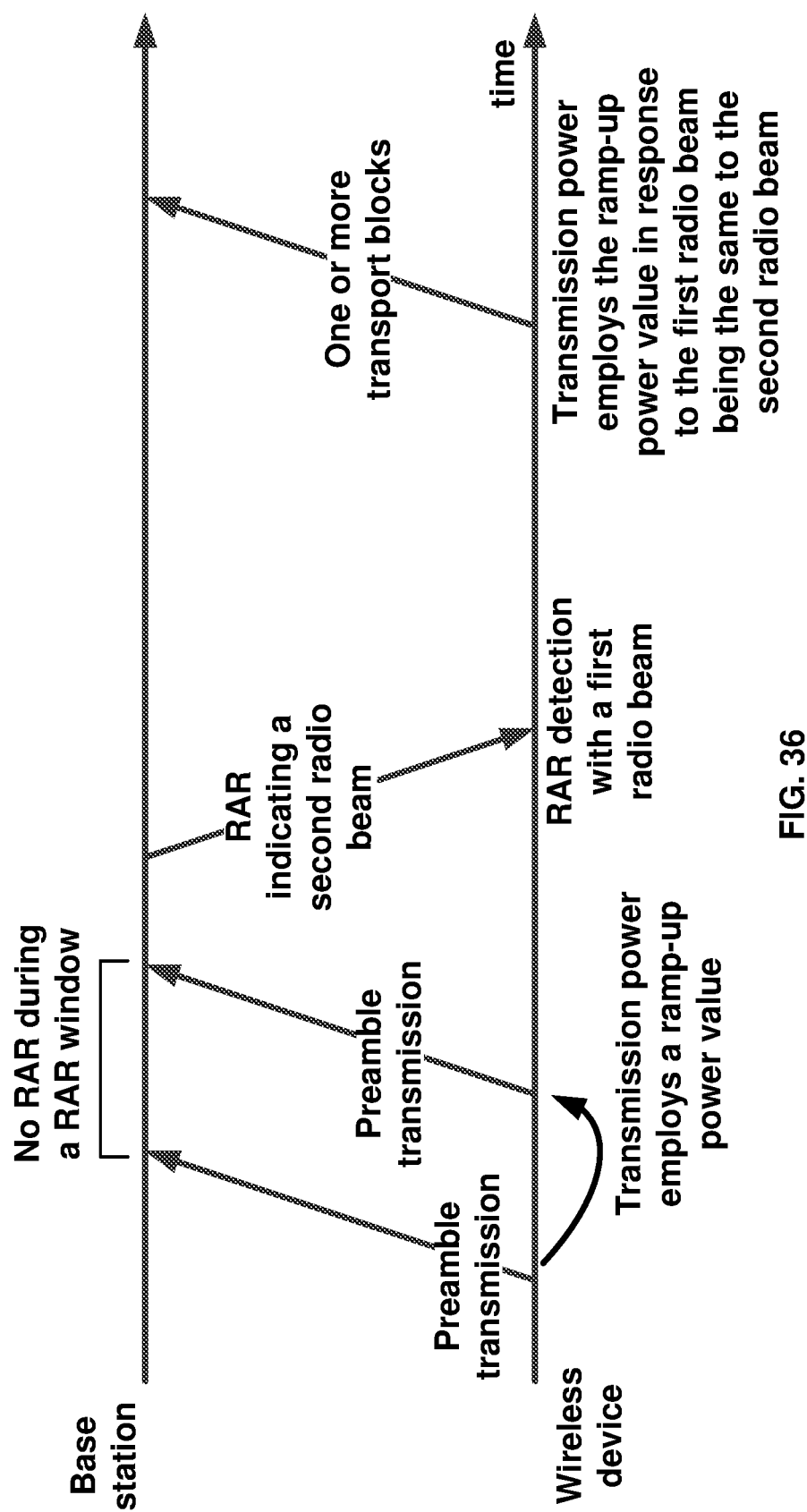
FIG. 36 is an example diagram for employing a ramping power as per an aspect of an embodiment of the present disclosure.

FIG. 36 shows an example embodiment determining a use of accumulated ramping power value. In an example, a wireless device may perform a RA procedure. The wireless device may transmit one or more first preambles with a first transmit power. If, during a RAR window, the wireless device does not receive from, a base station, any RAR corresponding to at least one of the one or more first preambles, the wireless device may retransmit one or more second preambles to the base station with a second transmit power, wherein the second transmit power may employ a ramping power value (e.g., to increase a success rate of the one or more second preamble transmission). If the wireless device receives, from the base station, at least one RAR corresponding to at least one of the one or more first preambles with a beam switching indication from a first beam to a second beam, the wireless device may or may not employ the ramping power accumulated during the RA procedure for the subsequent transmission (e.g., Msg3 transmission). For example, the wireless device may employ the ramping power accumulated during the RA procedure to determine a transmit power for the subsequent transmission if the first beam and the second beam are the same. For example, the wireless device may not employ the ramping power accumulated during the RA procedure to determine the transmit power for the subsequent transmission if the first beam is different from the second beam.

In an example, a UE may determine which preamble transmission was successful, based on a value of RA-RNTI. In an example, RA-RNTI may be calculated employing at least a time (e.g. TTI, slot, subframe) index and a frequency index, and or other parameters of RACH resources in which a corresponding preamble is transmitted.

Example power control mechanism is described here. Some detailed parameters are provided in examples. The basic processes may be implemented in technologies such as LTE, New Radio, and/or other technologies. A radio technology may have its own specific parameters. Example embodiments describe a method for implementing power control mechanism. Other example embodiments of the invention using different parameters may be implemented. Some example embodiments enhance physical layer power control mechanisms when some layer 2 parameters are taken into account.

In an example embodiment, downlink power control may determine the Energy Per Resource Element (EPRE). The term resource element energy may denote the energy prior to CP insertion. The term resource element energy may denote the average energy taken over constellation points for the modulation scheme applied. Uplink power control determines the average power over a SC-FDMA symbol in which the physical channel may be transmitted.

Uplink power control may control the transmit power of the different uplink physical channels.

In an example, if a UE is configured with a LAA SCell for uplink transmissions, the UE may apply the procedures described for PUSCH and SRS in this clause assuming frame structure type 1 for the LAA SCell unless stated otherwise.

In an example, for PUSCH, the transmit powe r $\hat{P}_{PUSCH,c}(i)$, may be first scaled by the ratio of the number of antennas ports with a non-zero PUSCH transmission to the number of configured antenna ports for the transmission scheme. The resulting scaled power may be then split equally across the antenna ports on which the non-zero PUSCH is transmitted. For PUCCH or SRS, the transmit power $\hat{P}_{PUCCH}(i)$, or $\hat{P}_{SRS,c}(i)$ may be split equally across the configured antenna ports for PUCCH or SRS. $\hat{P}_{SRS,c}(i)$ may be the linear value of $P_{SRS,c}(i)$. A cell wide overload indicator (OI) and a High Interference Indicator (HII) to control UL interference may be parameters in LTE technology.

In an example, for a serving cell with frame structure type 1, a UE is not expected to be configured with UplinkPowerControlDedicated-v12x0.

In an example, if the UE is configured with a SCG, the UE may apply the procedures described in this clause for both MCG and SCG
  When the procedures are applied for MCG, the terms 'secondary cell', 'secondary cells', 'serving cell', 'serving cells' in this clause refer to secondary cell, secondary cells, serving cell, serving cells belonging to the MCG respectively.
  When the procedures are applied for SCG, the terms 'secondary cell', 'secondary cells', 'serving cell', 'serving cells' in this clause refer to secondary cell, secondary cells (not including PSCell), serving cell, serving cells belonging to the SCG respectively. The term 'primary cell' in this clause refers to the PSCell of the SCG.

In an example, if the UE is configured with a PUCCH-SCell, the UE may apply the procedures described in this clause for both primary PUCCH group and secondary PUCCH group
  When the procedures are applied for primary PUCCH group, the terms 'secondary cell', 'secondary cells', 'serving cell', 'serving cells' in this clause refer to secondary cell, secondary cells, serving cell, serving cells belonging to the primary PUCCH group respectively.
  When the procedures are applied for secondary PUCCH group, the terms 'secondary cell', 'secondary cells', 'serving cell', 'serving cells' in this clause refer to secondary cell, secondary cells, serving cell, serving cells belonging to the secondary PUCCH group respectively.

In an example, if the UE transmits PUSCH without a simultaneous PUCCH for the serving cell c, then the UE transmit power $P_{PUSCH,c}(i)$ for PUSCH transmission in subframe i for the serving cell c may be given by $$P_{PUSCH,c}(i) = \min\left\{\begin{array}{l}P_{CMAX,c}(i),\\ 10\log_{10}(M_{PUSCH,c}(i)) + P_{O\_PUSCH,c}(j) + \\ \alpha_c(j)\cdot PL_c + \Delta_{TF,c}(i) + f_c(i)\end{array}\right\}[\text{dBm}]$$

In an example, if the UE transmits PUSCH simultaneous with PUCCH for the serving cell c, then the UE transmit power $P_{PUSCH,c}(i)$ for the PUSCH transmission in subframe i for the serving cell c may be given by $$P_{PUSCH,c}(i) = \min\left\{\begin{array}{l}10\log_{10}(\hat{P}_{CMAX,c}(i) - \hat{P}_{PUCCH}(i)),\\ 10\log_{10}(M_{PUSCH,c}(i)) + P_{O\_PUSCH,c}(j) + \\ \alpha_c(j)\cdot PL_c + \Delta_{TF,c}(i) + f_c(i)\end{array}\right\}[\text{dBm}]$$

In an example, if the UE is not transmitting PUSCH for the serving cell c, for the accumulation of TPC command received with DCI format 3/3A for PUSCH, the UE may assume that the UE transmit power $P_{PUSCH,c}(i)$ for the PUSCH transmission in subframe i for the serving cell c is computed by $$P_{PUSCH,c} = \min\{P_{CMAX,c}(i), P_{O\_PUSCH,c}(1) + \alpha_c(1)\cdot PL_c + f_c(i)\}\,[\text{dBm}]$$

In an example, depending on accumulation is enabled or not, $f_c(*)$ may be an accumulation or current absolute value. For both types of $f_c(*)$ (accumulation or current absolute) the first value is set as follows:
  In an example, if $P_{O\_UE\_PUSCH,c}$ value is changed by higher layers and serving cell c is the primary cell or, if $P_{O\_UE\_PUSCH,c}$ value is received by higher layers and serving cell c is a Secondary cell
    $f_c(0)=0$
  else
    $f_c(0)=\Delta P_{rampup,c}+\delta_{msg2,c}$, where
      $\delta_{msg\,2,\,c}$ is the TPC command indicated in the random access response corresponding to the random access preamble transmitted in the serving cell c
      $\Delta P_{rampup,c}=0$ if the UE receives the random access response message for a serving cell c, and there is a beam-switching order to another beam in the random access response message. Otherwise, $$\Delta P_{rampup,c} = \min\left[\left\{\max\left(0, P_{CMAX,c} - \begin{pmatrix}10\log_{10}(M_{PUSCH,c}(0)) + \\ P_{O\_PUSCH,c}(2) + \delta_{msg2} + \\ \alpha_c(2)\cdot PL + \Delta_{TF,c}(0)\end{pmatrix}\right)\right\}, \Delta P_{rampuprequested,c}\right]$$

where $\Delta P_{rampuprequested,c}$ is provided by higher layers and corresponds to the total power ramp-up requested by higher layers from the first to the last preamble in the serving cell c. When $\Delta P_{rampuprequested,c}=0$, then $f_c(0)=\delta_{msg2,c}$.

In an example, if $P_{O\_UE\_PUSCH,c,2}$ value is received by higher layers for a serving cell c.

$f_{c,2}(0)=0$

In an example, $P_{CMAX,c}(i)$ may be the configured UE transmit power in subframe i for serving cell c and $\hat{P}_{CMAX,c}(i)$ may be the linear value of $P_{CMAX,c}(i)$. In an example, if the UE transmits PUCCH without PUSCH in subframe i for the serving cell c, for the accumulation of TPC command received with DCI format 3/3A for PUSCH, the UE may assume $P_{CMAX,c}(i)$. In an example, if the UE does not transmit PUCCH and PUSCH in subframe i for the serving cell c, for the accumulation of TPC command received with DCI format 3/3A for PUSCH, the UE may compute $P_{CMAX,c}(i)$ assuming MPR=0 dB, A-MPR=0 dB, P-MPR=0 dB and ΔTC=0 dB, where MPR, A-MPR, P-MPR and ΔTC may be pre-defined in LTE technology. $\hat{P}_{PUCCH}(i)$ may be the linear value of $P_{PUCCH}(i)$. $M_{PUSCH,c}(i)$ may be the bandwidth of the PUSCH resource assignment expressed in number of resource blocks valid for subframe i and serving cell c.

In an example, if the UE may be configured with higher layer parameter UplinkPowerControlDedicated-v12x0 for serving cell c and if subframe i belongs to uplink power control subframe set 2 as indicated by the higher layer parameter tpc-SubframeSet-r12, when j=0, $P_{O\_PUSCH,c}(0)=P_{O\_UE\_PUSCH,c,2}(0)+P_{O\_NOMINAL\_PUSCH,c,2}(0)$ where j=0 may be used for PUSCH (re)transmissions corresponding to a semi-persistent grant. $P_{O\_UE\_PUSCH,c,2}(0)$ and $P_{O\_NOMINAL\_PUSCH,c,2}(0)$ may be the parameters p0-UE-PUSCH-Persistent-SubframeSet2-r12 and p0-NominalPUSCH-Persistent-SubframeSet2-r12 respectively provided by higher layers, for a serving cell c.

when j=1, $P_{O\_PUSCH,c}(1)=P_{O\_UE\_PUSCH,c,2}(1)+P_{O\_NOMINAL\_PUSCH,c,2}(1)$, where j=1 may be used for PUSCH (re)transmissions corresponding to a dynamic scheduled grant. $P_{O\_UE\_PUSCH,c,2}(1)$ and $P_{O\_NOMINAL\_PUSCH,c,2}(1)$ may be the parameters p0-UE-PUSCH-SubframeSet2-r12 and p0-NominalPUSCH-SubframeSet2-r12 respectively, provided by higher layers for serving cell c.

when j=2, $P_{O\_PUSCH,c}(2)=P_{O\_UE\_PUSCH,c}(2)+P_{O\_NOMINAL\_PUSCH,c}(2)$ where $P_{O\_UE\_PUSCH,c}(2)=0$ and $P_{O\_NOMINAL\_PUSCH,c}(2)=P_{O\_PRE}+\Delta_{PREAMBLE\_Msg\ 3}$, where the parameter preambleInitialReceivedTargetPower (from $P_{O\_PRE}$) and $\Delta_{PREAMBLE\_Msg\ 3}$ may be signalled higher layers for serving cell c, where j=2 may be used for PUSCH (re)transmissions corresponding to the random access response grant.

Otherwise $P_{O\_PUSCH,c}(j)$ may be a parameter composed of the sum of a component $P_{O\_NOMINAL\_PUSCH,c}(j)$ provided from higher layers for j=0 and 1 and a component $P_{O\_UE\_PUSCH,c}(j)$ provided by higher layers for j=0 and 1 for serving cell c. For PUSCH (re)transmissions corresponding to a semi-persistent grant then j=0, for PUSCH (re)transmissions corresponding to a dynamic scheduled grant then j=1 and for PUSCH (re)transmissions corresponding to the random access response grant then j=2. $P_{O\_UE\_PUSCH,c}(2)=0$ and $P_{O\_NOMINAL\_PUSCH,c}(2)$ $P_{O\_PRE}+\Delta_{PREAMBLE\_Msg\ 3}$ where the parameter preambleInitialReceivedTargetPower (from $P_{O\_PRE}$) and $\Delta_{PREAMBLE\_Msg\ 3}$ may be signalled higher layers for serving cell c.

In an example, if the UE may be configured with higher layer parameter UplinkPowerControlDedicated-v12x0 for serving cell c and if subframe i belongs to uplink power control subframe set 2 as indicated by the higher layer parameter tpc-SubframeSet-r12, For j=0 or 1, $\alpha_c(j)=\alpha_{c,2}\in\{0, 0.4, 0.5, 0.6, 0.7, 0.8, 0.9, 1\}$. $\alpha_{c,2}$ may be the parameter alpha-SubframeSet2-r12 provided by higher layers for a serving cell c.

For j=2, $\alpha_c(j)=1$.

Otherwise

For j=0 or 1, $\alpha_c\in\{0, 0.4, 0.5, 0.6, 0.7, 0.8, 0.9, 1\}$ may be a 3-bit parameter provided by higher layers for serving cell c. For j=2, $\alpha_c(j)=1$.

$PL_c$ may be the downlink path loss estimate calculated in the UE for serving cell c in dB and $PL_c$=referenceSignalPower−higher layer filtered RSRP, where referenceSignalPower may be provided by higher layers and RSRP may be defined for the reference serving cell and the higher layer filter configuration may be defined for the reference serving cell.

In an example, if serving cell c belongs to a TAG containing the primary cell then, for the uplink of the primary cell, the primary cell may be used as the reference serving cell for determining referenceSignalPower and higher layer filtered RSRP. For the uplink of the secondary cell, the serving cell configured by the higher layer parameter pathlossReferenceLinking may be used as the reference serving cell for determining referenceSignalPower and higher layer filtered RSRP.

In an example, if serving cell c belongs to a TAG containing the PSCell then, for the uplink of the PSCell, the PSCell may be used as the reference serving cell for determining referenceSignalPower and higher layer filtered RSRP; for the uplink of the secondary cell other than PSCell, the serving cell configured by the higher layer parameter pathlossReferenceLinking may be used as the reference serving cell for determining referenceSignalPower and higher layer filtered RSRP.

In an example, if serving cell c belongs to a TAG not containing the primary cell or PSCell then serving cell c may be used as the reference serving cell for determining referenceSignalPower and higher layer filtered RSRP.

$\Delta_{TF,c}(i)=10\log_{10}((2^{BPRE\cdot K_s}-1)\cdot\beta_{offset}^{PUSCH})$ for $K_S=1.25$ and 0 for $K_S=0$ where $K_S$ may be for given by the parameter deltaMCS-Enabled provided by higher layers for a serving cell c. BPRE and $\beta_{offset}^{PUSCH}$, for a serving cell c, may be computed as below. $K_S=0$ for transmission mode 2.

BPRE=$O_{CQI}/N_{RE}$ for control data sent via PUSCH without UL-SCH data and $$\sum_{r=0}^{C-1} K_r/N_{RE}$$

for other cases.

where C may be the number of code blocks, $K_r$ may be the size for code block r, $o_{CQI}$ may be the number of CQI/PMI bits including CRC bits and $N_{RE}$ may be the number of resource elements determined as $N_{RE}=M_{sc}^{PUSCH\text{-}initial}\cdot N_{symb}^{PUSCH\text{-}initial}$, where C, $K_r$, $M_{sc}^{PUSCH\text{-}initial}$ and $N_{symb}^{PUSCH\text{-}initial}$ may be pre-defined in LTE technology.

$\beta_{offset}^{PUSCH}=\beta_{offset}^{CQI}$ for control data sent via PUSCH without UL-SCH data and 1 for other cases.

$\delta_{PUSCH,c}$ may be a correction value, also referred to as a TPC command and may be included in PDCCH/EPDCCH with DCI format 0/0A/0B/4/4A/4B or in MPDCCH with DCI format 6-0A for serving cell c or jointly coded with other TPC commands in PDCCH/MPDCCH with DCI format 3/3A whose CRC parity bits may be scrambled with TPC-PUSCH-RNTI. In an example, if the UE may be configured with higher layer parameter UplinkPowerControlDedicated-v12x0 for serving cell c and if subframe i belongs to uplink power control subframe set 2 as indicated by the higher layer parameter tpc-SubframeSet-r12, the current PUSCH power control adjustment state for serving cell c may be given by $f_{c,2}(i)$, and the UE may use $f_{c,2}(i)$ instead of $f_c(i)$ to determine $P_{PUSCH,c}(i)$ Otherwise, the current PUSCH power control adjustment state for serving cell c may be given by $f_c(i)$.

In an example, $f_{c,2}(i)$ and $f_c(i)$ may be defined by:
$f_c(i)=f_c(i-1)+\delta_{PUSCH,c}(i-K_{PUSCH})$ and $f_{c,2}(i)=f_{c,2}(i-1)+\delta_{PUSCH,c}(i-K_{PUSCH})$ if accumulation may be enabled based on the parameter Accumulation-enabled provided by higher layers or if the TPC command $\delta_{PUSCH,c}$ may be included in a PDCCH/EPDCCH with DCI format 0 or in a MPDCCH with DCI format 6-0A for serving cell c where the CRC may be scrambled by the Temporary C-RNTI, where $\delta_{PUSCH,c}(i-K_{PUSCH})$ was signalled on PDCCH/EPDCCH with DCI format 0/0A/0B/4/4A/4B or MPDCCH with DCI format 6-0A or PDCCH/MPDCCH with DCI format 3/3A on subframe $i-K_{PUSCH}$, and where $f_c(0)$ may be the first value after reset of accumulation. For a BL/CE UE configured with CEModeA, subframe $i-K_{PUSCH}$ may be the last subframe in which the MPDCCH with DCI format 6-0A or MPDCCH with DCI format 3/3A may be transmitted.

The value of $K_{PUSCH}$ may be

For FDD or FDD-TDD and serving cell frame structure type 1, $K_{PUSCH}=4$

For TDD, if the UE may be configured with more than one serving cell and the TDD UL/DL configuration of at least two configured serving cells may be not the same, or if the UE may be configured with the parameter EIMTA-MainConfigServCell-r12 for at least one serving cell, or for FDD-TDD and serving cell frame structure type 2, the "TDD UL/DL configuration" refers to the UL-reference UL/DL configuration for serving cell c.

Figure 33:
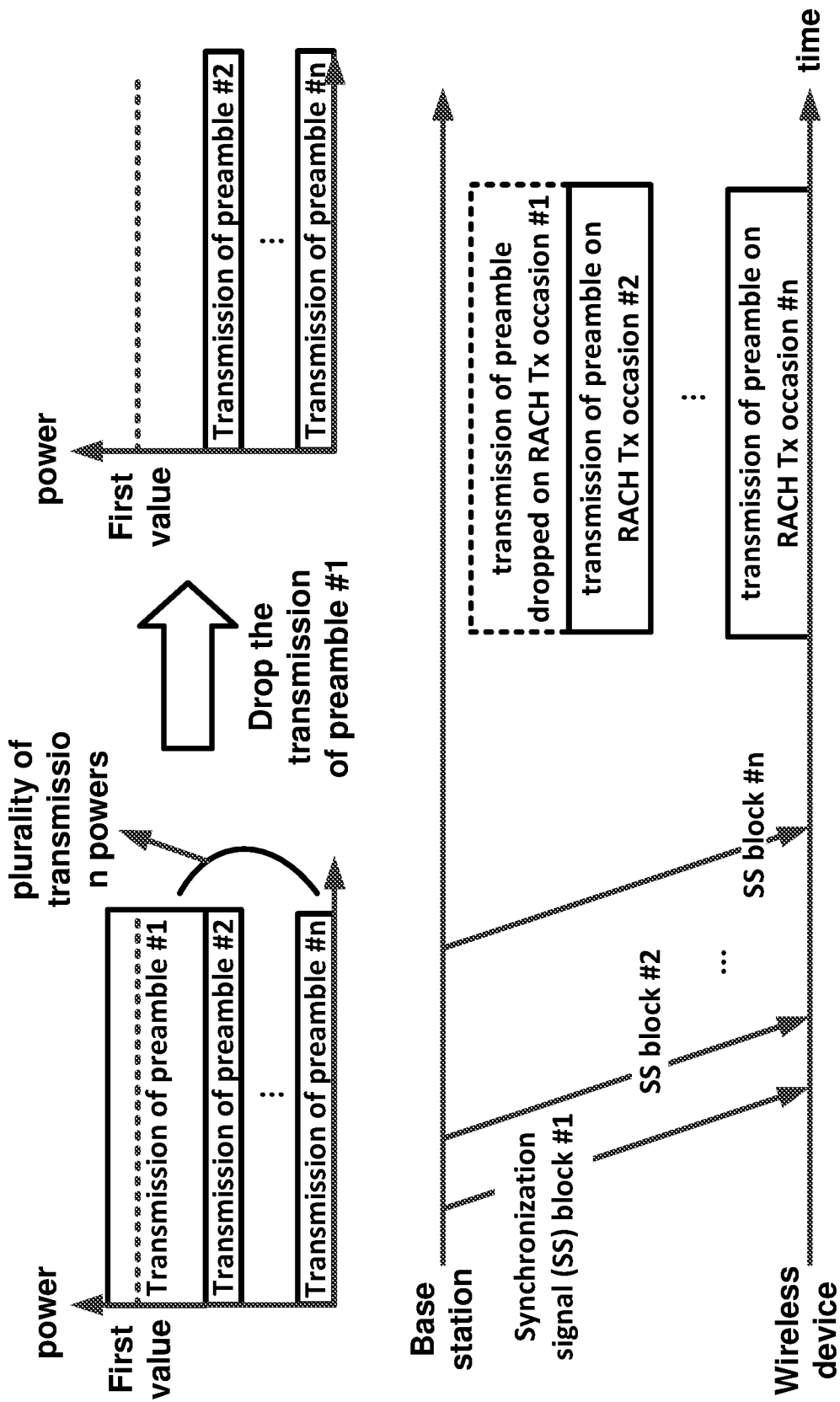
FIG. 33 is an example diagram for dropping one or more preamble transmissions as per an aspect of an embodiment of the present disclosure.

For TDD UL/DL configurations 1-6, $K_{PUSCH}$ may be given as a table in FIG. 33.

For TDD UL/DL configuration 0

In an example, if the PUSCH transmission in subframe 2 or 7 may be scheduled with a PDCCH/EPDCCH of DCI format 0/4 or a MPDCCH of DCI format 6-0A in which the LSB of the UL index may be set to 1, $K_{PUSCH}=7$ For other PUSCH transmissions, $K_{PUSCH}$ may be given as a table in FIG. 33.

For a serving cell with frame structure type 3, For an uplink DCI format 0A/0B/4A/4B with PUSCH trigger A set to 0, $K_{PUSCH}$ may be equal to k+1, where k and 1 may be pre-defined in LTE technology. For an uplink DCI format 0A/0B/4A/4B with PUSCH trigger A set to 1 and upon the detection of PDCCH with DCI CRC scrambled by CC-RNTI and with 'PUSCH trigger B' field set to '1', $K_{PUSCH}$ may be equal to p+k+1, where p, k and 1 may be pre-defined in LTE technology. In an example, if a UE detected multiple TPC commands in subframe $i-K_{PUSCH}$, the UE may use the TPC command in the PDCCH/EPDCCH with DCI format 0A/0B/4A/4B which schedules PUSCH transmission in subframe i.

For serving cell c and a non-BL/CE UE, the UE attempts to decode a PDCCH/EPDCCH of DCI format 0/0A/0B/4/4A/4B with the UE's C-RNTI or DCI format 0 for SPS C-RNTI and a PDCCH of DCI format 3/3A with this UE's TPC-PUSCH-RNTI in every subframe except when in DRX or where serving cell c may be deactivated.

For serving cell c and a BL/CE UE configured with CEModeA, the UE attempts to decode a MPDCCH of DCI format 6-0A with the UE's C-RNTI or SPS C-RNTI and a MPDCCH of DCI format 3/3A with this UE's TPC-PUSCH-RNTI in every BL/CE downlink subframe except when in DRX For a non-BL/CE UE, if DCI format 0/0A/0B/4/4A/4B for serving cell c and DCI format 3/3A may be both detected in the same subframe, then the UE may use the $\delta_{PUSCH,c}$ provided in DCI format 0/0A/0B/4/4A/4B.

For a BL/CE UE configured with CEModeA, if DCI format 6-0A for serving cell c and DCI format 3/3A may be both detected in the same subframe, then the UE may use the $\delta_{PUSCH,c}$ provided in DCI format 6-0A.

$\delta_{PUSCH,c}=0$ dB for a subframe where no TPC command may be decoded for serving cell c or where DRX occurs or i may be not an uplink subframe in TDD or FDD-TDD and serving cell c frame structure type 2.

$\delta_{PUSCH,c}=0$ dB if the subframe i may be not the first subframe scheduled by a PDCCH/EPDCCH of DCI format 0B/4B.

Figure 34:
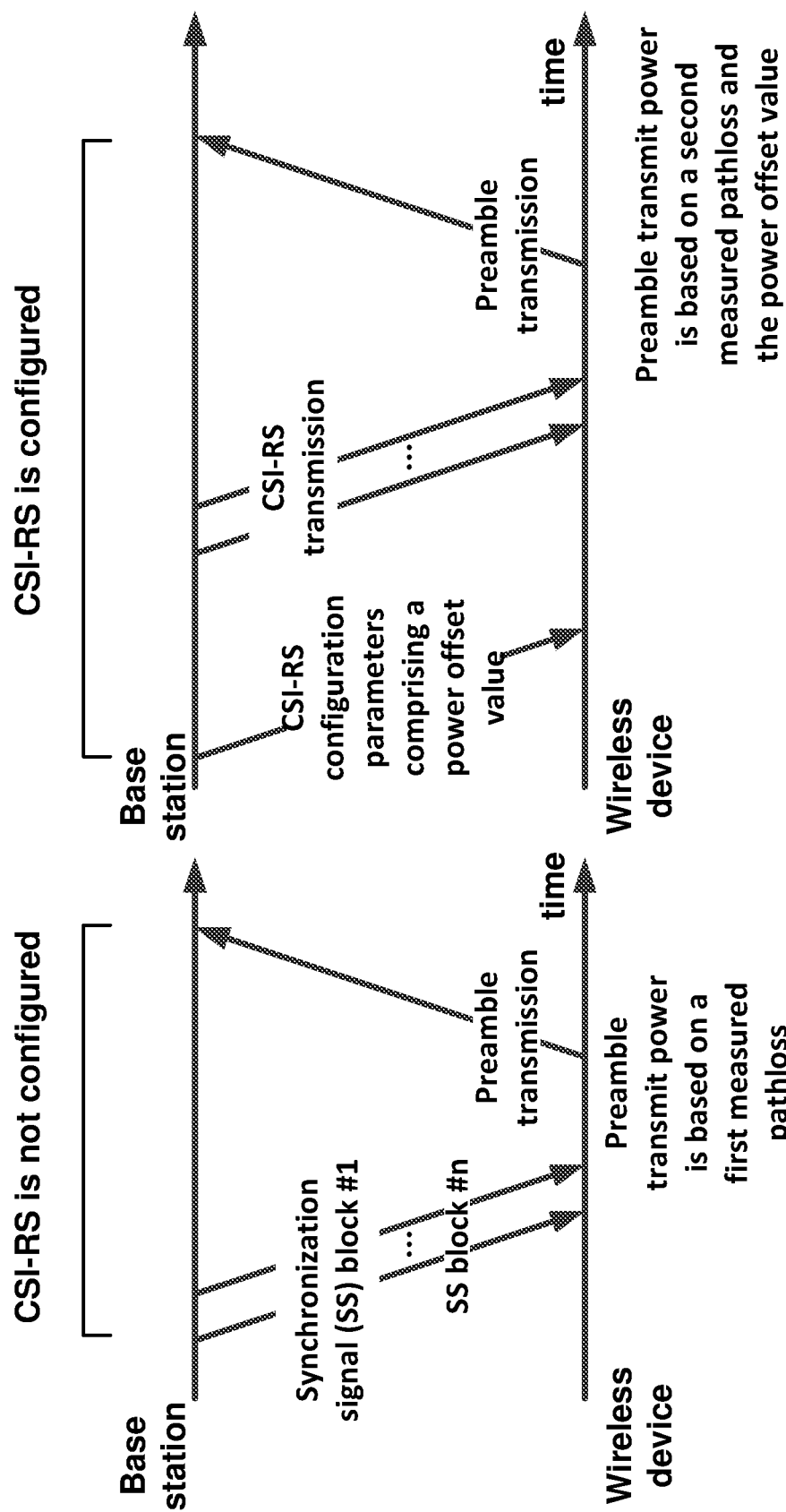
FIG. 34 is an example diagram for employing a power offset as per an aspect of an embodiment of the present disclosure.

The $\delta_{PUSCH,c}$ dB accumulated values signalled on PDCCH/EPDCCH with DCI format 0/0A/0B/4/4A/4B or MPDCCH with DCI format 6-0A may be given as a table in FIG. 34A. In an example, if the PDCCH/EPDCCH with DCI format 0 or MPDCCH with DCI format 6-0A may be validated as a SPS activation or release PDCCH/EPDCCH/MPDCCH, then $\delta_{PUSCH,c}$ may be 0 dB.

The $\delta_{PUSCH}$ dB accumulated values signalled on PDCCH/MPDCCH with DCI format 3/3A may be one of SET1 given as a table in FIG. 34A or SET2 given as a table FIG. 34B as determined by the parameter TPC-Index provided by higher layers.

In an example, if UE has reached $P_{CMAX,c}(i)$ for serving cell c, positive TPC commands for serving cell c may not be accumulated In an example, if UE has reached minimum power, negative TPC commands may not be accumulated.

In an example, if the UE may be not configured with higher layer parameter UplinkPowerControlDedicated-v12x0 for serving cell c, the UE may reset accumulation For serving cell c, when $P_{O\_UE\_PUSCH,c}$ value may be changed by higher layers For serving cell c, when the UE receives random access response message for serving cell c In an example, if the UE may be configured with higher layer parameter UplinkPowerControlDedicated-v12x0 for serving cell c, the UE may reset accumulation corresponding to $f_c(*)$ for serving cell c when $P_{O\_UE\_PUSCH,c}$ value may be changed by higher layers when the UE receives random access response message for serving cell c the UE may reset accumulation corresponding to $f_{c,2}(*)$ for serving cell c when $P_{O\_UE\_PUSCH,c,2}$ value may be changed by higher layers In an example, if the UE may be configured with higher layer parameter UplinkPowerControlDedicated-v12x0 for serving cell c and if subframe i belongs to uplink power control subframe set 2 as indicated by the higher layer parameter tpc-SubframeSet-r12 $f_c(i)=f_c(i-1)$ if subframe i does not belong to uplink power control subframe set 2 as indicated by the higher layer parameter tpc-SubframeSet-r12 $f_{c,2}(i)=f_{c,2}(i-1)$ $f_c(i)=\delta_{PUSCH,c}(i-K_{PUSCH})$ and $f_{c,2}(i)=\delta_{PUSCH,c}(i-K_{PUSCH})$ if accumulation may be not enabled for serving cell c based on the parameter Accumulation-enabled provided by higher layers where $\delta_{PUSCH,c}(i-K_{PUSCH})$ was signalled on PDCCH/EPDCCH with DCI format 0/0A/0B/4/4A/4B or MPDCCH with DCI format 6-0A for serving cell c on subframe K PUSCH For a BL/CE UE configured with CEModeA, subframe i-$K_{PUSCH}$ may be the last subframe in which the MPDCCH with DCI format 6-0A or MPDCCH with DCI format 3/3A may be transmitted.

The value of $K_{PUSCH}$ may be

For FDD or FDD-TDD and serving cell frame structure type 1, $K_{PUSCH}=4$

For TDD, if the UE may be configured with more than one serving cell and the TDD UL/DL configuration of at least two configured serving cells may be not the same, or if the UE may be configured with the parameter EIMTA-MainConfigServCell-r12 for at least one serving cell, or FDD-TDD and serving cell frame structure type 2, the "TDD UL/DL configuration" refers to the UL-reference UL/DL configuration for serving cell c.

For TDD UL/DL configurations 1-6, $K_{PUSCH}$ may be given as a table in FIG. 33.

For TDD UL/DL configuration 0

In an example, if the PUSCH transmission in subframe 2 or 7 may be scheduled with a PDCCH/EPDCCH of DCI format 0/4 or a MPDCCH with DCI format 6-0A in which the LSB of the UL index may be set to 1, $K_{PUSCH}=7$ For other PUSCH transmissions, $K_{PUSCH}$ may be given as a table in FIG. 33.

For a serving cell with frame structure type 3,

For an uplink DCI format 0A/4A with PUSCH trigger A set to 0, $K_{PUSCH}$ may be equal to k+l, where k and l may be pre-defined in LTE technology.

For an uplink DCI format 0B/4B with PUSCH trigger A set to 0, $K_{PUSCH}$ may be equal to k+l+i' with i'=mod($n_{HARQ\_ID}^i - n_{HARQ\_ID}$, $N_{HARQ}$), where $n^i_{HARQ\_ID}$ may be HARQ process number in subframe i, and k, l, $n_{HARQ\_ID}$ and $N_{HARQ}$ may be pre-defined in LTE technology.

For an uplink DCI format 0A/4A with PUSCH trigger A set to 1 and upon the detection of PDCCH with DCI CRC scrambled by CC-RNTI and with 'PUSCH trigger B' field set to '1', $K_{PUSCH}$ may be equal to p+k+l, where p, k and l may be pre-defined in LTE technology.

For an uplink DCI format 0B/4B with PUSCH trigger A set to 1 and upon the detection of PDCCH with DCI CRC scrambled by CC-RNTI and with 'PUSCH trigger B' field set to '1', $K_{PUSCH}$ may be equal to p+k+l+i' with i'=mod($n_{HARQ\_ID}^i - n_{HARQ\_ID}$, $N_{HARQ}$) where $n^i_{HARQ\_ID}$ may be HARQ process number in subframe i, and p, k, l, $n_{HARQ\_ID}$ and $N_{HARQ}$ may be pre-defined in LTE technology.

In an example, if a UE detected multiple TPC commands in subframe i-$K_{PUSCH}$, the UE may use the TPC command in the PDCCH/EPDCCH with DCI format 0A/0B/4A/4B which schedules PUSCH transmission in subframe i.

The $\delta_{PUSCH,c}$ dB absolute values signalled on PDCCH/EPDCCH with DCI format 0/0A/0B/4/4A/4B or a MPDCCH with DCI format 6-0A may be given as a table in FIG. 34A. In an example, if the PDCCH/EPDCCH with DCI format 0 or a MPDCCH with DCI format 6-0A may be validated as a SPS activation or release PDCCH/EPDCCH/MPDCCH, then $\delta_{PUSCH,c}$ may be 0 dB.

for a non-BL/CE UE, $f_c(i)=f_c(i-1)$ and $f_{c,2}(i)=f_{c,2}(i-1)$ for a subframe where no PDCCH/EPDCCH with DCI format 0/0A/0B/4/4A/4B may be decoded for serving cell c or where DRX occurs or i may be not an uplink subframe in TDD or FDD-TDD and serving cell c frame structure type 2.

for a BL/CE UE configured with CEModeA, $f_c(i)=f_c(i-1)$ and $f_{c,2}(i)=f_{c,2}(i-1)$ for a subframe where no MPDCCH with DCI format 6-0A may be decoded for serving cell c or where DRX occurs or i may be not an uplink subframe in TDD.

In an example, if the UE may be configured with higher layer parameter UplinkPowerControlDedicated-v12x0 for serving cell c and if subframe i belongs to uplink power control subframe set 2 as indicated by the higher layer parameter tpc-SubframeSet-r12 $f_c(i)=f_c(i-1)$ if subframe i does not belong to uplink power control subframe set 2 as indicated by the higher layer parameter tpc-SubframeSet-r12 $f_{c,2}(i)=f_{c,2}(i-1)$ In an example, if serving cell c may be the primary cell, for PUCCH format 1/1a/1b/2/2a/2b/3, the setting of the UE Transmit power $P_{PUCCH}$ for the physical uplink control channel (PUCCH) transmission in subframe i for serving cell c may be defined by $$P_{PUCCH}(i) = \min\left\{\begin{array}{l} P_{CMAX,c}(i), \\ P_{0\_PUCCH} + PL_c + h(n_{CQI}, n_{HARQ}, n_{SR}) + \\ \Delta_{F\_PUCCH}(F) + \Delta_{TxD}(F') + g(i) \end{array}\right\} [\text{dBm}]$$

In an example, if serving cell c may be the primary cell, for PUCCH format 4/5, the setting of the UE Transmit power $P_{PUCCH}$ for the physical uplink control channel (PUCCH) transmission in subframe i for serving cell c may be defined by $$P_{PUCCH}(i) = \min\left\{\begin{array}{l} P_{CMAX,c}(i), \\ P_{0\_PUCCH} + PL_c + 10\log_{10} \\ (M_{PUCCH,c}(i)) + \Delta_{TF,c}(i) + \Delta_{F\_PUCCH}(F) + g(i) \end{array}\right\} [\text{dBm}]$$

In an example, if the UE may be not transmitting PUCCH for the primary cell, for the accumulation of TPC command for PUCCH, the UE may assume that the UE transmit power $P_{PUCCH}$ for PUCCH in subframe i may be computed by $P_{PUCCH}(i)=\min\{P_{CMAX,c}(i), P_{O\_PUCCH}+PL_c+g(i)\}$ [dBm]

In an example, $$g(i) = g(i-1) + \sum_{m=0}^{M-1} \delta_{PUCCH}(i-k_m)$$

where g(i) may be the current PUCCH power control adjustment state and where g(0) may be the first value after reset.

For FDD or FDD-TDD and primary cell frame structure type 1, M=1 and $k_0$=4.

For TDD, values of M and $k_m$ may be pre-defined in the LTE technology.

The $\delta_{PUCCH}$ dB values signalled on PDCCH with DCI format 1A/1B/1D/1/2A/2/2B/2C/2D or EPDCCH with DCI format 1A/1B/1D/1/2A/2/2B/2C/2D or MPDCCH with DCI format 6-1A may be given as a table in FIG. 35. In an example, if the PDCCH with DCI format 1/1A/2/2A/2B/2C/2D or EPDCCH with DCI format 1/1A/2/2A/2B/2C/2D or MPDCCH with DCI format 6-1A may be validated as an SPS activation PDCCH/EPDCCH/MPDCCH, or the PDCCH/EPDCCH with DCI format 1A or MPDCCH with DCI format 6-1A may be validated as an SPS release PDCCH/EPDCCH/MPDCCH, then $\delta_{PUCCH}$ may be 0 dB.

The $\delta_{PUCCH}$ dB values signalled on PDCCH/MPDCCH with DCI format 3/3A may be given as a table in FIG. 35 or as a table in FIG. 36 as semi-statically configured by higher layers.

In an example, if $P_{O\_UE\_PUCCH}$ value may be changed by higher layers, g(0)=0

Else g(0)=$\Delta P_{rampup}$+$\delta_{msg\ 2}$, where $\delta_{msg\ 2}$ may be the TPC command indicated in the random access response corresponding to the random access preamble transmitted in the primary cell, and if UE is transmitting PUCCH in subframe i, if the UE receives the random access response message, and there is a beam-switching order to another beam in the random access response message, then $\Delta P_{rampup}$=0 else, $$\Delta P_{rampup} = \min\left[\left\{\max\left(0, P_{CMAX,c} - \begin{pmatrix} P_{0\_PUCCH} + \\ PL_c + h(n_{CQI}, n_{HARQ}, n_{SR}) + \\ \Delta_{F\_PUCCH}(F) + \Delta_{TxD}(F') \end{pmatrix}\right)\right\}, \Delta P_{rampuprequested}\right].$$

Otherwise, $\Delta P_{rampup}$=min[{max(0,$P_{CMAX,c}$-($P_{O\_PUCCH}$+$PL_c$))}, $\Delta P_{rampuprequested}$]

where $\Delta P_{rampuprequested}$ may be provided by higher layers and corresponds to the total power ramp-up requested by higher layers from the first to the last preamble in the primary cell. When $\Delta P_{rampuprequested,c}$=0, then g(0)=$\Delta P_{rampup}$+$\delta_{msg\ 2}$.

In an example, if UE has reached $P_{CMAX,\ c}$(i) for the primary cell, positive TPC commands for the primary cell may not be accumulated.

In an example, if UE has reached minimum power, negative TPC commands may not be accumulated.

UE may reset accumulation when $P_{O\_UE\_PUCCH}$ value may be changed by higher layers when the UE receives a random access response message for the primary cell g(i)=g(i-1) if i may be not an uplink subframe in TDD or FDD-TDD and primary cell frame structure type 2.

In an example, $P_{CMAX,\ c}$(i) may be the configured UE transmit power in subframe i for serving cell c. In an example, if the UE does not transmit PUCCH and PUSCH in subframe i for the serving cell c, for the accumulation of TPC command for PUCCH, the UE may compute $P_{CMAX,\ c}$(i) assuming MPR=0 dB, A-MPR=0 dB, P-MPR=0 dB and $\Delta T_C$=0 dB, where MPR, A-MPR, P-MPR and $\Delta T_C$ may be pre-defined in LTE technology.

The parameter $\Delta_{F\_PUCCH}$(F) may be provided by higher layers. a $\Delta_{F\_PUCCH}$(F) value corresponds to a PUCCH format (F) relative to PUCCH format 1a, where a PUCCH format (F) may be pre-defined in LTE technology.

In an example, if the UE may be configured by higher layers to transmit PUCCH on two antenna ports, the value of $\Delta_{TxD}$(F') may be provided by higher layers where a PUCCH format F' may be pre-defined in LTE technology; otherwise, $\Delta_{TxD}$(F')=0.

$h(n_{CQI}, n_{HARQ}, n_{SR})$ may be a PUCCH format dependent value, where $n_{CQI}$ corresponds to the number of information bits for the channel quality information. $n_{SR}$=1 if subframe i may be configured for SR for the UE not having any associated transport block for UL-SCH, otherwise $n_{SR}$=0. In an example, if the UE may be configured with more than one serving cell, or the UE may be configured with one serving cell and transmitting using PUCCH format 3, the value of $n_{HARQ}$ may be pre-defined in LTE technology; otherwise, $n_{HARQ}$ may be the number of HARQ-ACK bits sent in subframe i.

For PUCCH format 1, 1a and 1b $h(n_{CQI}, n_{HARQ}, n_{SR})$=0

For PUCCH format 1b with channel selection, if the UE may be configured with more than one serving cell, $$h(n_{CQI}, n_{HARQ}, n_{SR}) = \frac{(n_{HARQ} - 1)}{2},$$

otherwise, $h(n_{CQI}, n_{HARQ}, n_{SR})$=0

For PUCCH format 2, 2a, 2b and normal cyclic prefix $$h(n_{CQI}, n_{HARQ}, n_{SR}) = \begin{cases} 10\log_{10}\left(\frac{n_{CQI}}{4}\right) \\ 0 \end{cases}$$

if $n_{CQI}$≥4 otherwise

For PUCCH format 2 and extended cyclic prefix $$h(n_{CQI}, n_{HARQ}, n_{SR}) = \begin{cases} 10\log_{10}\left(\frac{n_{CQI} + n_{HARQ}}{4}\right) \\ 0 \end{cases}$$

if $n_{CQI}$+$n_{HARQ}$≥4 otherwise

For PUCCH format 3 and when UE transmits HARQ-ACK/SR without periodic CSI,

In an example, if the UE may be configured by higher layers to transmit PUCCH format 3 on two antenna ports, or if the UE transmits more than 11 bits of HARQ-ACK/SR $$h(n_{CQI}, n_{HARQ}, n_{SR}) = \frac{n_{HARQ} + n_{SR} - 1}{3}$$

Otherwise $$h(n_{CQI}, n_{HARQ}, n_{SR}) = \frac{n_{HARQ} + n_{SR} - 1}{2}$$

For PUCCH format 3 and when UE transmits HARQ-ACK/SR and periodic CSI,
  In an example, if the UE may be configured by higher layers to transmit PUCCH format 3 on two antenna ports, or if the UE transmits more than 11 bits of HARQ-ACK/SR and CSI $$h(n_{CQI}, n_{HARQ}, n_{SR}) = \frac{n_{HARQ} + n_{SR} + n_{CQI} - 1}{3}$$

Otherwise $$h(n_{CQI}, n_{HARQ}, n_{SR}) = \frac{n_{HARQ} + n_{SR} + n_{CQI} - 1}{2}$$

For PUCCH format 4, $M_{PUCCH,c}(i)$ may be the bandwidth of the PUCCH format 4 expressed in number of resource blocks valid for subframe i and serving cell c. For PUCCH format 5, $M_{PUCCH,c}(i)=1$.
$\Delta_{TF,c}(i)=10 \log_{10}(2^{1.25 \cdot BPRE(i)}-1)$ where $BPRE(i)=O_{UCI}(i)/N_{RE}(i)$,
  $o_{UCI}(i)$ may be the number of HARQ-ACK/SR/RI/CQI/PMI bits including CRC bits transmitted on PUCCH format 4/5 in subframe i;
  $N_{RE}(i)=M_{PUCCH,c}(i) \cdot N_{sc}^{RB} \cdot N_{symb}^{PUCCH}$ for PUCCH format 4 and $N_{RE}(i)=N_{sc}^{RB} \cdot N_{symb}^{PUCCH}/2$ for PUCCH format 5;
  $N_{symb}^{PUCCH}=2 \cdot (N_{symb}^{UL}-1)-1$ if shortened PUCCH format 4 or shortened PUCCH format 5 may be used in subframe i and $N_{symb}^{PUCCH}=2 \cdot (N_{symb}^{UL}-1)$ otherwise.

$P_{O\_PUCCH}$ may be a parameter composed of the sum of a parameter $P_{O\_NOMINAL\_PUCCH}$ provided by higher layers and a parameter $P_{O\_UE\_PUCCH}$ provided by higher layers.

$\delta_{PUCCH}$ may be a UE specific correction value, also referred to as a TPC command, included in a PDCCH with DCI format 1A/1B/1D/1/2A/2/2B/2C/2D for the primary cell, or included in a MPDCCH with DCI format 6-1A, or included in an EPDCCH with DCI format 1A/1B/1D/1/2A/2/2B/2C/2D for the primary cell, or sent jointly coded with other UE specific PUCCH correction values on a PDCCH/MPDCCH with DCI format 3/3A whose CRC parity bits may be scrambled with TPC-PUCCH-RNTI.
  For a non-BL/CE UE, if the UE may be not configured for EPDCCH monitoring, the UE attempts to decode a PDCCH of DCI format 3/3A with the UE's TPC-PUCCH-RNTI and one or several PDCCHs of DCI format 1A/1B/1D/1/2A/2/2B/2C/2D with the UE's C-RNTI or SPS C-RNTI on every subframe except when in DRX.
  In an example, if a UE may be configured for EPDCCH monitoring, the UE attempts to decode a PDCCH of DCI format 3/3A with the UE's TPC-PUCCH-RNTI and one or several PDCCHs of DCI format 1A/1B/1D/1/2A/2/2B/2C/2D with the UE's C-RNTI or SPS C-RNTI, and
  one or several EPDCCHs of DCI format 1A/1B/1D/1/2A/2/2B/2C/2D with the UE's C-RNTI or SPS C-RNTI.
  For a BL/CE UE configured with CEModeA, the UE attempts to decode a MPDCCH of DCI format 3/3A with the UE's TPC-PUCCH-RNTI and MPDCCH of DCI format 6-1A with the UE's C-RNTI or SPS C-RNTI on every BL/CE downlink subframe except when in DRX.
  In an example, if the UE decodes
    a PDCCH with DCI format 1A/1B/1D/1/2A/2/2B/2C/2D or
    an EPDCCH with DCI format 1A/1B/1D/1/2A/2/2B/2C/2D or
    an MPDCCH with DCI format 6-1A
    for the primary cell and the corresponding detected RNTI equals the C-RNTI or SPS C-RNTI of the UE and the TPC field in the DCI format may be not used to determine the PUCCH resource, the UE may use the $\delta_{PUCCH}$ provided in that PDCCH/EPDCCH/MPDCCH.
  Else
    if the UE decodes a PDCCH/MPDCCH with DCI format 3/3A, the UE may use the $\delta_{PUCCH}$ provided in that PDCCH/MPDCCH
    else the UE may set $\delta_{PUCCH}=0$ dB.
  For a BL/CE UE configured with CEModeA, if the PUCCH may be transmitted in more than one subframe $i_0, i_1, \ldots, i_{N-1}$ where $i_0 < i_1 < \ldots < i_{N-1}$, the PUCCH transmit power in subframe $i_k$, $k=0, 1, \ldots, N-1$ may be determined by $$P_{PUCCH,c}(i_k) = P_{PUCCH,c}(i_0)$$

For a BL/CE UE configured with CEModeB, the PUCCH transmit power in subframe ik may be determined by $$P_{PUCCH,c}(i_k) = P_{CMAX,c}(i_0)$$

The setting of the UE Transmit power $P_{SRS}$ for the SRS transmitted on subframe i for serving cell c may be defined by:
  for serving cell c with frame structure type 2, and not configured for PUSCH/PUCCH transmission $$P_{SRS,c}(i) = \min\{P_{CMAX,c}(i), 10 \log_{10}(M_{SRS,c}) + P_{O\_SRS,c}(m) + \alpha_{SRS,c} \cdot PL_c + f_{SRS,c}(i)\} \text{ [dBm]}$$

otherwise $$P_{SRS,c}(i) = \min\{P_{CMAX,c}(i), P_{SRS\_OFFSET,c}(m) + 10 \log_{10}(M_{SRS,c}) + P_{O\_PUSCH,c}(j) + \alpha_c(j) \cdot PL_c + f_c(i)\} \text{ [dBm]}$$

In an example,
If accumulation may be enabled, $f_{SRS,c}(0)$ may be the first value after reset of accumulation. The UE may reset accumulation
  For serving cell c, when $P_{O\_UE\_SRS,c}$ value may be changed by higher layers
  For serving cell c, when the UE receives random access response message for serving cell c.
For both types of $f_{SRS,c}(*)$ (accumulation or current absolute) the first value may be set as follows:
  In an example, if $P_{O\_UE\_SRS,c}$ value may be received by higher layers
    $f_{SRS,c}(0)=0$ else
    if the UE receives the random access response message for a serving cell c
        $f_{SRS,c}(0)=\Delta P_{rampup,c}$ where $\Delta P_{rampup,c}=0$ if the UE receives the random access response message for a serving cell c, and there is a beam-switching order to another beam in the random access response message. Otherwise, $$\Delta P_{rampup,c} = \min\left[\left\{\max\begin{pmatrix}0,\\P_{CMAX,c} - \begin{pmatrix}10\log_{10}(M_{SRS,c}(0)) + \\ P_{O\_SRS,c}(m) + \alpha_{SRS,c} \cdot PL_c\end{pmatrix}\end{pmatrix}\right\},\\ \Delta P_{rampuprequested,c}\right]$$

where $\Delta P_{rampuprequested,c}$ may be provided by higher layers and corresponds to the total power ramp-up requested by higher layers from the first to the last preamble in the serving cell c, $M_{SRS,c}(0)$ may be the bandwidth of the SRS transmission expressed in number of resource blocks valid for the subframe of first SRS transmission in the serving cell c.

In an example, $P_{CMAX,c}(i)$ may be the configured UE transmit power in subframe i for serving cell c. $P_{SRS\_OFFSET,c}(m)$ may be semi-statically configured by higher layers for m=0 and m=1 for serving cell c. For SRS transmission given trigger type 0 then m=0 and for SRS transmission given trigger type 1 then m=1. $M_{SRS,c}$ may be the bandwidth of the SRS transmission in subframe i for serving cell c expressed in number of resource blocks. $f_c(i)$ may be the current PUSCH power control adjustment state for serving cell c. $P_{O\_PUSCH,c}(j)$ and $\alpha_c(j)$ may be parameters as pre-defined in LTE technology for subframe i, where j=1. $\alpha_{SRS,c}$ may be the higher layer parameter alpha-SRS configured by higher layers for serving cell 1 c. $P_{O\_SRS,c}(m)$ may be a parameter composed of the sum of a component $P_{O\_NOMINAL\_SRS,c}(m)$ provided from higher layers for m=0 and 1 and a component $P_{O\_UE\_SRS,c}(m)$ provided by higher layers for m=0 and 1 for serving cell c. For SRS transmission given trigger type 0 then m=0 and for SRS transmission given trigger type 1 then m=1.

For serving cell c with frame structure type 2, and not configured for PUSCH/PUCCH transmission, the current SRS power control adjustment state may be given by $f_{SRS,c}(i)$ and may be defined by:

$f_{SRS,c}(i)=f_{SRS,c}(i-1)+\delta_{SRS,c}(i-K_{SRS})$ if accumulation may be enabled, and $f_{SRS,c}(i)=\delta_{SRS,c}(i-K_{SRS})$ if accumulation may be not enabled based on higher layer parameter Accumulation-enabled, where $\delta_{SRS,c}(i-K_{SRS})$ may be a correction value, also referred to as a SRS TPC command signalled on PDCCH with DCI format 3B in the most recent subframe $i-K_{SRS}$, where $K_{SRS} \geq 4$.

The UE may be not expected to receive different SRS TPC command values for serving cell c in the same subframe. For serving cell c with frame structure type 2, and not configured for PUSCH/PUCCH transmission, the UE attempts to decode a PDCCH of DCI format 3B with CRC scrambled by higher layer parameter SRS-TPC-RNTI-r14 in every subframe except when in DRX or where serving cell e may be deactivated. $\delta_{SRS,c}=0$ dB for a subframe where no TPC command in PDCCH with DCI 3B may be decoded for serving cell c or where DRX occurs or i may be not an uplink/special subframe in TDD or FDD-TDD and serving cell c frame structure type 2.

In an example, if higher layer parameter fieldTypeFormat3B indicates 2-bit TPC command, the $\delta_{SRS}$ dB values signalled on PDCCH with DCI format 3B may be given as a table in FIG. 34A by replacing $\delta_{PUSCH,c}$ with $\delta_{SRS}$, or if higher layer parameter fieldTypeFormat3B indicates 1-bit TPC command $\delta_{SRS}$ dB signalled on PDCCH with DCI format 3B may be given as a table in FIG. 34B by replacing $\delta_{PUSCH,c}$ with $\delta_{SRS}$.

In an example, a wireless device may receive one or more messages comprising configuration parameters of one or more random access channels; initiate a random access procedure for transmitting one or more random access preambles via the one or more random access channels; transmit the one or more random access preambles via one or more radio beams; receive a random access response (RAR) during a random access response window; determine a first radio beam in the one or more radio beams based on an RA-RNTI corresponding to the RAR, wherein the radio beam is employed for a random access preamble transmission; transmit, via a second radio beam, one or more transport blocks with a first transmission power. In an example, the first transmission power may employ a ramp-up power value, where the ramp-up power value: is equal to zero if the first radio beam is different from the second radio beam; and is equal to a total power ramp-up from a first transmission to a last transmission of the random access preamble if the preamble is transmitted more than one time via the first radio beam.

According to various embodiments, a device such as, for example, a wireless device, off-network wireless device, a base station, and/or the like, may comprise one or more processors and memory. The memory may store instructions that, when executed by the one or more processors, cause the device to perform a series of actions. Embodiments of example actions are illustrated in the accompanying figures and specification. Features from various embodiments may be combined to create yet further embodiments.

Figure 37:
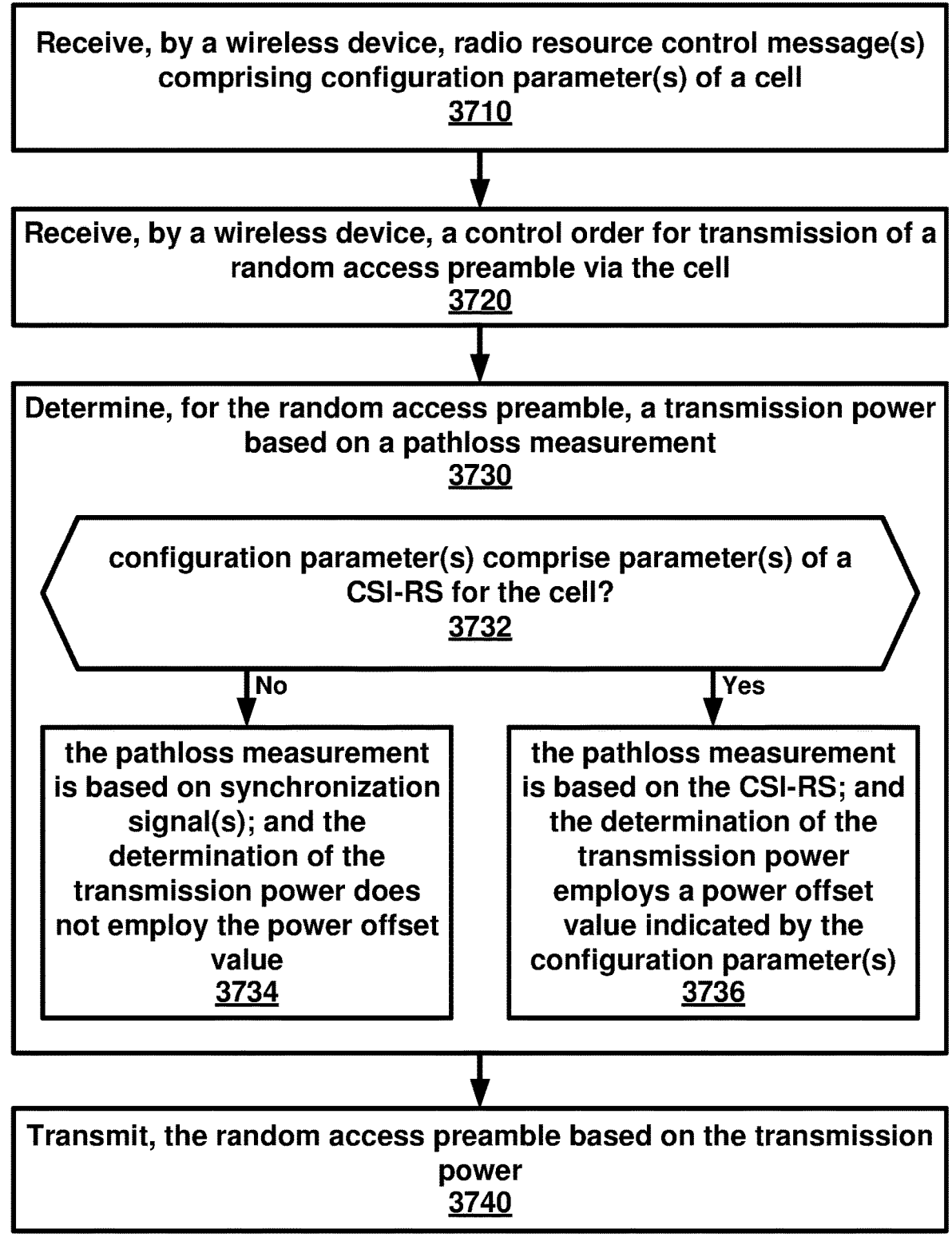
FIG. 37 is an example flow diagram as per an aspect of an embodiment of the present disclosure.

FIG. 37 is an example flow diagram as per an aspect of an embodiment of the present disclosure. At 3710, a wireless device may receive at least one radio resource control message comprising one or more configuration parameters of a cell. At 3720, the wireless device may receive a control order for transmission of a random access preamble via the cell. At 3730, a transmission power based on a pathloss measurement may be determined for the random access preamble. When the one or more configuration parameters comprise one or more parameters of a channel state information reference signal (CSI-RS) for the cell (3732): the pathloss measurement may be based on the CSI-RS and the determination of the transmission power may employ a power offset value indicated by the one or more configuration parameters (3736). When the one or more configuration parameters do not comprise CSI-RS parameters for the cell (3732): the pathloss measurement may be based on at least one synchronization signal; and the determining the transmission power does not employ the power offset value (3734). At 3740, the random access preamble may be transmitted based on the transmission power.

According to an embodiment, the CSI-RS may be a periodic CSI-RS. According to an embodiment, the one or more parameters of the CSI-RS may indicate a periodicity of the CSI-RS. According to an embodiment, the one or more parameters of the CSI-RS indicate at least one of one or more CSI-RS subcarriers of resource elements or a CSI-RS sequence. According to an embodiment, the one or more messages may comprise at least one of a reference signal power value, a preamble base station received target power, or a configured wireless device transmit power for the cell. According to an embodiment, the transmission power may be based on a sum of a preamble base station received target power and a value of the pathloss measurement. According to an embodiment, the value of the pathloss measurement may be based on a reference signal power value minus a measured received power value of a reference signal. When the one or more configuration parameters comprise one or more parameters of the CSI-RS for the cell, the reference signal may be the CSI-RS. When the one or more configuration parameters do not comprise CSI-RS parameters for the cell, the reference signal may be at least one synchronization signal. According to an embodiment, the determination of the transmission power may be further based on a reference signal power value. According to an embodiment, the transmission power may employ the value of the pathloss measurement determined based on a received power of the CSI-RS. According to an embodiment, when the one or more configuration parameters comprise one or more parameters of the CSI-RS, the transmitting the random access preamble may use at least one random access channel. The one or more messages may indicate: an association between one or more synchronization signals and the CSI-RS; and an association between the at least one random access channel and the one or more synchronization signals. According to an embodiment, the one or more messages may indicate: one or more synchronization signals associated with the CSI-RS; and at least one random access channel associated with the one or more synchronization signals. The wireless device may transmit the random access preamble via the at least one random access channel.

Figure 38:
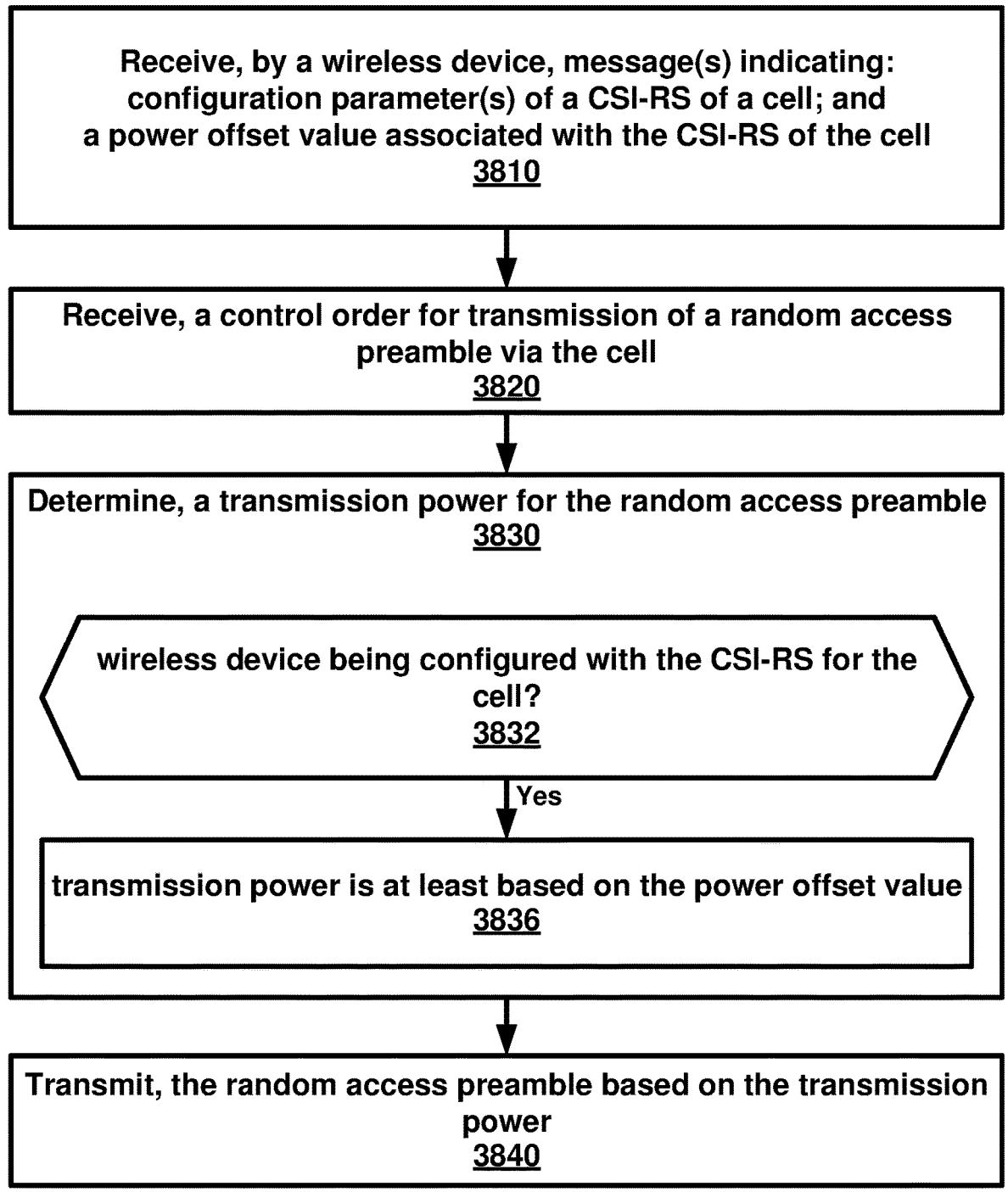
FIG. 38 is an example flow diagram as per an aspect of an embodiment of the present disclosure.

FIG. 38 is an example flow diagram as per an aspect of an embodiment of the present disclosure. At 3810, a wireless device may receive one or more messages. The one or more messages may indicate: one or more configuration parameters of a channel state information reference signal (CSI-RS) of a cell; and a power offset value associated with the CSI-RS of the cell. At 3820, a control order may be received. The control order may be for transmission of a random access preamble via the cell. At 3830, a transmission power for the random access preamble may be determined. In response to the wireless device being configured with the CSI-RS for the cell (3832), the transmission power may be at least based on the power offset value (3836). The wireless device may transmit the random access preamble using the transmission power at 3840.

According to an embodiment, the value of the pathloss measurement may be based on a reference signal power value minus a measured received power value of a reference signal. When the one or more configuration parameters comprise one or more parameters of the CSI-RS for the cell, the reference signal may be the CSI-RS. When the one or more configuration parameters do not comprise CSI-RS parameters for the cell, the reference signal may be at least one synchronization signal. According to an embodiment, the transmission power may be based on a sum of a preamble base station received target power and the value of the pathloss measurement. According to an embodiment, the transmission power may employ a value of the pathloss measurement determined based on a received power of the CSI-RS. According to an embodiment, the transmission power for the random access preamble may be determined. In response to the wireless device being not configured with the CSI-RS for the cell: the pathloss measurement may be based on at least one synchronization signal; and the determining of the transmission power may not employ the power offset value. According to an embodiment, the one or more parameters of the CSI-RS may indicate a periodicity of the CSI-RS. According to an embodiment, the one or more parameters of the CSI-RS may indicate at least one of one or more CSI-RS subcarriers of resource elements or a CSI-RS sequence. According to an embodiment, when the one or more configuration parameters comprise one or more parameters of the CSI-RS, the transmitting the random access preamble may use at least one random access channel. The one or more messages may indicate: an association between one or more synchronization signals and the CSI-RS; and an association between the at least one random access channel and the one or more synchronization signals.

Figure 39:
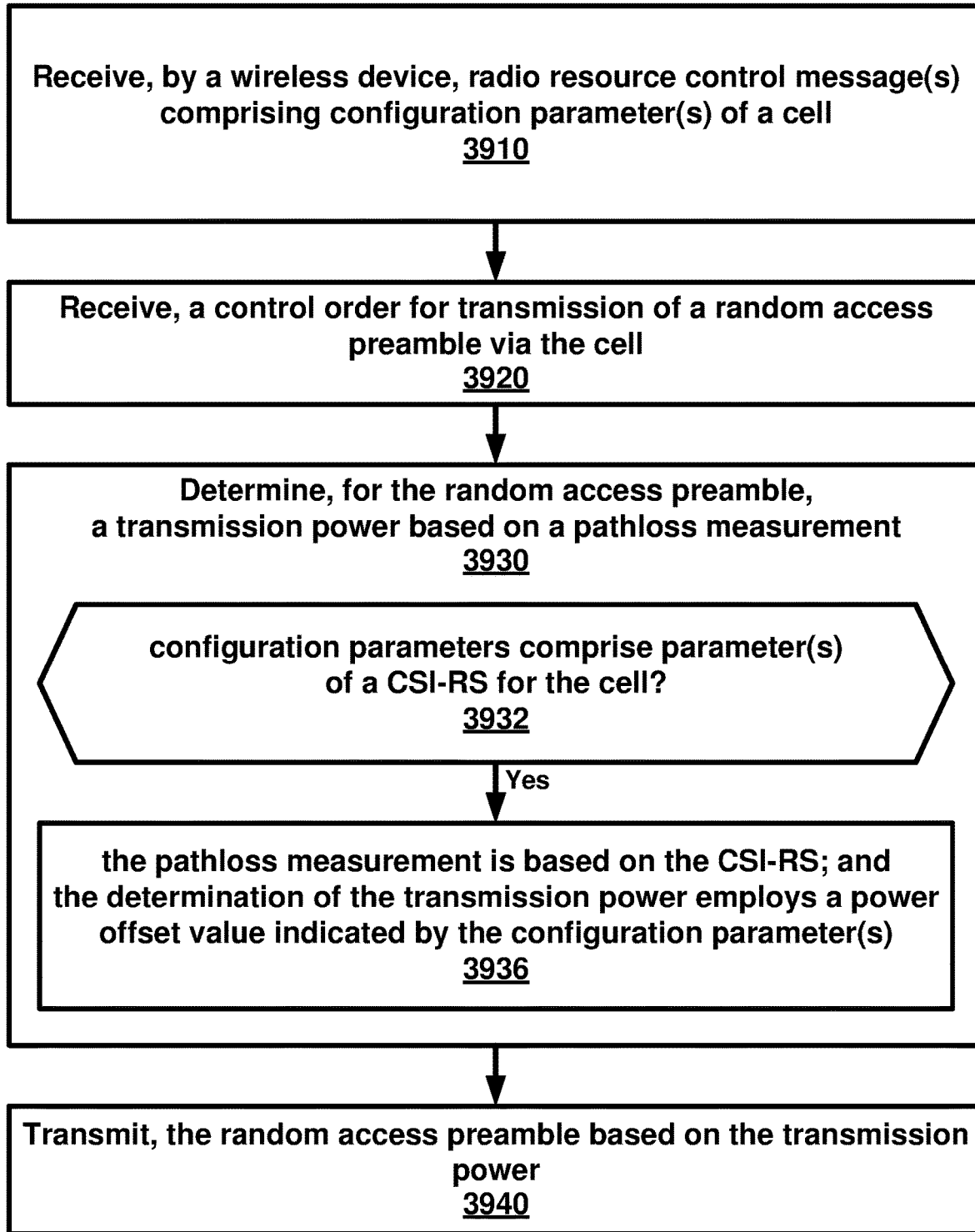
FIG. 39 is an example flow diagram as per an aspect of an embodiment of the present disclosure.

FIG. 39 is an example flow diagram as per an aspect of an embodiment of the present disclosure. At 3910, a wireless device may receive at least one radio resource control message. The at least one radio resource control message may comprise one or more configuration parameters of a cell. At 3920, the wireless device may receive a control order for transmission of a random access preamble via the cell. At 3930, transmission power based on a pathloss measurement may be determined for the random access preamble. When the one or more configuration parameters comprise one or more parameters of a channel state information reference signal (CSI-RS) for the cell (3932), the pathloss measurement may be based on the CSI-RS, and the determination of the transmission power may employ a power offset value indicated by the one or more configuration parameters (3936). At 3940, the random access preamble may be transmitted based on the transmission power.

According to an embodiment, the CSI-RS may be a periodic CSI-RS. According to an embodiment, the one or more parameters of the CSI-RS may indicate a periodicity of the CSI-RS. According to an embodiment, the one or more parameters of the CSI-RS may indicate at least one of one or more CSI-RS subcarriers of resource elements or a CSI-RS sequence. According to an embodiment, the transmission power for the random access preamble may be determined. When the one or more configuration parameters do not comprise CSI-RS parameters for the cell: the pathloss measurement may be based on at least one synchronization signal; and the determination of the transmission power may not employ the power offset value. According to an embodiment, the one or more messages may comprise at least one of a reference signal power value, a preamble base station received target power, or a configured wireless device transmit power for the cell. According to an embodiment, the determination of the transmission power may be further based on a reference signal power value. According to an embodiment, the transmission power may employ a value of the pathloss measurement determined based on a received power of the CSI-RS. According to an embodiment, the transmission power may be based on a sum of a preamble base station received target power and the value of the pathloss measurement. According to an embodiment, the value of the pathloss measurement may be based on a reference signal power value minus a measured received power value of a reference signal. When the one or more configuration parameters comprise one or more parameters of the CSI-RS for the cell, the reference signal may be the CSI-RS. When the one or more configuration parameters do not comprise CSI-RS parameters for the cell, the reference signal may be at least one synchronization signal. According to an embodiment, when the one or more configuration parameters comprise one or more parameters of the CSI-RS, the transmitting the random access preamble may use at least one random access channel. The one or more messages may indicate: an association between one or more synchronization signals and the CSI-RS; and an association between the at least one random access channel and the one or more synchronization signals.

FIG. 40 is an example flow diagram as per an aspect of an embodiment of the present disclosure. At 4010, a wireless device may receive one or more messages. The one or more messages may indicate: one or more configuration parameters of a periodic channel state information reference signal (CSI-RS) of a cell; and a power offset value associated with the periodic CSI-RS of the cell. At 4020, a control order for transmission of a random access preamble may be received via the cell. At 4030, a transmission power for the random access preamble may be determined. In response to the wireless device being configured with the periodic CSI-RS for the cell (4032), the transmission power may be at least based on the power offset value (4036). At 4040, the wireless device may transmit the random access preamble using the transmission power.

According to an embodiment, the one or more parameters of the CSI-RS may indicate a periodicity of the CSI-RS. According to an embodiment, the one or more parameters of the CSI-RS may indicate at least one of one or more CSI-RS subcarriers of resource elements or a CSI-RS sequence. According to an embodiment, the transmission power may employ a value of a pathloss measurement determined based on a received power of the CSI-RS. According to an embodiment, the value of the pathloss measurement may be based on a reference signal power value minus a measured received power value of a reference signal. When the one or more configuration parameters comprise one or more parameters of the CSI-RS for the cell, the reference signal may be the CSI-RS. When the one or more configuration parameters do not comprise CSI-RS parameters for the cell, the reference signal may be at least one synchronization signal.

According to an embodiment, further comprising the transmission power for the random access preamble may be determined. In response to the wireless device being not configured with the periodic CSI-RS for the cell, the transmission power may not employ the power offset value. According to an embodiment, the one or more messages may comprise at least one of a reference signal power value, a preamble base station received target power, or a configured wireless device transmit power for the cell. According to an embodiment, the determination of the transmission power may be further based on a reference signal power value. According to an embodiment, when the one or more configuration parameters comprise one or more parameters of the CSI-RS, the transmitting the random access preamble may use at least one random access channel. The one or more messages may indicate: an association between one or more synchronization signals and the CSI-RS; and an association between the at least one random access channel and the one or more synchronization signals.

Figure 41:
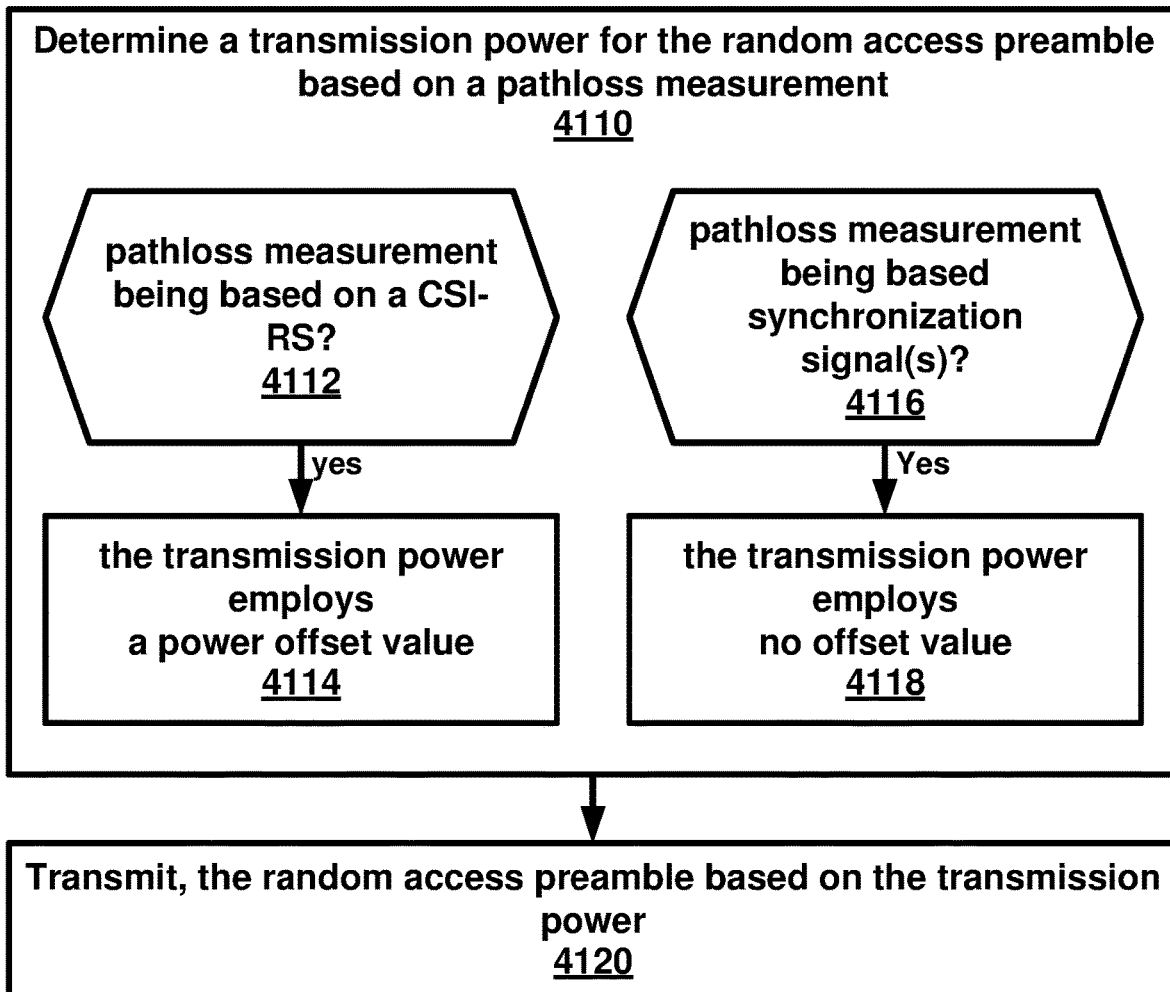
FIG. 41 is an example flow diagram as per an aspect of an embodiment of the present disclosure.

FIG. 41 is an example flow diagram as per an aspect of an embodiment of the present disclosure. At 410, a transmission power for a random access preamble may be determined based on a pathloss measurement. The transmission power may employ: a power offset value (4114) in response to the pathloss measurement being based on a CSI-RS (4112), and no power offset value (4118) in response to the pathloss measurement being based on at least one synchronization signal (4116). At 4120, the random access preamble may be transmitted based on the transmission power.

According to an embodiment, the CSI-RS may be a periodic CSI-RS. According to an embodiment, the wireless device may further receive one or more messages. The one or more messages may indicate: one or more configuration parameters of the CSI-RS; and a power offset value associated with the periodic CSI-RS of the cell. According to an embodiment, the one or more parameters of the CSI-RS may indicate at least one of one or more CSI-RS subcarriers of resource elements or a CSI-RS sequence. According to an embodiment, the determination of the transmission power may be further based on a reference signal power value. According to an embodiment, the transmission power may employ a value of the pathloss measurement based on: a received power of the CSI-RS in response to the pathloss measurement being based on the CSI-RS; and a received power of the at least one synchronization signal in response to the pathloss measurement being based on the at least one synchronization signal.

According to an embodiment, the one or more messages may further comprise at least one of a reference signal power value, a preamble base station received target power, or a configured wireless device transmit power for the cell. According to an embodiment, the transmission power may be based on a sum of a preamble base station received target power and a value of the pathloss measurement. According to an embodiment, the value of the pathloss measurement may be based on a reference signal power value minus a measured received power value of a reference signal. When the one or more configuration parameters comprise one or more parameters of the CSI-RS for the cell, reference signal may be the CSI-RS. When the one or more configuration parameters do not comprise CSI-RS parameters for the cell, the reference signal may b e at least one synchronization signal.

FIG. 42 is an example flow diagram as per an aspect of an embodiment of the present disclosure. At 4210, a wireless device may receive from a base station, one or more messages. The one or more messages may comprise configuration parameters of a plurality of random access channels for one or more beams of a cell. At 4220, the wireless device may initiate a random access procedure for parallel transmissions of a plurality of random access preambles via the plurality of random access channels for the one or more beams. At 4230, a plurality of transmission powers corresponding to the parallel transmissions of the plurality of the random access preambles may be determined. At 4250, at least one of the parallel transmissions may be dropped if a first calculated transmit power comprising the plurality of transmission powers exceeds a first value at 4240. At 4260, the wireless device may transmit at least one of the plurality of the random access preambles via at least one of the plurality of the random access channels.

According to an embodiment, the first calculated transmit power may comprise a sum of the plurality of transmission powers. According to an embodiment, a second calculated transmit power may be determined for a transmission of the at least one of the plurality of the random access preambles. The second calculated transmit power may be smaller than or equal to the first value. According to an embodiment, the first value may be a maximum allowable transmission power of the wireless device via the cell. According to an embodiment, the dropping may be based on priorities of one or more beams of the cell. The priorities of the one or more beams of the cell may be based on a plurality of pathloss values of the one or more beams. According to an embodiment, the wireless device may measure the plurality of pathloss values of the one or more beams based on received powers of one or more synchronization signals. According to an embodiment, the wireless device may measure the plurality of pathloss values of the one or more beams based on received powers of one or more channel state information reference signals. According to an embodiment, one or more pathloss values for the parallel transmissions of the plurality of random access preambles may be measured. The wireless device may employ the one or more pathloss values for the determining the plurality of transmission powers. According to an embodiment, a first transmission of a first random access preamble may have a lower priority than a second transmission of a second random access preamble if a first pathloss value corresponding to the first transmission is larger than a second pathloss value corresponding to the second transmission. According to an embodiment, a first transmission of a first random access preamble may have a lower priority than a second transmission of a second random access preamble if a first transmission power corresponding to the first transmission is larger than a second transmission power corresponding to the second transmission. According to an embodiment, at least one of the plurality of transmission powers may comprise at least one of a pathloss value, a ramp-up value, and/or an offset value. The offset value may depend on a number of the plurality of random access preambles.

Figure 43:
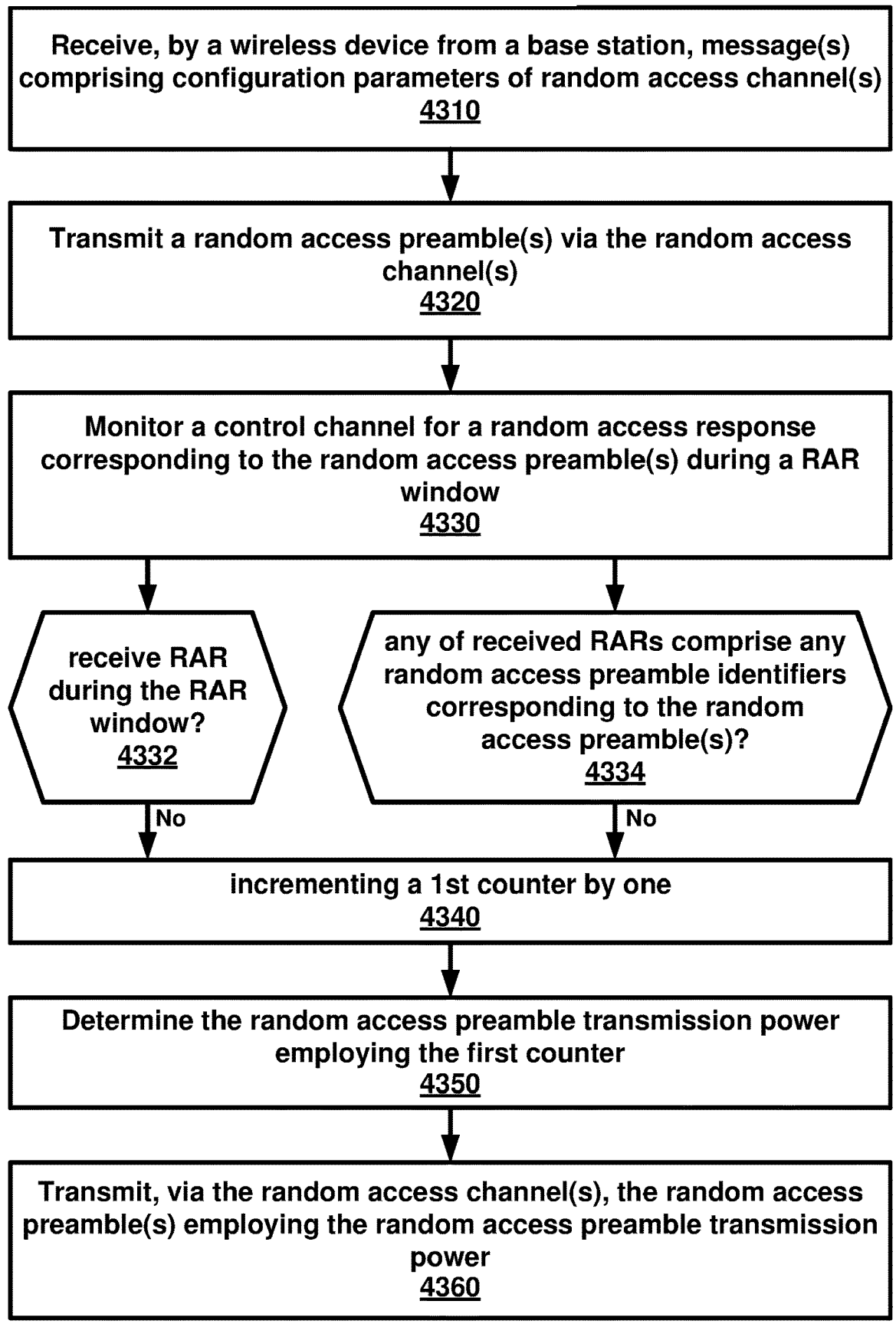
FIG. 43 is an example flow diagram as per an aspect of an embodiment of the present disclosure.

FIG. 43 is an example flow diagram as per an aspect of an embodiment of the present disclosure. At 4310, a wireless device may receive from a base station, one or more messages. The one or more messages may comprise configuration parameters of a plurality of random access channels. At 4320, a plurality of random access preambles may be transmitted via the one or more random access channels. At 4330, a control channel for a random access response corresponding to the plurality of random access preambles may be monitored during a random access response (RAR) window. A first counter may be incremented by one at 4340 in response to: receiving no RAR during the RAR window at 4332; or none of received RARs comprising at least one of one or more random access preamble identifiers correspond the plurality of random access preambles at 4334. At 4350, the random access preamble transmission power may be determined employing the first counter. At 4360, the plurality of random access preamble may be transmitted via the one or more random access channels employing the random access preamble transmission power.

Figure 44:
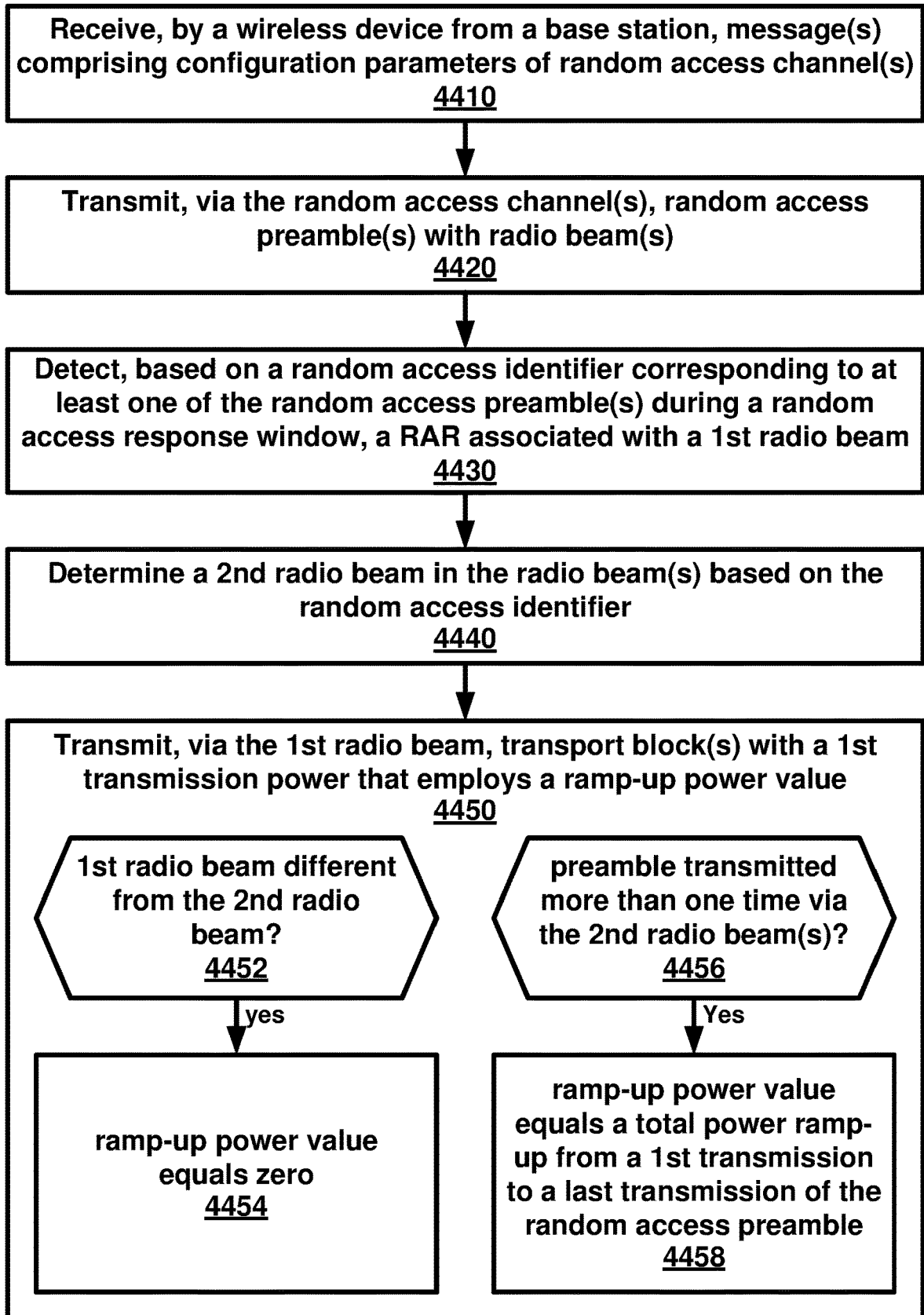
FIG. 44 is an example flow diagram as per an aspect of an embodiment of the present disclosure.

FIG. 44 is an example flow diagram as per an aspect of an embodiment of the present disclosure. At 4410, a wireless device may receive from a base station, one or more messages. The one or more messages may comprise configuration parameters of at least one random access channel. At 4420, one or more random access preambles with one or more radio beams may be transmitted via the at least one random access channel. At 4430, a random access response (RAR) associated with a first radio beam may be detected based on a random access identifier corresponding to at least one of the one or more random access preambles during a random access response window. At 4440, a second radio beam in the one or more radio beams may be determined based on the random access identifier. At 4450, one or more transport blocks with a first transmission power may be transmitted via the first radio beam. The first transmission power may employ a ramp-up power value. The ramp-up power value may be is equal to zero at 4454 if the first radio beam is different from the second radio beam at 4452. The ramp-up power value may be equal to a total power ramp-up from a first transmission to a last transmission of the random access preamble at 4458 if the preamble is transmitted more than one time via the second radio beam at 4456.

In this specification, "a" and "an" and similar phrases are to be interpreted as "at least one" and "one or more." In this specification, the term "may" is to be interpreted as "may, for example." In other words, the term "may" is indicative that the phrase following the term "may" is an example of one of a multitude of suitable possibilities that may, or may not, be employed to one or more of the various embodiments. If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}.

In this specification, parameters (Information elements: IEs) may comprise one or more objects, and each of those objects may comprise one or more other objects. For example, if parameter (IE) N comprises parameter (IE) M, and parameter (IE) M comprises parameter (IE) K, and parameter (IE) K comprises parameter (information element) J, then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Many of the elements described in the disclosed embodiments may be implemented as modules. A module is defined here as an isolatable element that performs a defined function and has a defined interface to other elements. The modules described in this disclosure may be implemented in hardware, software in combination with hardware, firmware, wetware (i.e hardware with a biological element) or a combination thereof, all of which are behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on the example(s) using FDD communication systems. However, one skilled in the art will recognize that embodiments of the invention may also be implemented in a system comprising one or more TDD cells (e.g. frame structure 2 and/or frame structure 3-licensed assisted access). The disclosed methods and systems may be implemented in wireless or wireline systems. The features of various embodiments presented in this invention may be combined. One or many features (method or system) of one embodiment may be implemented in other embodiments. Only a limited number of example combinations are shown to indicate to one skilled in the art the possibility of features that may be combined in various embodiments to create enhanced transmission and reception systems and methods.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

The invention claimed is:

1. A method comprising:
   initiating, by a wireless device, a random access procedure for parallel transmissions of random access preambles for beams of a cell;
   measuring received signal powers of at least one synchronization signal (SS) block or at least one channel state information reference signal (CSI-RS) corresponding to the beams to determine at least one first pathloss value and at least one second pathloss value;
   determining a first calculated transmit power exceeds a first power value, wherein the first calculated transmit power comprises transmission powers corresponding to the parallel transmissions of the random access preambles;
   in response to the determining, dropping a first transmission of a plurality of first random access preambles of the random access preambles based on the at least one first pathloss value corresponding to the first transmission being greater than the at least one second pathloss value corresponding to a second transmission of a plurality of second random access preambles of the random access preambles; and
   transmitting, by the wireless device, the plurality of second random access preambles of the random access preambles in frequency and time multiplexed physical random access channel (PRACH) occasions,
   wherein a CSI-RS among the at least one CSI-RS and a SS block among the at least one SS block are related to a same subset of random access channel (RACH) preamble indices.

2. The method of claim 1, wherein the first calculated transmit power comprises a sum of the transmission powers.

3. The method of claim 1, further comprising determining a second calculated transmit power for a transmission of the plurality of second random access preambles of the random access preambles, wherein the second calculated transmit power is smaller than or equal to the first power value.

4. The method of claim 1, wherein the first power value is a maximum allowable transmission power of the wireless device via the cell.

5. The method of claim 1, wherein the first transmission of the plurality of first random access preambles have a lower priority than the second transmission of the plurality of second random access preambles.

6. The method of claim 1, wherein at least one of the transmission powers comprises at least one of a pathloss value, a ramp-up value, or an offset value, wherein the offset value depends on a number of the random access preambles.

7. The method of claim 1, further comprising receiving, by the wireless device from a base station, one or more messages comprising configuration parameters of the beams of the cell.

8. The method of claim 7, wherein the configuration parameters indicate random access channels for the beams of the cell.

9. The method of claim 8, wherein the transmitting the plurality of second random access preambles of the random access preambles further comprises transmitting the plurality of second random access preambles of the random access preambles via the random access channels.

10. A wireless device comprising:
   one or more processors; and
   memory storing instructions that, when executed by the one or more processors, cause the wireless device to:
   initiate a random access procedure for parallel transmissions of random access preambles for beams of a cell,
   measure received signal powers of at least one synchronization signal (SS) block or at least one channel state information reference signal (CSI-RS) corresponding to the beams to determine at least one first pathloss value and at least one second pathloss value,
   determine a first calculated transmit power exceeds a first power value, wherein the first calculated transmit power comprises transmission powers corresponding to the parallel transmissions of the random access preambles,
   in response to the determining, drop a first transmission of a plurality of first random access preambles of the random access preambles based on the at least one first pathloss value corresponding to the first transmission being greater than the at least one second pathloss value corresponding to a second transmission of a plurality of second random access preambles of the random access preambles, and
   transmit the plurality of second random access preambles of the random access preambles in frequency and time multiplexed physical random access channel (PRACH) occasions,
   wherein a CSI-RS among the at least one CSI-RS and a SS block among the at least one SS block are related to a same subset of random access channel (RACH) preamble indices.

11. The wireless device of claim 10, wherein the first calculated transmit power comprises a sum of the transmission powers.

12. The wireless device of claim 10, wherein the instructions, when executed by the one or more processors, further cause the wireless device to determine a second calculated transmit power for a transmission of the plurality of second random access preambles of the random access preambles, wherein the second calculated transmit power is smaller than or equal to the first power value.

13. The wireless device of claim 10, wherein the first power value is a maximum allowable transmission power of the wireless device via the cell.

14. The wireless device of claim 10, wherein the first transmission of the plurality of first random access preambles have a lower priority than the second transmission of the plurality of second random access preambles.

15. The wireless device of claim 10, wherein at least one of the transmission powers comprises at least one of a pathloss value, a ramp-up value, or an offset value, wherein the offset value depends on a number of the random access preambles.

16. The wireless device of claim 10, wherein the instructions, when executed by the one or more processors, further cause the wireless device to receive from a base station, one or more messages comprising configuration parameters of the beams of the cell, wherein the configuration parameters indicate a plurality of random access channels for the beams of the cell.

17. The wireless device of claim 16, wherein the instructions, when executed by the one or more processors, further cause the wireless device to transmit the plurality of second random access preambles of the random access preambles via the random access channels.

18. A system comprising:
a wireless device comprising:
one or more processors; and
memory storing instructions that, when executed by the one or more processors of the wireless device, cause the wireless device to:
initiate a random access procedure for parallel transmissions of random access preambles for beams of a cell,
measure received signal powers of at least one synchronization signal (SS) block or at least one channel state information reference signal (CSI-RS) corresponding to the beams to determine at least one first pathloss value and at least one second pathloss value,
determine a first calculated transmit power exceeds a first power value, wherein the first calculated transmit power comprises transmission powers corresponding to the parallel transmissions of the random access preambles,
in response to the determining, drop a first transmission of a plurality of first random access preamble of the random access preambles based on at least one first pathloss value corresponding to the first transmission being greater than at least one second pathloss value corresponding to a second transmission of a plurality of second random access preamble of the random access preambles; and
transmit the plurality of second random access preambles of the random access preambles in frequency and time multiplexed physical random access channel (PRACH) occasions,
wherein a CSI-RS among the at least one CSI-RS and a SS block among the at least one SS block are related to a same subset of random access channel (RACH) preamble indices; and
a base station comprising:
one or more processors, and
memory storing instructions that, when executed by the one or more processors of the base station, cause the base station to receive the plurality of second random access preambles of the random access preambles in the frequency and time multiplexed PRACH occasions.

* * * * *